United States Patent
Kaji et al.

(10) Patent No.: US 11,332,164 B2
(45) Date of Patent: May 17, 2022

(54) VEHICLE CONTROL SYSTEM, VEHICLE CONTROL METHOD, AND VEHICLE CONTROL PROGRAM

(71) Applicant: HONDA MOTOR CO., LTD., Tokyo (JP)

(72) Inventors: Toshiyuki Kaji, Wako (JP); Yoshifumi Nakamura, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 233 days.

(21) Appl. No.: 16/617,006

(22) PCT Filed: Jun. 2, 2017

(86) PCT No.: PCT/JP2017/020629
§ 371 (c)(1),
(2) Date: Nov. 26, 2019

(87) PCT Pub. No.: WO2018/220826
PCT Pub. Date: Dec. 6, 2018

(65) Prior Publication Data
US 2021/0146962 A1    May 20, 2021

(51) Int. Cl.
*B60W 60/00* (2020.01)
*B60W 30/14* (2006.01)
(Continued)

(52) U.S. Cl.
CPC ...... *B60W 60/0055* (2020.02); *B60W 30/146* (2013.01); *B60W 40/08* (2013.01);
(Continued)

(58) Field of Classification Search
CPC .......... B60W 60/0055; B60W 60/001; B60W 30/146; B60W 40/08; B60W 50/0097;
(Continued)

(56) References Cited

U.S. PATENT DOCUMENTS

| | | | | |
|---|---|---|---|---|
| 2012/0277947 A1* | 11/2012 | Boehringer | ......... | B60W 50/082 701/23 |
| 2014/0148988 A1* | 5/2014 | Lathrop | ................ | B60W 50/14 701/23 |

(Continued)

FOREIGN PATENT DOCUMENTS

| JP | 2006-248335 | 9/2006 |
|---|---|---|
| JP | 2016-030513 | 3/2016 |

(Continued)

OTHER PUBLICATIONS

International Search Report and Written Opinion for International Application Serial No. PCT/JP2017/020629 dated Sep. 5, 2017, 10 pages.

*Primary Examiner* — Nadeem Odeh
(74) *Attorney, Agent, or Firm* — Amin, Turocy & Watson, LLP

(57) ABSTRACT

A vehicle control system includes a direction detector configured to detect a direction of a face or line of sight of an occupant of a host vehicle; an automated driving controller configured to execute automated driving; and a switching controller configured to switch an automated driving mode executed by the automated driving controller to any one of a plurality of automated driving modes including a first automated driving mode in which a predetermined task is required of the occupant or a predetermined automation rate is set and a second automated driving mode in which a level of the task required of the occupant is lower than in the first automated driving mode or an automation rate is lower than in the first automated driving mode, wherein the switching controller includes the direction detected by the direction detector being a predetermined direction in switching conditions for switching from the second automated driving mode to the first automated driving mode.

8 Claims, 33 Drawing Sheets

(51) Int. Cl.
*B60W 40/08* (2012.01)
*B60W 50/00* (2006.01)
(52) U.S. Cl.
CPC ...... *B60W 50/0097* (2013.01); *B60W 60/001* (2020.02); *B60W 2040/0827* (2013.01); *B60W 2040/0872* (2013.01); *B60W 2540/225* (2020.02); *B60W 2540/229* (2020.02); *B60W 2554/40* (2020.02)
(58) Field of Classification Search
CPC ..... B60W 2540/225; B60W 2540/229; B60W 2040/0827; B60W 2040/0872; B60W 60/0051
USPC .......................................................... 701/23
See application file for complete search history.

(56) References Cited

U.S. PATENT DOCUMENTS

| | | | | |
|---|---|---|---|---|
| 2016/0375911 A1* | 12/2016 | Coelingh | ............... | B60K 28/10 701/23 |
| 2019/0265699 A1* | 8/2019 | Yabuuchi | ............. | A61B 5/6893 |
| 2019/0339695 A1* | 11/2019 | Feron | .................. | B60W 50/082 |

FOREIGN PATENT DOCUMENTS

| | | |
|---|---|---|
| JP | 2016-137819 | 8/2016 |
| JP | 2016-151815 | 8/2016 |
| WO | 2016/199379 | 12/2016 |

* cited by examiner

FIG. 15
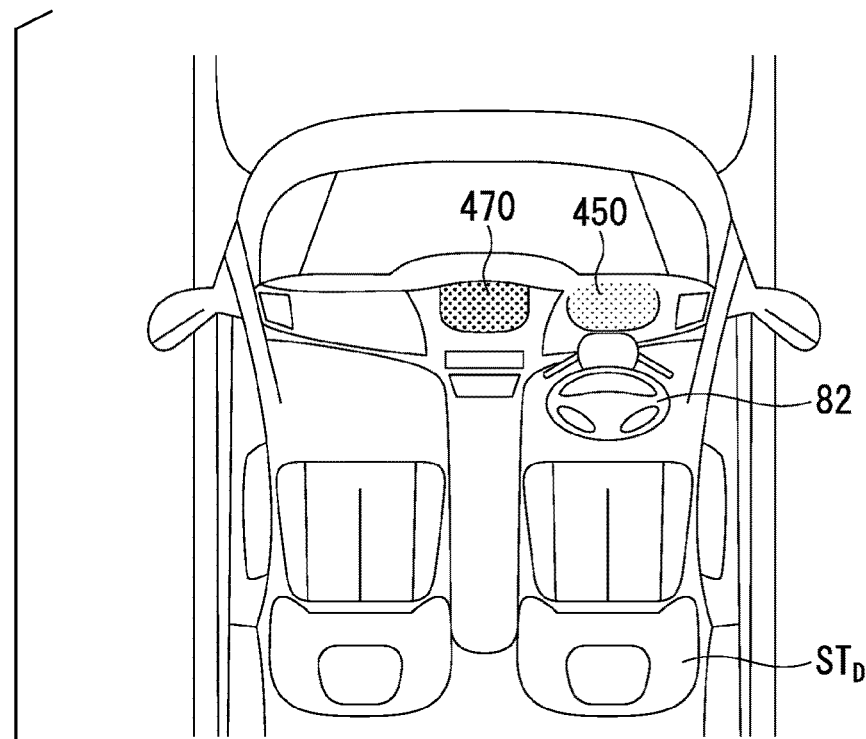
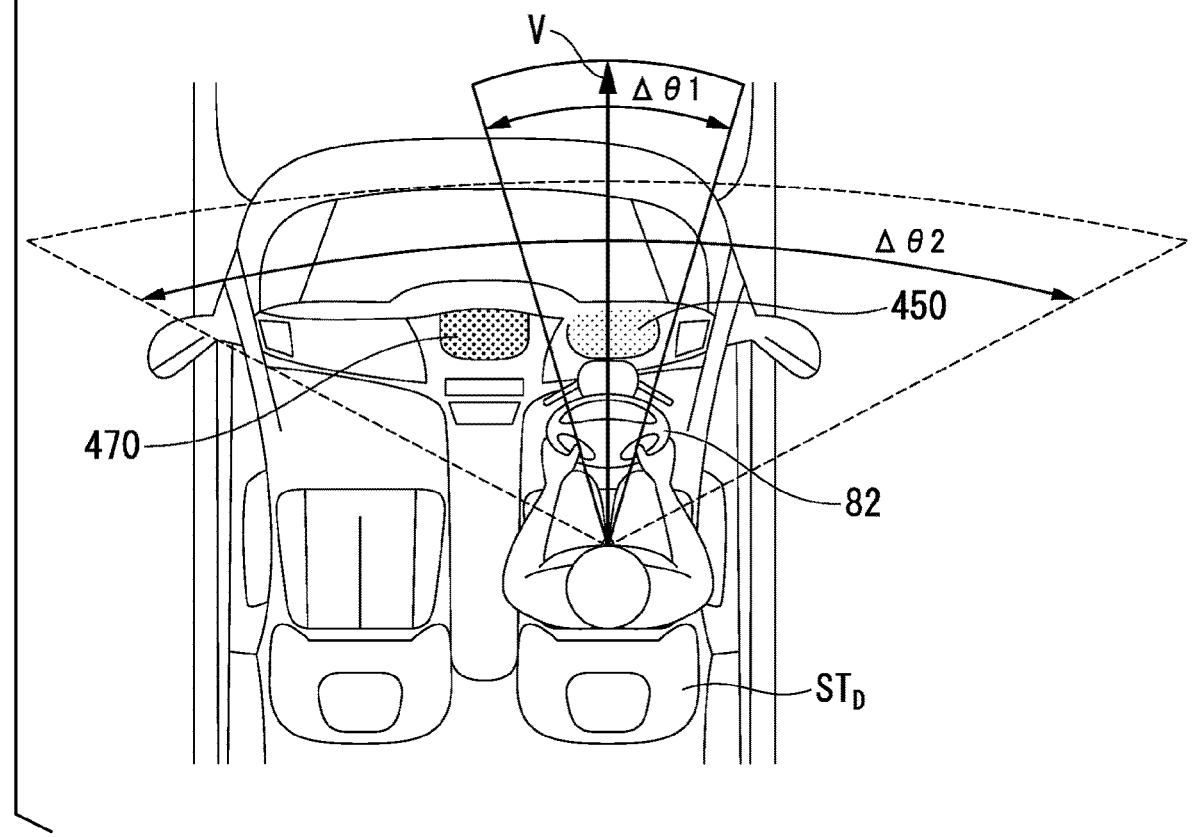

FIG. 18
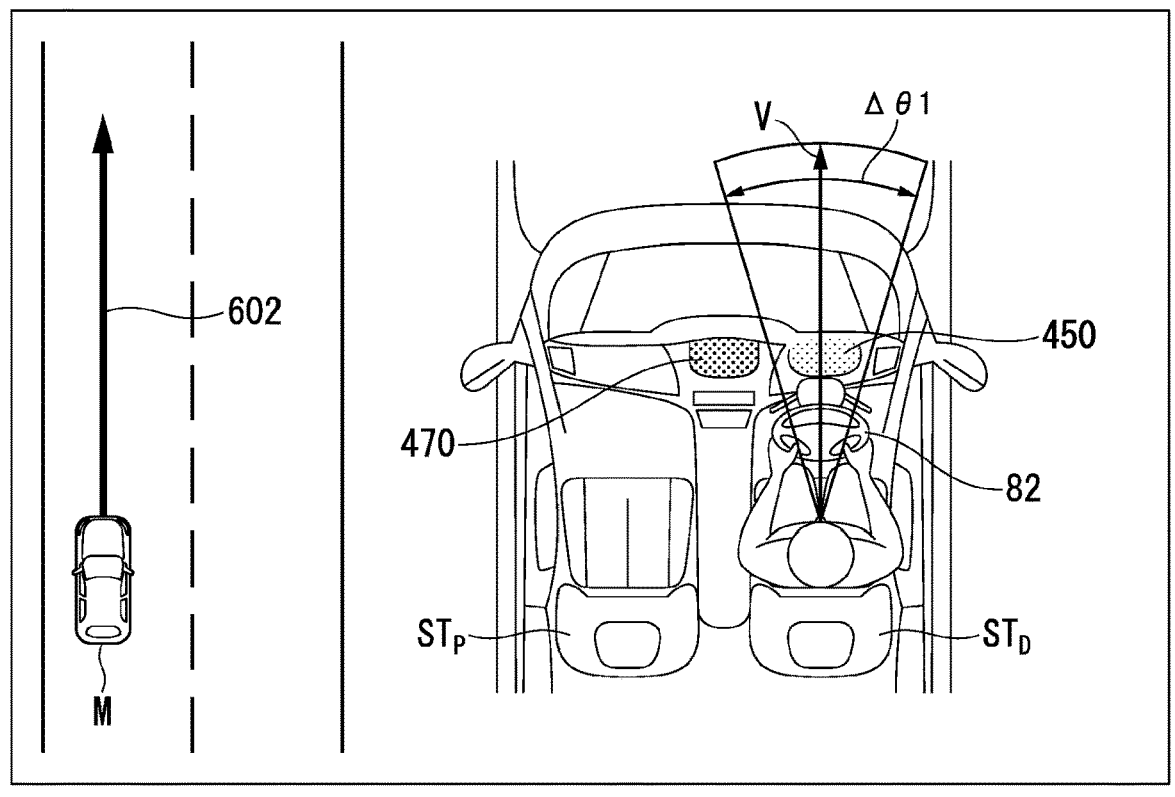
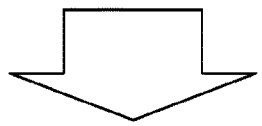
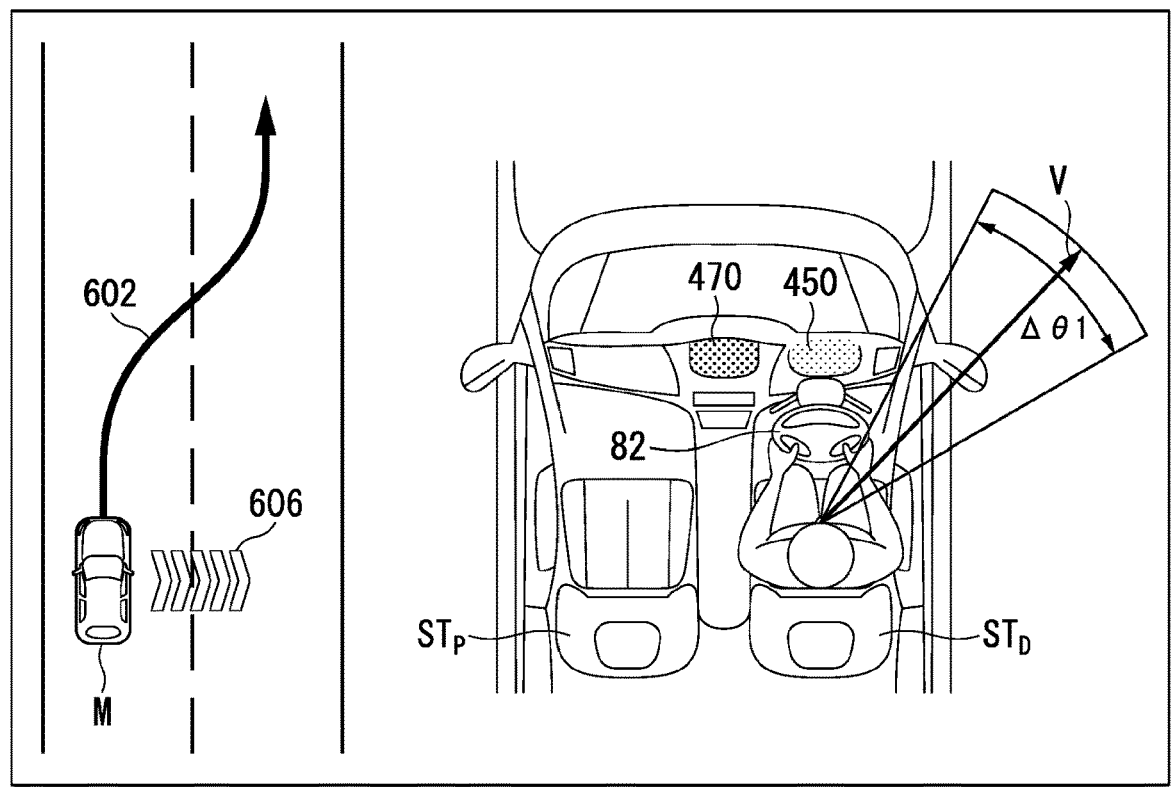

FIG. 26

THE LEVEL OF
THE DRIVING ASSISTANCE
IS DECREASED

B— APPROVAL

100

VEHICLE CONTROL SYSTEM, VEHICLE CONTROL METHOD, AND VEHICLE CONTROL PROGRAM

TECHNICAL FIELD

The present invention relates to a vehicle control system, a vehicle control method, and a vehicle control program.

BACKGROUND ART

In the related art, a technology for automatically switching from a low-speed following control mode to a high-speed following control mode in a case in which at least one of three conditions including a condition that a road on which a vehicle is traveling is a highway, a condition that a position of the vehicle is near a traffic jam elimination position, and a condition that a predicted vehicle speed of a preceding vehicle is higher than a vehicle speed threshold value is satisfied when a speed of a host vehicle has been equal to or higher than an upper limit vehicle speed in a low-speed following traveling control vehicle speed area has been disclosed (see, for example, Patent Document 1).

PRIOR ART DOCUMENTS

Patent Documents

[Patent Document 1]
Japanese Unexamined Patent Application, First Publication No 2006-248335

SUMMARY OF INVENTION

Problems to be Solved by the Invention

However, in the technology of the related art, a status of the occupant is not considered at the time of switching from the low-speed following control mode to the high-speed following control mode. When the technology of the related art has been applied to an automated driving technology in recent years, it has been assumed that low-speed following control to which transition is performed when there is a low-speed area and a preceding vehicle allows an occupant to entrust driving to a vehicle without monitoring the surroundings in the case of a redundant sensor system. In the case of such an assumption, when transition from the low-speed following control to another control is performed, a certain degree of surrounding monitoring is required of the occupant. In this regard, the technology of the related art is not considered.

The present invention has been made in view of such circumstances, and an object of the present invention is to provide a vehicle control system, a vehicle control method, and a vehicle control program capable of causing a driving operation to be handed over to an occupant more smoothly.

Solution to Problem (1) A vehicle control system includes: a direction detector configured to detect a direction of a face or line of sight of an occupant of a host vehicle; an automated driving controller configured to execute automated driving; and a switching controller configured to switch an automated driving mode executed by the automated driving controller to any one of a plurality of automated driving modes including a first automated driving mode in which a predetermined task is required of the occupant or a predetermined automation rate is set and a second automated driving mode in which a level of the task required of the occupant is lower than in the first automated driving mode or an automation rate is lower than in the first automated driving mode, wherein the switching controller includes the direction detected by the direction detector being a predetermined direction in switching conditions for switching from the second automated driving mode to the first automated driving mode.

(2) In the vehicle control system according to (1), the switching controller causes the automated driving controller to execute a third automated driving mode in which the host vehicle is caused to travel at a speed equal to or lower than an upper limit speed of the second automated driving mode or a current speed of the host vehicle when the switching conditions are not satisfied.

(3) In the vehicle control system according to (1), the switching controller causes the automated driving controller to execute a fourth automated driving mode in which the host vehicle is caused to decelerate and stop when the switching conditions are not satisfied.

(4) In the vehicle control system according to any one of (1) to (3), a maximum speed at which the host vehicle is allowed to travel in the second automated driving mode is lower than a maximum speed at which the host vehicle is allowed to travel in the first automated driving mode.

(5) In the vehicle control system according to any one of (1) to (4), the switching controller further includes, in the switching conditions, a condition that the host vehicle is not traveling in a predetermined area.

(6) In the vehicle control system according to (5), the predetermined area is an area in which a traveling lane of the host vehicle is able to be recognized by referring to map information.

(7) In the vehicle control system according to any one of (1) to (6), the switching controller further includes, in the switching conditions, a condition that there are no other vehicles in front of the host vehicle in a host lane in which the host vehicle travels.

(8) The vehicle control system according to any one of (1) to (7) further includes an information outputter configured to output information; and an output controller configured to cause the information outputter to output predetermined information when the automated driving mode executed by the automated driving controller is switched from the second automated driving mode to the first automated driving mode by the switching controller.

(9) The vehicle control system according to any one of (1) to (8) further includes a receiver configured to receive an operation of the occupant, wherein the switching controller switches the automated driving mode executed by the automated driving controller when an approval operation in response to the automated driving mode being switched in a case in which the switching conditions are satisfied has been received by the receiver.

(10) The vehicle control system according to any one of (1) to (9) further includes a level-of-wakefulness detector configured to detect a level of wakefulness indicating a level of wakefulness of the occupant, wherein the switching controller further includes, in the switching conditions, a condition that the level of the wakefulness detected by the level-of-wakefulness detector is lower than a threshold value.

(11) The vehicle control system according to any one of (1) to (10) further includes: an information outputter configured to output information; a predictor configured to predict a future status of the host vehicle or another vehicle; and an output controller configured to cause the information outputter to output information, wherein the switching controller further includes, in the switching conditions, a condition that the predictor predicts that the speed of the host vehicle will be equal to or higher than a predetermined speed or a condition that the predictor predicts that another vehicle present in front of the host vehicle will move from the front of the host vehicle, and the output controller causes the information outputter to output predetermined information when the switching conditions are satisfied.

(12) A vehicle control method includes causing an in-vehicle computer to: detect a direction of a face or line of sight of an occupant of a host vehicle; execute automated driving; and switch an automated driving mode for executing the automated driving to any one of a plurality of automated driving modes including a first automated driving mode in which a predetermined task is required of the occupant or a predetermined automation rate is set and a second automated driving mode in which a level of the task required of the occupant is lower than in the first automated driving mode or an automation rate is lower than in the first automated driving mode, wherein the direction of the face or line of sight of the occupant being a predetermined direction is included in switching conditions for switching from the second automated driving mode to the first automated driving mode.

(13) A vehicle control program causes an in-vehicle computer to: detect direction of a face or line of sight of an occupant of a host vehicle; execute automated driving; and switch an automated driving mode for executing the automated driving to any one of a plurality of automated driving modes including a first automated driving mode in which a predetermined task is required of the occupant or a predetermined automation rate is set and a second automated driving mode in which a level of the task required of the occupant is lower than in the first automated driving mode or an automation rate is lower than in the first automated driving mode, wherein the direction of the face or line of sight of the occupant being a predetermined direction is included in switching conditions for switching from the second automated driving mode to the first automated driving mode.

Advantageous Effects of Invention

According to (1), (4) to (7), (12), or (13), it is possible to cause the driving operation to be handed over to the occupant more smoothly.

According to (2), since a current speed of the host vehicle is caused to be kept or decelerate or the host vehicle is not caused to accelerate to an original upper limit speed of the second automated driving mode in a case in which the switching conditions for switching from the second automated driving mode to the first automated driving mode are not satisfied, it is possible to lower a level of difficulty of the automated driving control as compared with the second automated driving mode. As a result, it is possible to continue to perform the automated driving while decreasing a level of the task required of the occupant.

According to (3), when the switching conditions for switching from the second automated driving mode to the first automated driving mode are not satisfied, transition to the fourth automated driving mode in which the host vehicle is caused to decelerate and stop is performed. Therefore, it is possible to appropriately control the vehicle even in a case in which the occupant is unaware of change in the mode when change from the second automated driving mode to the first automated driving mode is performed.

According to (8), when a task of the occupant increases due to switching of the automated driving mode, it is possible to inform the occupant of the fact in advance.

According to (9), when the task of the occupant increases due to switching of the automated driving mode, the automated driving mode is switched in a case in which approval has been received from the occupant. Therefore, it is possible to cause the occupant to execute the task more reliably.

According to (10), when the level of the wakefulness of the occupant is equal to or greater than the threshold value, switching from the second automated driving mode to the first automated driving mode is performed. Therefore, it is possible to curb switching to the automated driving mode in which the task further increases in a situation in which the occupant is not awake.

According to (11), when switching from the second automated driving mode to the first automated driving mode is performed on the condition that it is predicted that the speed of the host vehicle will be equal to or higher than a predetermined speed or that it is predicted that another vehicle present in front of the host vehicle will move from the front of the host vehicle, it is possible to inform the occupant that the task increases at an earlier timing.

BRIEF DESCRIPTION OF THE DRAWINGS

FIG. 15 is a diagram schematically showing a structure of a vehicle cabin when the host vehicle M is viewed from above.

FIG. 18 is a diagram schematically showing a state in which a reference direction of a first angle range 401 is changed at the time of start of lane change.

FIG. 26 is a diagram showing an example of a screen that is displayed on any one of displays of the HMI 400 in order to notify of a decrease in a level of the driving assistance.

DESCRIPTION OF EMBODIMENTS

Hereinafter, embodiments of a vehicle control system, a vehicle control method, and a vehicle control program of the present invention will be described with reference to the drawings. In the embodiment, the vehicle control system is applied to an automated driving vehicle capable of automated driving (autonomous driving). In principle, the automated driving refers to causing a vehicle to travel in a state in which no operation of an occupant is required, and is considered to be a type of driving assistance. The automated driving vehicle can also be caused to travel through manual driving. In the following description, an "occupant" refers to an occupant seated on a driver's seat, that is, a seat provided with a driving operator.

In the embodiment, it is assumed that examples of a level of the driving assistance include a first level, a second level with a higher level of control (automation rate) than the first level, and a third level with a higher level of control than the second level. In the driving assistance at the first level, for example, driving assistance control is executed by operating a driving assistance device such as an adaptive cruise control system (ACC) or a lane keeping assistance system (LKAS). In the driving assistance at the second level and the third level, for example, automated driving for automatically controlling both acceleration/deceleration and steering of the vehicle without requiring an operation of the occupant with respect to the driving operator is executed. With the execution of the driving assistance, the occupant is assigned a task (obligation) according to the level of the driving assistance. For example, in the driving assistance at the first level and the second level, the occupant is obliged to monitor the surroundings, whereas in the driving assistance at the third level, the occupant is not obligated to monitor the surroundings (or a level of surroundings monitoring obligation is low). When the occupant does not fulfill the surroundings monitoring obligation, for example, the level of the driving assistance is decreased. A status in which the driving assistance at the second level is performed is an example of a "first automated driving mode", and a status in which the driving assistance at the third level is performed is an example of a "second automated driving mode".

[Overall Configuration]

Figure 1:
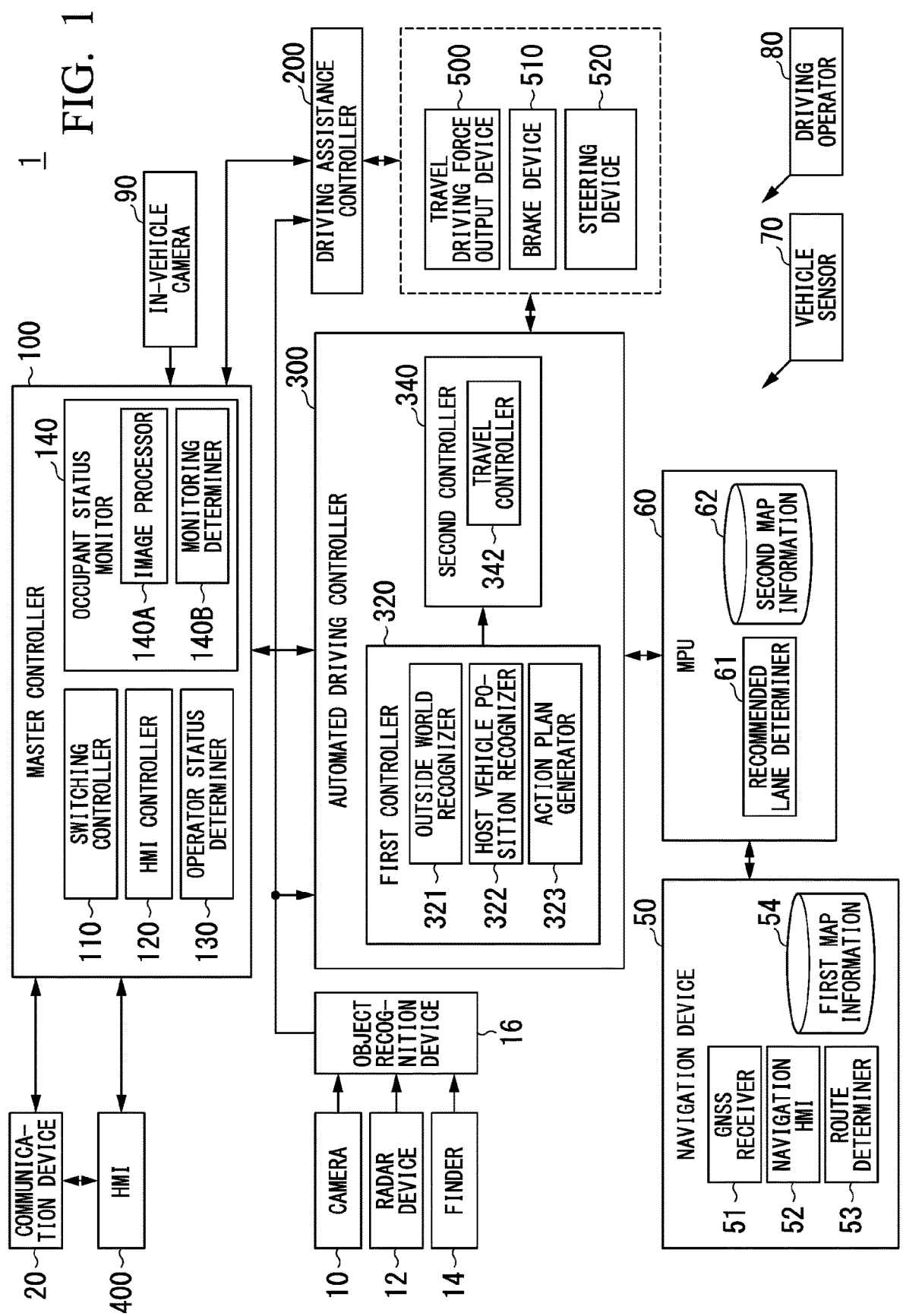
FIG. 1 is a configuration diagram of a vehicle system 1 including a vehicle control system of an embodiment.

FIG. 1 is a configuration diagram of a vehicle system 1 including a vehicle control system of an embodiment. A vehicle in which the vehicle system 1 is mounted (hereinafter referred to as a host vehicle M) is, for example, a vehicle such as a two-wheeled vehicle, a three-wheeled vehicle, or a four-wheeled vehicle. A driving source thereof is an internal combustion engine such as a diesel engine or a gasoline engine, an electric motor, or a combination thereof. The electric motor operates using power generated by a power generator connected to the internal combustion engine or discharge power of a secondary battery or a fuel cell.

The vehicle control system 1 includes, for example, a camera 10, a radar device 12, a finder 14, an object recognition device 16, a communication device 20, a navigation device 50, a map position unit (MPU) 60, a vehicle sensor 70, a driving operator 80, an in-vehicle camera 90, a master controller 100, a driving assistance controller 200, an automated driving controller 300, a human machine interface (HMI) 400, a travel driving force output device 500, a brake device 510, and a steering device 520. These devices or equipment are connected to each other by a multiplex communication line such as a controller area network (CAN) communication line, a serial communication line, a wireless communication network, or the like. The configuration shown in FIG. 1 is merely an example, and a part of the configuration may be omitted or another configuration may be added.

For example, a combination of the in-vehicle camera 90, the master controller 100, and the automated driving controller 300 included in the vehicle system 1 is an example of a "vehicle control system".

The camera 10 is, for example, a digital camera using a solid-state imaging device such as a charge coupled device (CCD) or a complementary metal oxide semiconductor (CMOS). One or a plurality of cameras 10 are attached to any places of the host vehicle M in which the vehicle system 1 is mounted. In the case of forward imaging, the camera 10 is attached to an upper portion of a front windshield, a rear surface of a rearview mirror, or the like. In the case of backward imaging, the camera 10 is attached to an upper portion of a rear windshield, a back door, or the like. In the case of sideward imaging, the camera 10 is attached to a door mirror or the like. The camera 10, for example, periodically and repeatedly images surroundings of the host vehicle M. The camera 10 may be a stereo camera.

The radar device 12 radiates radio waves such as millimeter waves to the surroundings of the host vehicle M and detects radio waves (reflected waves) reflected by an object to detect at least a position (a distance and an orientation) of the object. One or a plurality of radar devices 12 are attached to any places of the host vehicle M. The radar device 12 may detect a position and a speed of the object using a frequency modulated continuous wave (FMCW) scheme.

The finder 14 is Light Detection and Ranging or Laser Imaging Detection and Ranging (LIDAR) that measures scattered light with respect to irradiation light and detects a distance to a target. One or a plurality of the finders 14 are attached to any places of the host vehicle M.

The object recognition device 16 performs a sensor fusion process on detection results of some or all of the camera 10, the radar device 12, and the finder 14 to recognize a position, type, speed, and the like of the object. The object recognition device 16 outputs a recognition result to the automated driving controller 300.

The communication device 20, for example, communicates with another vehicle present around the host vehicle M using a cellular network, a Wi-Fi network, Bluetooth (registered trademark), dedicated short range communication (DSRC), or the like or communicates with various server devices via a wireless base station. The communication device 20 communicates with a terminal device carried by a person outside the vehicle.

The navigation device 50 includes, for example, a global navigation satellite system (GNSS) receiver 51, a navigation HMI 52, and a route determiner 53, and holds first map information 54 in a storage device such as a hard disk drive (HDD) or a flash memory. The GNSS receiver 51 specifies a position of the host vehicle M on the basis of a signal received from a GNSS satellite. The position of the host vehicle M may be specified or supplemented by an inertial navigation system (INS) using an output of the vehicle sensor 70. The navigation HMI 52 includes a display device, a speaker, a touch panel, keys, and the like. The navigation HMI 52 may be partly or wholly shared with the above-described HMI 400. The route determiner 53, for example, determines a route (including information on stopovers at the time of traveling to a destination, for example) from the position of the host vehicle M specified by the GNSS receiver 51 (or any input position) to a destination input by the occupant using the navigation HMI 52 by referring to the first map information 54. The first map information 54 is, for example, information in which a road shape is represented by links indicating roads and nodes connected by the links. The first map information 54 may include a curvature of the road, point of interest (POI) information, and the like. The route determined by the route determiner 53 is output to the MPU 60. Further, the navigation device 50 may perform route guidance using the navigation HMI 52 on the basis of the route determined by the route determiner 53. The navigation device 50 may be realized, for example, by a function of a terminal device such as a smartphone or a tablet terminal carried by the occupant. Further, the navigation device 50 may transmit a current position and a destination to a navigation server via the communication device 20 and acquire a route that is replied from the navigation server.

The MPU 60 functions, for example, as a recommended lane determiner 61 and holds second map information 62 in a storage device such as an HDD or a flash memory. The recommended lane determiner 61 divides the route provided from the navigation device 50 into a plurality of blocks (for example, divides the route every 100 [m] in a progressing direction of the vehicle) and determines a recommended lane for each block by referring to the second map information 62. The recommended lane determiner 61 determines in which lane from the left the host vehicle M travels. The recommended lane determiner 61 determines the recommended lane so that the host vehicle M can travel on a reasonable route for progression to a branch destination when there is a branch place, a merging place, or the like in the route.

The second map information 62 is map information with higher accuracy than the first map information 54. The second map information 62 includes, for example, information on a center of the lane or information on a boundary of the lane. Further, the second map information 62 may include road information, traffic regulation information, address information (an address and postal code), facility information, telephone number information, and the like. The road information includes information indicating types of roads such as highways, toll roads, national highways, and prefectural roads, or information such as the number of lanes of a road, an emergency parking area, a width of each lane, a gradient of the road, a position (three-dimensional coordinates including longitude, latitude, and altitude) of the road, a curvature of curves of a lane, positions of merging and branching points of a lane, and signs provided on the road. The second map information 62 may be updated at any time through access to another device using the communication device 20.

The vehicle sensor 70 includes, for example, a vehicle speed sensor that detects a speed of the host vehicle M, an acceleration sensor that detects an acceleration, a yaw rate sensor that detects an angular speed around a vertical axis, and an orientation sensor that detects a direction of the host vehicle M.

The driving operator 80 may include, for example, an accelerator pedal, a brake pedal, a shift lever, a steering wheel, and other operators. A sensor that detects an operation amount or the presence/absence of an operation is attached to the driving operator 80, and a result of the detection is output to any one or more of the master controller 100, the driving assistance controller 200, the automated driving controller 300, or the travel driving force output device 500, the brake device 510, and the steering device 520.

The in-vehicle camera 90 mainly images, for example, a face of an occupant seated on a seat installed in a vehicle cabin (in particular, an occupant seated on the driver's seat). The in-vehicle camera 90 is, for example, a digital camera using a solid-state imaging element such as a CCD or a CMOS. The in-vehicle camera 90 images, for example, the occupant periodically. A captured image of the in-vehicle camera 90 is output to the master controller 100.

[Various Control Devices]

The vehicle system 1 includes, for example, the master controller 100, the driving assistance controller 200, and the automated driving controller 300 as a configuration of a control system. The master controller 100 may be integrated into either the driving assistance controller 200 or the automated driving controller 300.

[Master Controller]

The master controller 100 performs switching of the level of the driving assistance, control of the HMI 400 related thereto, and the like. The master controller 100 includes, for example, a switching controller 110, an HMI controller 120, an operator status determiner 130, and an occupant status monitor 140. The switching controller 110, the HMI controller 120, the operator status determiner 130, and the occupant status monitor 140 are realized by a processor such as a central processing unit (CPU) or a graphics processing unit (GPU) executing a program. Some or all of these functional units may be realized by hardware such as a large scale integration (LSI), an application specific integrated circuit (ASIC), or a field-programmable gate array (FPGA) or may be realized by software and hardware in cooperation.

The switching controller 110, for example, switches the level of the driving assistance from a state of the manual driving to the first or higher level or from the first or higher level to the manual driving state on the basis of an operation signal input from a predetermined switch (for example, a main switch and an auto switch to be described below) included in the HMI 400. Further, the switching controller 110 may switch the level of the driving assistance from the first or higher level to the manual driving state on the basis of an operation for instructing acceleration, deceleration, or steering with respect to the driving operator 80 such as an accelerator pedal, a brake pedal, and a steering wheel.

For example, in the driving assistance at the first level (driving assistance control), set vehicle speeds (a lower limit speed and an upper limit speed) of the host vehicle M are set in a predetermined speed range (for example, about 50 to 100 [km/h]). These set vehicle speeds may be changed appropriately by an occupant operation.

For example, in the driving assistance at the second level (automated driving control), the set vehicle speeds (the lower limit speed and the upper limit speed) of the host vehicle M are set to a reference speed such as a legal speed. For example, when the host vehicle M travels on a highway, the upper limit speed is set to about 80 [km/h] or 100 [km/h] according to a legal speed of the highway, and the lower limit speed is set to about 50 [km/h].

Further, in the driving assistance at the third level (automated driving control), the same set vehicle speed as that of the driving assistance at the second level is set. The driving assistance at the third level is started, for example, when a speed of a preceding vehicle is equal to or lower than a predetermined speed under the driving assistance at the second level. The preceding vehicle is a vehicle present within a predetermined distance (for example, about 50 [m]) in front of the host vehicle M in the traveling lane (host lane) in which the host vehicle M travels. Further, the predetermined speed is, for example, 60 [km/h].

Further, the switching controller 110 may switch the level of the driving assistance on the basis of the action plan generated by the action plan generator 323. For example, the switching controller 110 may end the driving assistance at a scheduled ending point of the automated driving defined by the action plan.

Further, the switching controller 110 may switch the level of the driving assistance to the third level when the position of the host vehicle M specified by the navigation device 50 is in an area in which a host vehicle position recognizer 322 recognizes the traveling lane of the host vehicle. In other words, the switching controller 110 may switch the level of the driving assistance to the third level when the host vehicle M travels in a section on which information such as the number of lanes or a width of each lane is included in the map information.

The HMI controller 120 causes the HMI 400 to output, for example, a notification relevant to switching of the level of the driving assistance. Further, the HMI controller 120 may cause information on determination results of one or both of the operator status determiner 130 and the occupant status monitor 140 to be output to the HMI 400. Further, the HMI controller 120 may output information received by the HMI 400 to one or both of the driving assistance controller 200 and the automated driving controller 300. Details of a function of the HMI controller 120 will be described below. The HMI 400 is an example of an "receiver" and an "information outputter", and the HMI controller 120 is an example of an "output controller".

The operator status determiner 130, for example, determines whether or not the steering wheel included in the driving operator 80 is in a state in which the steering wheel has been operated (specifically, it is assumed that when an intentional operation is actually performed, this indicates that the steering wheel is in a state in which the steering wheel can be immediately operated, or the steering wheel is in a state in which the steering wheel has been gripped). In the following description, a state in which the steering wheel has been gripped by an occupant will be referred to as "hands-on", and a state in which the steering wheel has not been operated will be referred to as "hands-off". Details of a function of the operator status determiner 130 will be described below.

The occupant status monitor 140 includes, for example, an image processor 140A and a monitoring determiner 140B. The image processor 140A may be included in the in-vehicle camera 90 instead of the occupant status monitor 140. The image processor 140A, for example, analyzes the captured image of the in-vehicle camera 90 and detects a direction of a line of sight or a direction of a face of the driver in the driver's seat. The monitoring determiner 140B determines whether the occupant in the driver's seat is monitoring the surroundings of the host vehicle M on the basis of the direction of the line of sight or the face detected by the image processor 140A. In the following description, a state in which the occupant is monitoring the surroundings of the host vehicle M will be referred to as "eyes on", and a state in which the occupant is not monitoring the surroundings of the host vehicle M will be referred to as "eyes off". Details of a function of the occupant status monitor 140 will be described below. The in-vehicle camera 90 and the image processor 140A are examples of a "direction detector".

[Driving Assistance Controller]

The driving assistance controller 200 executes the ACC, the LKAS, and other driving assistance controls, for example, when the level of the driving assistance of the host vehicle M is the first level. For example, when the driving assistance controller 200 executes the ACC, the driving assistance controller 200 controls the travel driving force output device 500 and the brake device 510 so that the host vehicle M travels in a state in which an inter-vehicle distance between the host vehicle M and the preceding vehicle is kept constant, on the basis of information input from the camera 10, the radar device 12, and the finder 14 via the object recognition device 16. In other words, the driving assistance controller 200 performs acceleration and deceleration control (speed control) based on the inter-vehicle distance between the host vehicle M and the preceding vehicle. Further, when the driving assistance controller 200 executes the LKAS, the driving assistance controller 200 controls the steering device 520 so that the host vehicle M travels while keeping a traveling lane in which the host vehicle M is currently traveling (lane keeping). That is, the driving assistance controller 200 performs steering control for keeping lanes. A type of driving assistance at the first level may include various controls other than automated driving (the driving assistance at the second level and the third level) in which an operation with respect to the driving operator 80 is not required.

[Automated Driving Controller]

The automated driving controller 300 executes the automated driving control when the level of the driving assistance of the host vehicle M is the second level or the third level. The automated driving controller 300 includes, for example, a first controller 320 and a second controller 340. The first controller 320 and the second controller 340 are each realized by a processor such as a CPU or a GPU executing a program. Some or all of these functional units may be realized by hardware such as an LSI, an ASIC, or an FPGA, or may be realized by software and hardware in cooperation. The automated driving controller 300 is an example of an "automated driving controller".

The first controller 320 includes, for example, an outside world recognizer 321, the host vehicle position recognizer 322, and an action plan generator 323.

The outside world recognizer 321 recognizes a state such as a position, a speed, and an acceleration of a nearby vehicle on the basis of information input from the camera 10, the radar device 12, and the finder 14 via the object recognition device 16. The position of the nearby vehicle may be represented by a representative point such as a centroid or a corner of the nearby vehicle or may be represented by an area represented by a contour of the nearby vehicle. The "state" of the nearby vehicle may include an acceleration, a jerk, or an "action state" (for example, whether or not the nearby vehicle is changing lanes or is about to change lanes) of the nearby vehicle.

The outside world recognizer 321 may recognize a position of at least one of the above-described nearby vehicle, an obstacle (for example, a guardrail, a telephone pole, a parked vehicle, a person such as a pedestrian), a road shape, or other objects.

The host vehicle position recognizer 322 recognizes, for example, a lane (traveling lane) in which the host vehicle M is traveling, and a relative position and posture of the host vehicle M with respect to the traveling lane. The host vehicle position recognizer 322, for example, compares a pattern (for example, an arrangement of solid lines and broken lines) of road demarcation lines obtained from the second map information 62 with a pattern of road demarcation lines around the host vehicle M recognized from an image captured by the camera 10 to recognize a traveling lane. In this recognition, the position of the host vehicle M acquired from the navigation device 50 or a result of a process using an INS may be taken into consideration.

Figure 2:
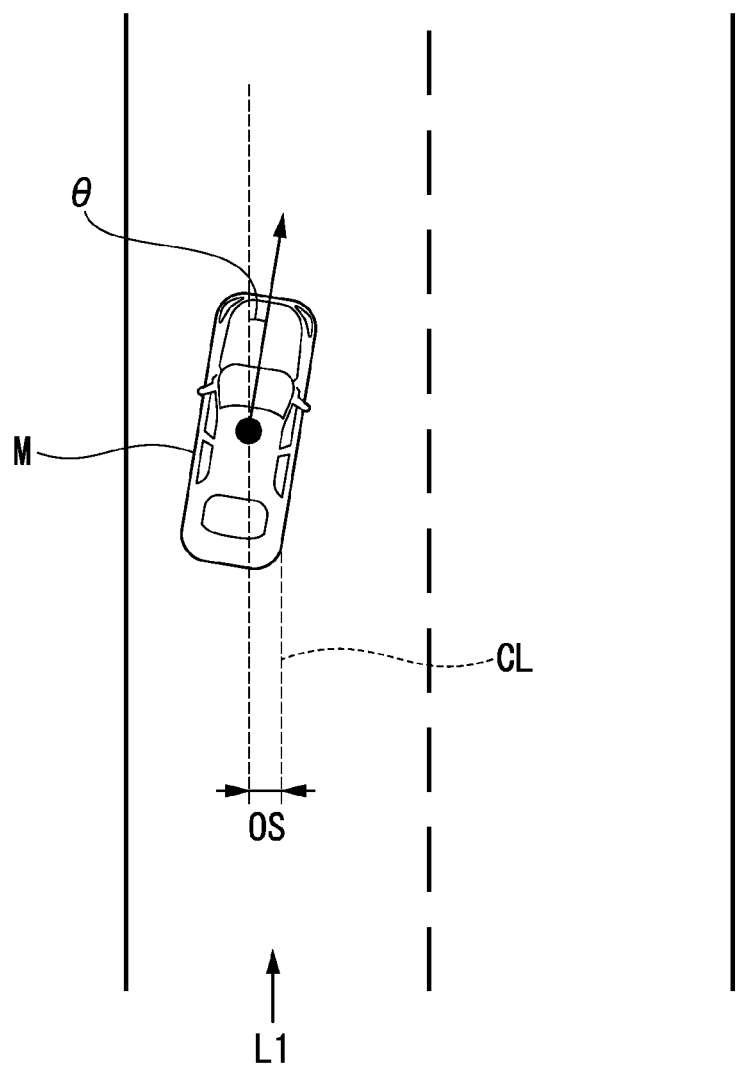
FIG. 2 is a diagram showing a state in which a host vehicle position recognizer 322 recognizes a relative position and posture of a host vehicle M to a traveling lane L1.

The host vehicle position recognizer 322 recognizes, for example, the position or posture of the host vehicle M with respect to the traveling lane. FIG. 2 is a diagram showing a state in which the host vehicle position recognizer 322 recognizes the relative position and posture of the host vehicle M with respect to the traveling lane L1. The host vehicle position recognizer 322, for example, recognizes a deviation OS of a reference point (for example, a centroid) of the host vehicle M from a traveling lane center CL and an angle θ of a progressing direction of the host vehicle M with respect to a line connecting the traveling lane centers CL as the relative position and the posture of the host vehicle M with respect to the traveling lane L1. Alternatively, the host vehicle position recognizer 322 may recognize, for example, a position of the reference point of the host vehicle M relative to any one of side end portions of the traveling lane L1 as the relative position of the host vehicle M with respect to the traveling lane. The relative position of the host vehicle M recognized by the host vehicle position recognizer 322 is provided to the recommended lane determiner 61 and the action plan generator 323.

The action plan generator 323 generates an action plan for the host vehicle M to execute automated driving with respect to a destination or the like. The action plan generator 323 determines events to be sequentially executed in the automated driving so that the host vehicle M travels along the recommended lane determined by the recommended lane determiner 61 and so that the host vehicle M can cope with a situation in the surroundings of the host vehicle M. The events in the automated driving of the embodiment include, for example, a constant-speed traveling event in which the host vehicle M travels on the same traveling lane at a constant speed, a low-speed following event in which the host vehicle M follows a preceding vehicle on the condition of a low speed (for example, 60 [km/h] or less), a lane changing event in which a traveling lane of the host vehicle M is changed, an overtaking event in which the host vehicle M overtakes a preceding vehicle, a merging event in which the host vehicle M is caused to merge at a merging point, a branching event in which the host vehicle M is caused to travel in a target direction at a branching point of a road, and an emergency stopping event in which the host vehicle M is caused to make an emergency stop. Further, an action for avoidance may also be planned on the basis of the situation of the surroundings of the host vehicle M (presence of nearby vehicles or pedestrians, lane narrowing due to road construction, or the like) during execution of these events.

The action plan generator 323 generates a target trajectory on which the host vehicle M will travel in the future. The target trajectory is represented as a sequence of points (trajectory points) that the host vehicle M will reach. The trajectory points are points that the host vehicle M will reach at each predetermined travel distance. Separately, a target speed and a target acceleration at each predetermined sampling time (for example, every several tenths of a [sec]) are generated as a part of the target trajectory. Further, the trajectory point may be a position that the host vehicle M will reach at a predetermined sampling time for each of predetermined sampling times. In this case, information on the target speed or the target acceleration is represented using an interval between the trajectory points.

For example, the action plan generator 323 determines a target speed of the host vehicle M to be in a range of the set vehicle speed corresponding to the level of the driving assistance. For example, when the level of the driving assistance is the first level, the action plan generator 323 determines the target speed to be in a range of 50 to 100 [km/h]. Further, when the level of the driving assistance is the second level, the action plan generator 323 determines the target speed to be in a range of 50 to 80 [km/h] or 50 to 100 [km/h]. Further, the action plan generator 323 determines the target speed to be in a range of 50 to 80 [km/h] or in a range of 50 to 100 [km/h] when the level of the driving assistance is the third level and there is no preceding vehicle similarly to the case in which the level of the driving assistance is the second level, and determines the target speed to be at least equal to or lower than the speed of the preceding vehicle when there is the preceding vehicle.

Figure 3:
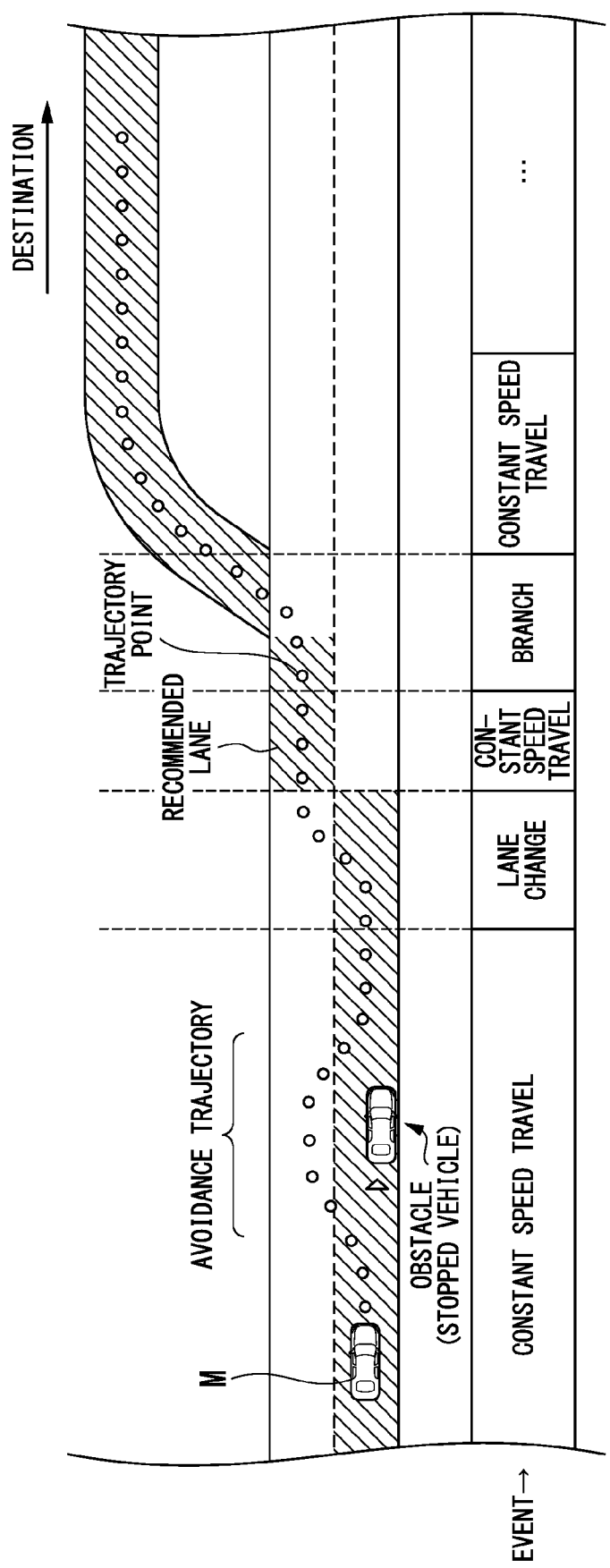
FIG. 3 is a diagram showing a state in which a target trajectory is generated on the basis of a recommended lane.

FIG. 3 is a diagram showing a state in which the target trajectory is generated on the basis of the recommended lane. As shown in FIG. 3, the recommended lane is set so that the recommended lane makes it convenient to travel along the route to the destination. The action plan generator 323 activates a lane changing event, a branching event, a merging event, or the like when the host vehicle reaches a predetermined distance before a switching point of the recommended lane (which may be determined according to a type of event). When it becomes necessary to avoid an obstacle during execution of each event, a target trajectory for avoiding the obstacle is generated as shown in FIG. 3.

Figure 4:
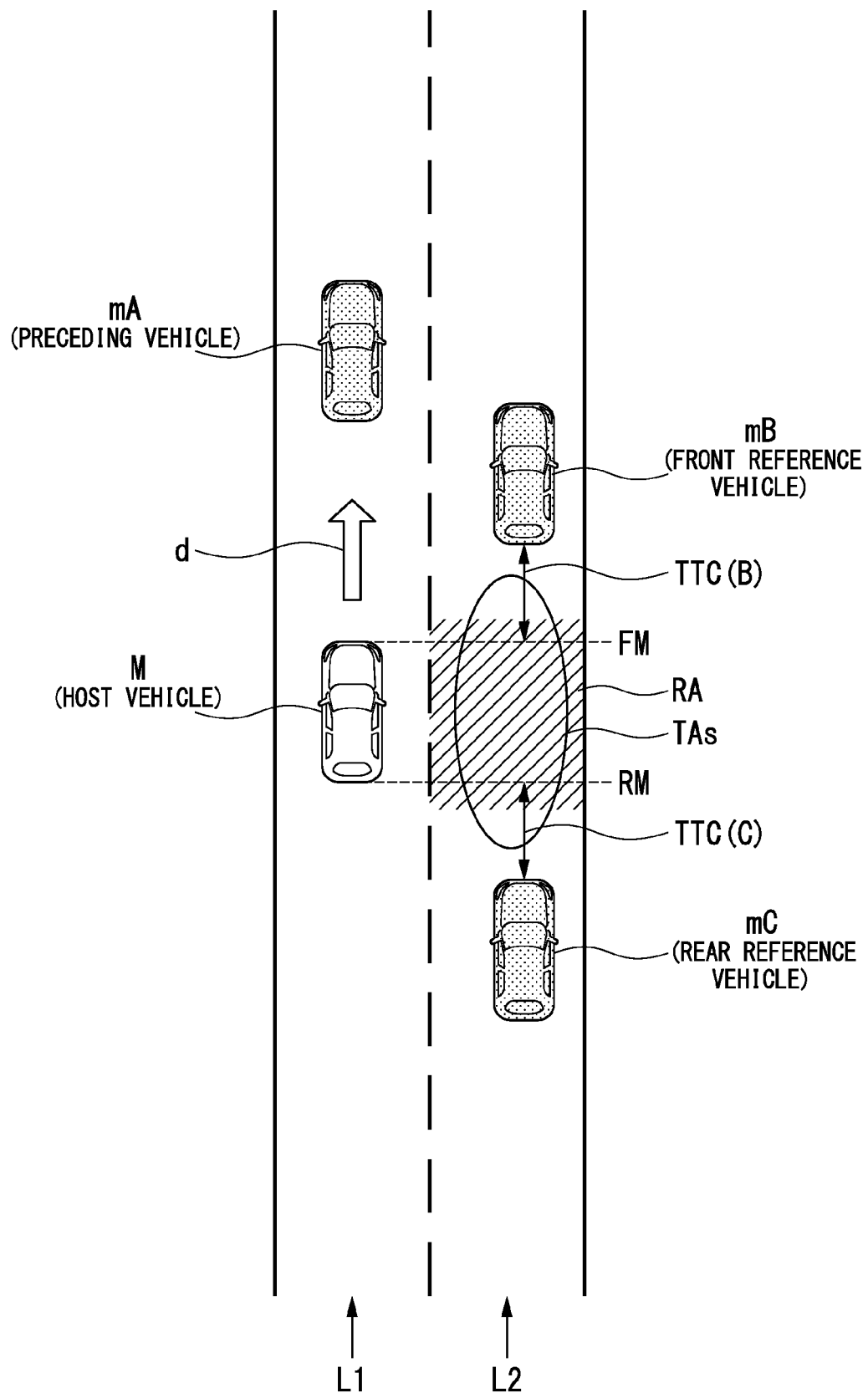
FIG. 4 is a diagram for explaining a process at the time of lane change.
Figure 5:
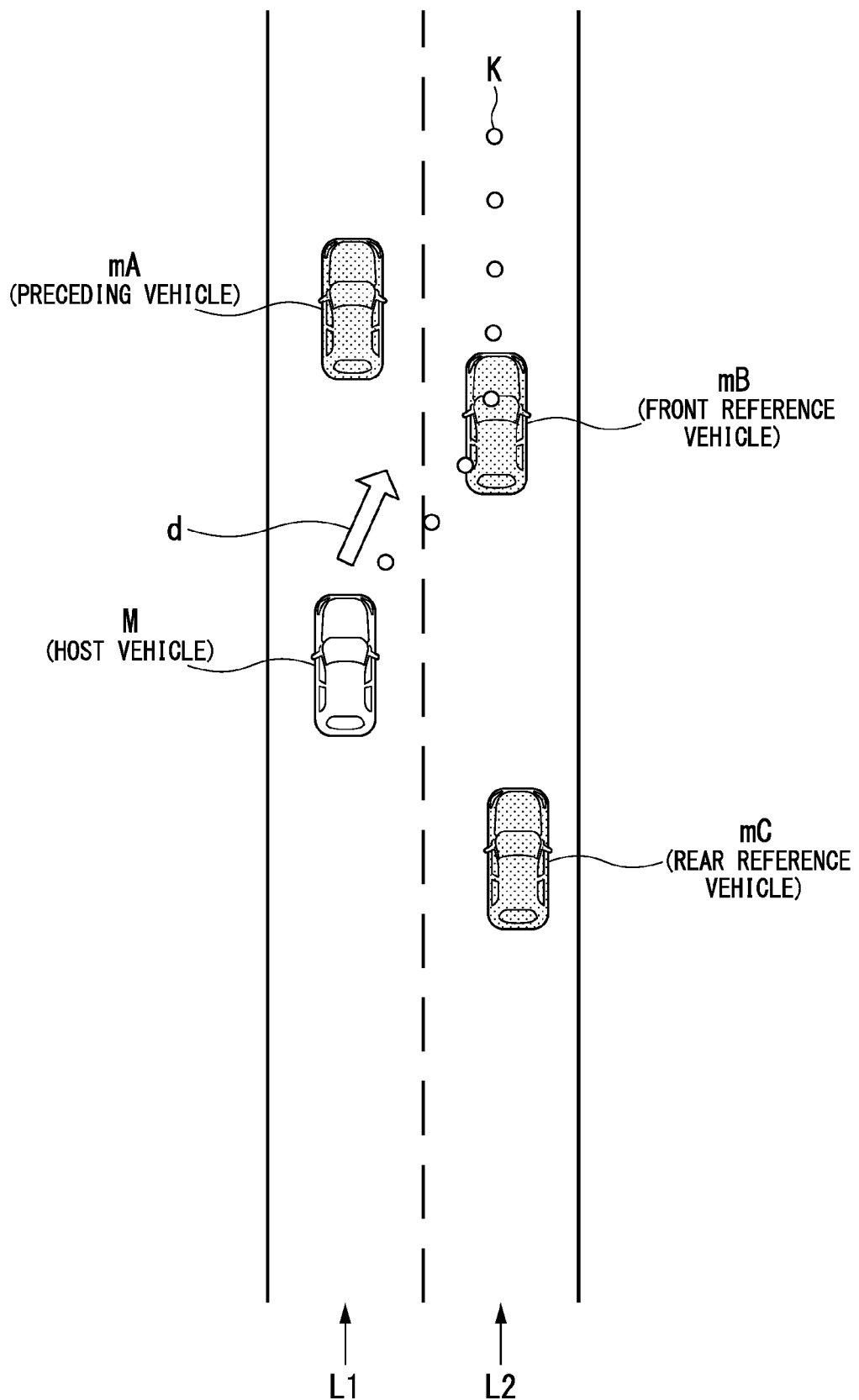
FIG. 5 is a diagram for explaining a process at the time of lane change.

Further, when the action plan generator 323 activates a lane change event, the action plan generator 323 generates a target trajectory for lane change. FIGS. 4 and 5 are diagrams for explaining a process at the time of lane change. First, the action plan generator 323 selects two nearby vehicles from nearby vehicles traveling in an adjacent lane that is adjacent to the host lane L1 in which the host vehicle M travels, which is an adjacent lane L2 that is a lane change destination, and sets the lane change target position TAs set between these nearby vehicles. In the following description, a nearby vehicle traveling immediately in front of the lane change target position TAs in the adjacent lane is referred to as a front reference vehicle mB, and a nearby vehicle traveling immediately behind the lane change target position TAs in the adjacent lane is referred to as a rear reference vehicle mC. The lane change target position TAs is a relative position based on a positional relationship between the host vehicle M, and the front reference vehicle mB and the rear reference vehicle mC.

In the example of FIG. 4, a state in which the action plan generator 323 has set the lane change target position TAs is shown. In FIG. 4, mA denotes a preceding vehicle, mB denotes the front reference vehicle, and mC denotes the rear reference vehicle. Further, an arrow d indicates the progressing (traveling) direction of the host vehicle M. In the example of FIG. 4, the action plan generator 323 sets the lane change target position TAs between the front reference vehicle mB and the rear reference vehicle mC on the adjacent lane L2.

Then, the action plan generator 323 determines whether or not a primary condition for determining whether or not lane change to the lane change target position TAs (that is, between the front reference vehicle mB and the rear reference vehicle mC) is allowed is satisfied.

The primary condition is, for example, that there is no part of the nearby vehicle in a restricted area RA provided in the adjacent lane, and TTCs between the host vehicle M and the front reference vehicle mB and between the host vehicle M and the rear reference vehicle mC are greater than a threshold value. This determination condition is an example of a case in which the lane change target position TAs has been set on the side of the host vehicle M. When the primary condition is not satisfied, the action plan generator 323 sets the lane change target position TAs again. In this case, speed control for waiting until a timing when the lane change target position TAs satisfying the primary condition can be set, or changing the lane change target position TAs and moving the host vehicle M to the side of the lane change target position TAs may be performed.

As shown in FIG. 4, the action plan generator 323, for example, projects the host vehicle M onto the lane L2, which is a lane change destination, and sets the restricted area RA having a slight margin in front of and behind the restricted area RA. The restricted area RA is set as an area extending from one end to the other end in a lateral direction of the lane L2.

When there is no nearby vehicle in the restricted area RA, the action plan generator 323, for example, assumes an extension line FM and an extension line RM obtained by virtually extending a front end and a rear end of the host vehicle M to the lane L2, which is the lane change destination. The action plan generator 323 calculates a collision margin time TTC(B) between the extension line FM and the front reference vehicle mB, and a collision margin time TTC(C) between the extension line RM and the rear reference vehicle mC. The collision margin time TTC(B) is a time derived by dividing a distance between the extension line FM and the front reference vehicle mB by a relative speed between the host vehicle M and the front reference vehicle mB. The collision margin time TTC(C) is a time derived by dividing a distance between the extension line RM and the rear reference vehicle mC by a relative speed between the host vehicle M and the rear reference vehicle mC. The action plan generator 323 determines that the primary condition is satisfied when the collision margin time TTC(B) is larger than a threshold value Th(B) and the collision margin time TTC(C) is larger than a threshold value Th(C). The threshold values Th(B) and Th(C) may be the same value or may be different values.

When the primary condition is satisfied, the action plan generator 323 generates candidates for a trajectory for lane change. In the example of FIG. 5, the action plan generator 323 assumes that the preceding vehicle mA, the front reference vehicle mB, and the rear reference vehicle mC travel with a predetermined speed model, and generates a candidate for a trajectory so that the host vehicle M is positioned between the front reference vehicle mB and the rear reference vehicle mC at a certain future time without interfering with the preceding vehicle mA, on the basis of the speed model for the three vehicles and the speed of the host vehicle M. For example, the action plan generator 323 smoothly connects a current position of the host vehicle M to a position of the forward reference vehicle mB at a certain future time, a center of a lane that is the lane change destination, and an ending point of the lane change using a polynomial curve such as a spline curve, and disposes a predetermined number of trajectory points K on the curve at equal or unequal intervals. In this case, the action plan generator 323 generates a trajectory so that at least one of the trajectory points K is disposed within the lane change target position TAs.

In various scenes, the action plan generator 323 generates a plurality of candidates for the target trajectory and selects an optimal target trajectory suitable for the route to the destination at that time.

The second controller 340 includes, for example, a travel controller 342. The travel controller 342 controls the travel driving force output device 500, the brake device 510, and the steering device 520 so that the host vehicle M passes the target trajectory generated by the action plan generator 323 according to a scheduled time.

The HMI 400 presents various types of information to the occupant in the vehicle and receives an input operation of the occupants. The HMI 400 includes, for example, some or all of various display devices, a light emitter, a speaker, a buzzer, a touch panel, various operation switches, keys, and the like. Further, the HMI 400 may include a part of a seat belt device that holds the occupant seated on the seat with a seat belt. Details of a function of the HMI 400 will be described below.

The travel driving force output device 500 outputs a travel driving force (torque) for travel of the vehicle to driving wheels. The travel driving force output device 500 includes, for example, a combination of an internal combustion engine, an electric motor, a transmission, and the like, and a power ECU that controls these. The power ECU controls the above configuration according to information input from the travel controller 342 or information input from the driving operator 80.

The brake device 510 includes, for example, a brake caliper, a cylinder that transfers hydraulic pressure to the brake caliper, an electric motor that generates the hydraulic pressure in the cylinder, and a brake ECU. The brake ECU controls the electric motor according to information input from the travel controller 342 or information input from the driving operator 80 so that a brake torque according to a braking operation is output to each wheel. The brake device 510 may include a mechanism that transfers the hydraulic pressure generated by an operation of the brake pedal included in the driving operator 80 to the cylinder via a master cylinder, as a backup. The brake device 510 is not limited to the configuration described above but may be an electronically controlled hydraulic brake device that controls an actuator according to information input from the travel controller 342 or information input from the driving operator 80 and transfers the hydraulic pressure of the master cylinder to the cylinder. Further, the brake device 510 may include a plurality of systems of brake devices such as a hydraulic or electric brake device.

The steering device 520 includes, for example, a steering ECU and an electric motor. The electric motor, for example, applies a force to a rack and pinion mechanism to change directions of steerable wheels. The steering ECU drives the electric motor according to the information input from the travel controller 342 or the information input from the driving operator 80 to change the directions of the steerable wheels.

At the time of manual driving, input information from the driving operator 80 is directly output to the travel driving force output device 500, the brake device 510, and the steering device 520. Further, the input information from the driving operator 80 may be output to the travel driving force output device 500, the brake device 510, and the steering device 520 via the automated driving controller 300. Each of ECUs of the travel driving force output device 500, the brake device 510, and the steering device 520 performs each operation on the basis of the input information from the driving operator 80 or the like.

[Configuration of HMI 400]

Figure 6:
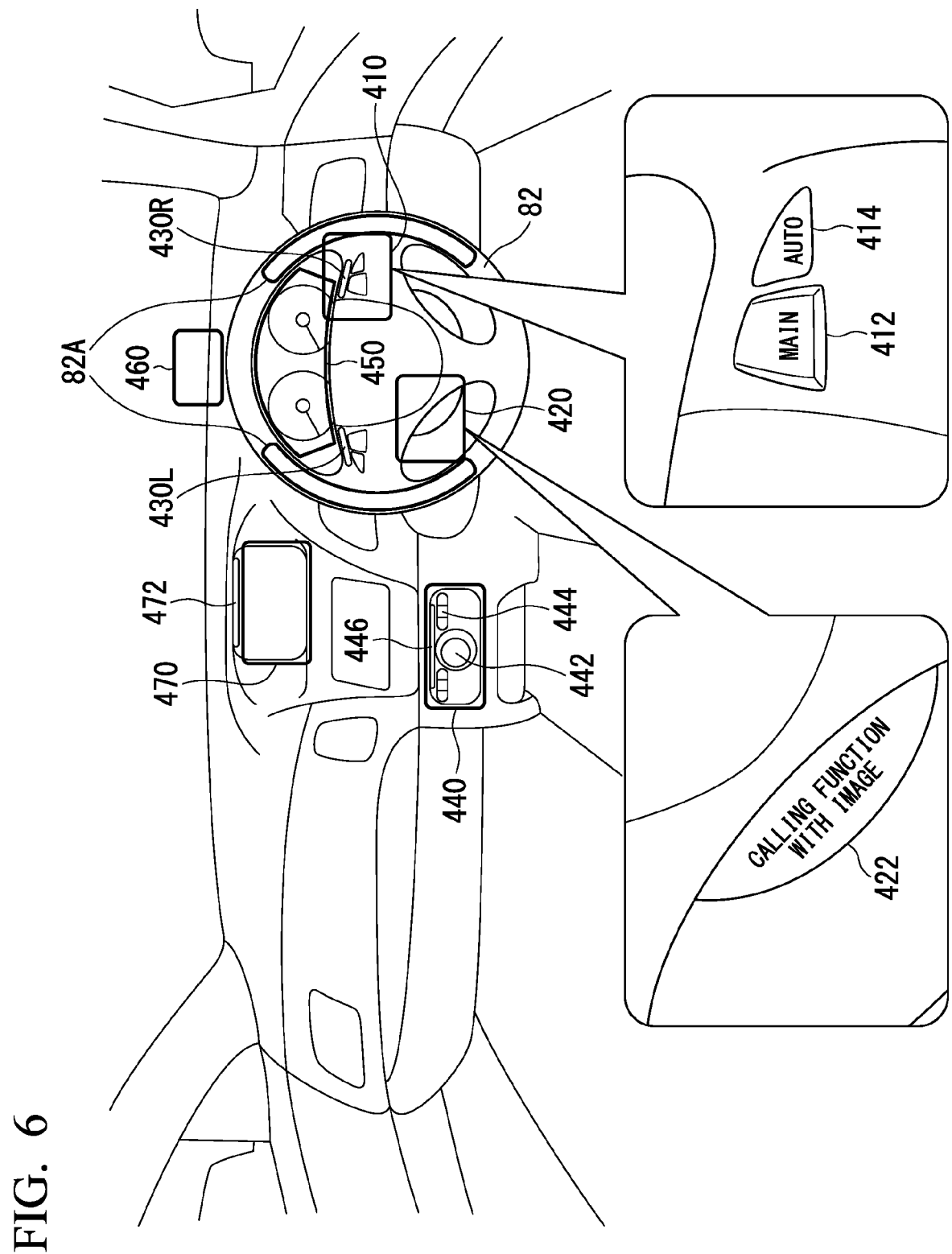
FIG. 6 is a diagram showing an example of an HMI 400 in the host vehicle M.

Hereinafter, a configuration example of the HMI 400 according to the embodiment will be described. FIG. 6 is a diagram showing an example of the HMI 400 in the host vehicle M. The HMI 400 includes, for example, a first operator 410, a second operator 420, light emitters 430R and 430L, a third operator 440, a first display 450, and a head up display (HUD) 460, and a third display 470.

The first operator 410, the second operator 420, and the light emitters 430R and 430L are provided in a steering wheel 82, which is one of the driving operators 80. Further, the steering wheel 82 is provided with a grip sensor 82A. The grip sensor 82A is, for example, a capacitance sensor provided along a circumferential direction of the steering wheel 82. The grip sensor 82A detects that an object has approached or contacted a detection target area as a change in capacitance. The grip sensor 82A outputs a predetermined detection signal to the operator status determiner 130 of the master controller 100 when the detected capacitance is equal to or greater than the threshold value. This threshold value, for example, is set to a value smaller than a capacitance that is generated when the occupant is gripping the steering wheel 82. Further, the grip sensor 82A may output a detection signal indicating the capacitance to the operator status determiner 130 regardless of whether or not the capacitance is equal to or greater than the threshold value.

The first operator 410 includes, for example, a main switch 412 and an auto switch 414. The main switch 412 is a switch for setting a state in which the driving assistance can be started (a standby state). In other words, the main switch 412 is a switch for starting a process (an internal process) in a preparatory stage before the driving assistance is executed or a switch enabling a determination whether or not the driving assistance can be started, which will be described below.

When the main switch 412 is operated, the driving assistance is not started immediately, but pre-processing for executing the driving assistance is performed under the manual driving. The pre-processing is, for example, a process in which the object recognition device 16 is caused to continue an object recognition process (specifically, a sequential recognition process for a target using a Kalman filter) during a predetermined time in advance. When the auto switch 414 is operated after the main switch 412 is operated so that a standby state is reached (that is, after a certain time has elapsed since the main switch 412 has been operated), the driving assistance at the first level, which is the lowest level, is started. That is, the auto switch 414 is a switch for switching from the manual driving to the driving assistance control.

The second operator 420 includes an operation switch 422 for causing providing a calling function with an image (hereinafter also referred to as a videophone) to be started. The light emitters 430R and 430L are disposed, for example, in spoke portions that extend from a central boss portion of the steering wheel 82 to an annular rim portion. A lighting state of the light emitter 330R is controlled through the control of the HMI controller 120.

The third operator 440 includes, for example, a rotation operator 442 and a switch operator 444 that protrude toward the front as viewed from the occupant. The rotation operator 442 is formed in a substantially cylindrical shape and can be rotated through an operation around an axis. The switch operator 444 is provided around the rotation operator 442 or on a top surface of the rotation operator 442. The third operator 440 includes a rotation sensor (not shown) such as an encoder that detects a rotation angle and a rotation speed of the rotation operator 442, and a displacement sensor (not shown) that detects a displacement of the switch operator 444. The third operator 440 outputs a detection value output from each sensor to the master controller 100. The detection value output to the master controller 100 is used for, for example, an operation of an arrow, a selection button, a confirmation button, or the like, or selection or confirmation of input characters output on a screen of the third display 470.

Further, the third operator 440 may be a so-called touch panel type operator in which a selection or confirmation operation or the like is performed by the display screen being touched with a fingertip. A light emitter 446 capable of emitting light in a predetermined color is provided near the third operator 440.

The first display 450 is, for example, a display device that is provided near a front of the driver's seat in an instrument panel and the occupant can visually recognize from an opening of the steering wheel 82 or through the steering wheel 82. The first display 450 is, for example, a liquid crystal display (LCD) or an organic electro luminescence (EL) display device. Information necessary for traveling at the time of the manual driving or the automated driving of the host vehicle M, or information on an instruction to the occupant is displayed in the first display 450. The information necessary for traveling of the host vehicle M at the time of the manual driving is, for example, a speed of the host vehicle M, an engine speed, a remaining amount of fuel, a radiator water temperature, a travel distance, and other information. On the other hand, the information necessary for traveling of the host vehicle M at the time of automated driving is, for example, information such as a future trajectory of the host vehicle M, the level of the driving assistance, and an instruction to the occupant.

The HUD 460 is disposed at a position higher than the first display 450, for example. The HUD 460 projects an image onto a predetermined image former. For example, the HUD 460 projects an image onto a part of the front windshield in front of the driver's seat so that a virtual image is visually recognized by eyes of an occupant seated on the driver's seat. A display area for an image projected by the HUD 460 is smaller than an image display area in the first display 450. This is intended to curb an occupant overlooking an actual object ahead of the image projected by the HUD 460 due to the image. In the embodiment, the front windshield of the host vehicle M may be used as the second display 360 instead of the HUD 460. In this case, for example, a light emitting diode (LED) incorporated in the instrument panel may be caused to emit light, and the light emitted from the LED may be reflected by the front windshield.

The third display 470 is provided in a center portion of the instrument panel. The third display 470 is, for example, an LCD or an organic EL display device. The third display 470 displays, for example, an image corresponding to a navigation process that is executed by the navigation device 50 or a video showing a calling party on a videophone. Further, the second display 360 may display a television program, play a DVD, or display content such as a downloaded movie.

Figure 7:
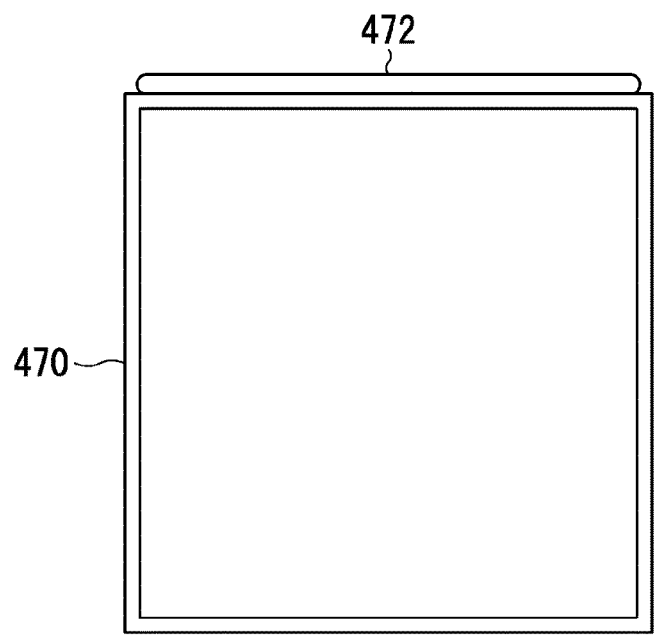
FIG. 7 is a diagram showing one aspect of a positional relationship between a third display 470 and a light emitter 472.

Further, the third display 470 may be provided with the light emitter 472. FIG. 7 is a diagram showing an aspect of a positional relationship between the third display 470 and the light emitter 472. For example, the light emitter 472 is provided in a portion of or near the third display 470. "Near" is a close range in which a shortest distance between the light emitter 472 and the third display 470 is, for example, several [cm] (more specifically, about 3 [cm]) or less. In the example of FIG. 7, for example, a light emitter 472 extending along at least one of sides forming a screen shape of the third display is attached.

Figure 8:
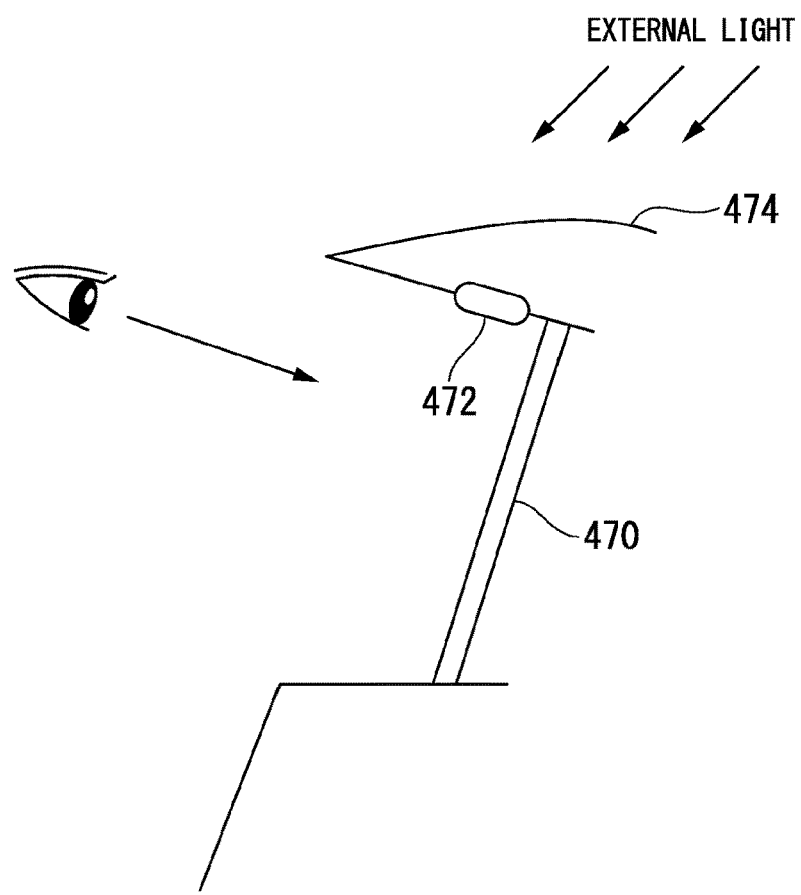
FIG. 8 is a diagram showing another aspect of the positional relationship between the third display 470 and the light emitter 472.

FIG. 8 is a diagram showing another aspect of the positional relationship between the third display 470 and the light emitter 472. In an example of FIG. 8, the third display 470 is provided below a visor 474 of an instrument panel that is present above the third display 470 in front of the third display 470. Further, the light emitted from the light emitter 472 can be visually recognized by the occupant without being blocked by the visor 474. By adopting this configuration, the visor 474 shields external light such as sunlight that comes in the light emitter 472. Accordingly, it is possible to improve visibility of emitted light for the occupant.

The light emitter 472 is controlled by the HMI controller 120 so that the light emitter 472 emits light when the third display 470 is available. "Available" means, for example, that a screen regarding a calling function with an image is allowed to be displayed on the third display 470 due to the second operator 420 being operated, or an image regarding a video or a television program is allowed to be displayed on the third display 470 due to the third operator 440 being operated.

Figure 9:
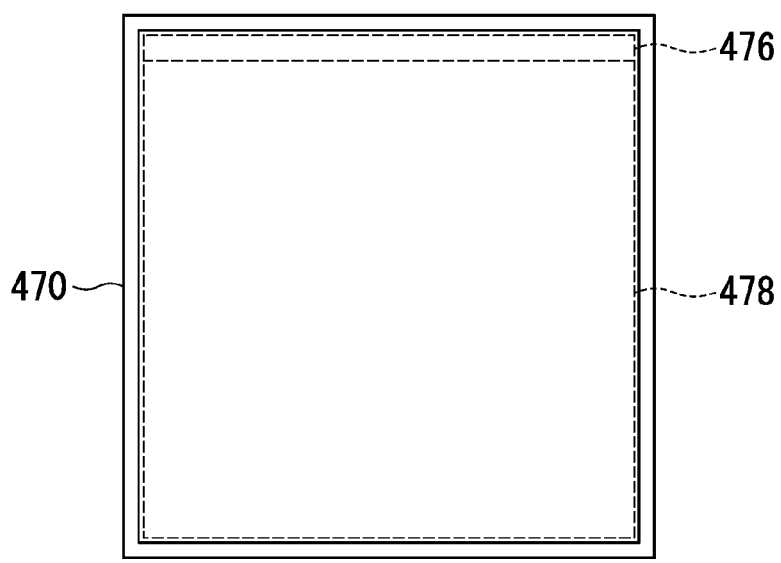
FIG. 9 is a diagram for explaining notifying that the third display 470 is available, by using a partial area of a screen of the third display 470.

FIG. 9 is a diagram for explaining notifying that the third display 470 is available, by using a partial area of the screen of the third display 470. The HMI controller 120 assigns a first display area 476 and a second display area 478 to an entire screen area of the third display 470. The first display area 476 is a pixel area that extends along one of sides of the entire screen of the third display 470. The HMI controller 120 causes the first display area 476 to light up or blink in a predetermined color or pattern when the third display 470 becomes available. Accordingly, it is possible to notify the occupant that the third display 470 is available, without providing the light emitter 472.

Further, the HMI controller 120 displays content operated by the second operator 420 or the third operator 440 or content executed by the operation in the second display area 478.

[Display Control of HMI 400 Relevant to Automated Driving]

Next, display control of the HMI 400 relevant to automated driving will be described. A layout in a display screen to be shown below is merely an example, and can be arbitrarily changed. The layout refers to an arrangement, color, scale, or the like.

Figure 10:
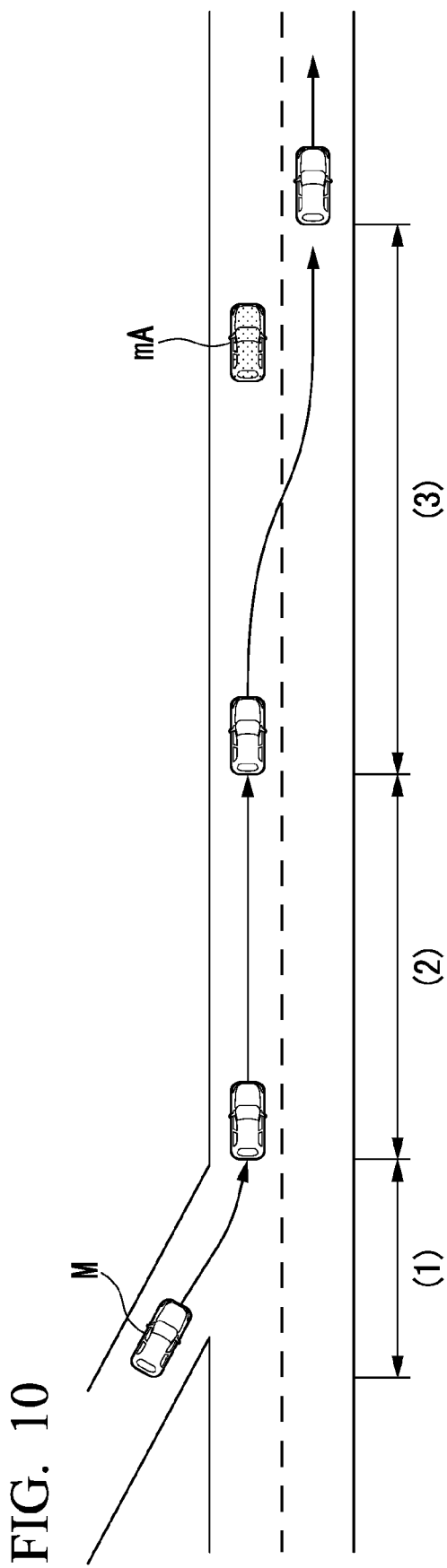
FIG. 10 is a diagram showing various scenes until lane change according to driving assistance is executed after switching from manual driving to the driving assistance has been performed.

FIG. 10 is a diagram showing various scenes until lane change according to the driving assistance is executed after switching from the manual driving to the driving assistance has been performed.

In an example of FIG. 10, a scene (1) is a scene in which the host vehicle M enters a highway from a general road through manual driving. A scene (2) is a scene in which switching from the manual driving to the driving assistance at the first level is performed. A scene (3) is a scene in which the host vehicle M changes lanes through automated driving control. Hereinafter, display control corresponding to each of the scenes (1) to (3) will be described.

<Scene (1)>

Scene (1) is, for example, a scene before the host vehicle M enters the highway. In this scene, since the main switch 412 and the auto switch 414 of the first operator 410 are not operated, the driving assistance is not performed and the manual driving is performed. When the manual driving is performed, the HMI controller 120 causes information necessary for the driver on the driver's seat to manually drive the host vehicle M using the driving operator 80 to be displayed, as an image, on the first display 450. Further, the HMI controller 120 causes a part of information displayed on the first display 450 to be displayed, as an image, on the HUD 460. A screen of this case is shown in FIG. 11.

Figure 11:
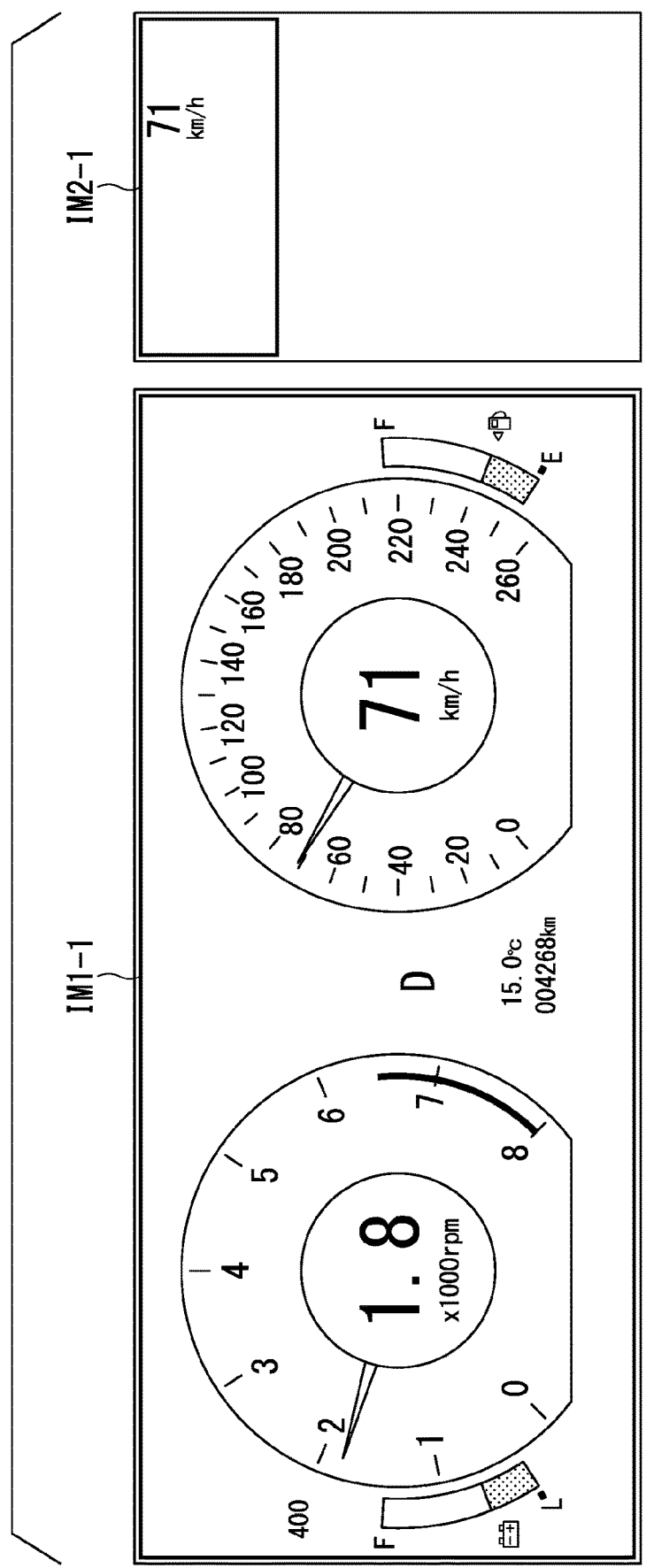
FIG. 11 is a diagram showing an example of a first screen IM1-1 and a second screen IM2-1 that are displayed at the time of manual driving.

FIG. 11 is a diagram showing an example of a first screen IM1-1 and a second screen IM2-1 that are displayed at the time of manual driving. The first screen IM1-1 is a screen that is displayed by the first display 450, and the second screen IM2-1 is a screen that is reflected in the eyes of the occupant by being projected by the HUD 460. The HMI controller 120 causes, for example, information such as a remaining battery amount, a rotational speed, a shift position, a room temperature, a travel distance, a traveling speed, and a remaining fuel amount of the host vehicle M to be displayed on the first screen IM1-1, as information necessary for traveling of the host vehicle M at the time of manual driving. Further, the HMI controller 120 causes speed information in the image displayed on the first screen IM1-1 to be displayed on the second screen IM2-1 in a size smaller than on the first screen IM1-1. As described above, a recognition area of the image reflected in the eyes of the occupant by being projected by the HUD 460 is smaller than an image display area of the first display 450. Therefore, the HMI controller 120 causes relatively detailed information (first information) on the driving assistance of the host vehicle M to be displayed on the first display 450, and simple information on the driving assistance (second information) to be displayed on the HUD 460. The simple information is, for example, information with a smaller information amount than the detailed information. Further, the simple information may be information in which types or the number of items to be displayed is smaller than types and the number of items displayed as the detailed information. Further, the simple information may be an image obtained by reducing resolution, simplifying, or deforming an image that is displayed as the detailed information. Further, the simple information may be highly important information or highly urgent information in the detailed information.

For example, the HMI controller 120 causes information obtained by extracting a part of the detailed information to be displayed as simple information on the HUD 460. For example, in FIG. 11, the HMI controller 120 extracts information indicating the speed of the host vehicle M from the detailed information displayed on the first screen IM1-1, and causes the extracted information to be displayed on the second screen IM2-1. Thus, it is possible to appropriately provide information on the driving assistance and to prevent the eyes of the occupant from getting tired, by displaying the detailed information on the first display 450 and displaying the simple information on the HUD 460.

<Scene (2)>

In scene (2), the host vehicle M enters the highway. When the HMI controller 120 receives that the main switch 412 has been operated by the occupant, the HMI controller 120 changes the screen displayed on the first display 450 and the HUD 460. A screen after the change is shown in FIG. 12.

Figure 12:
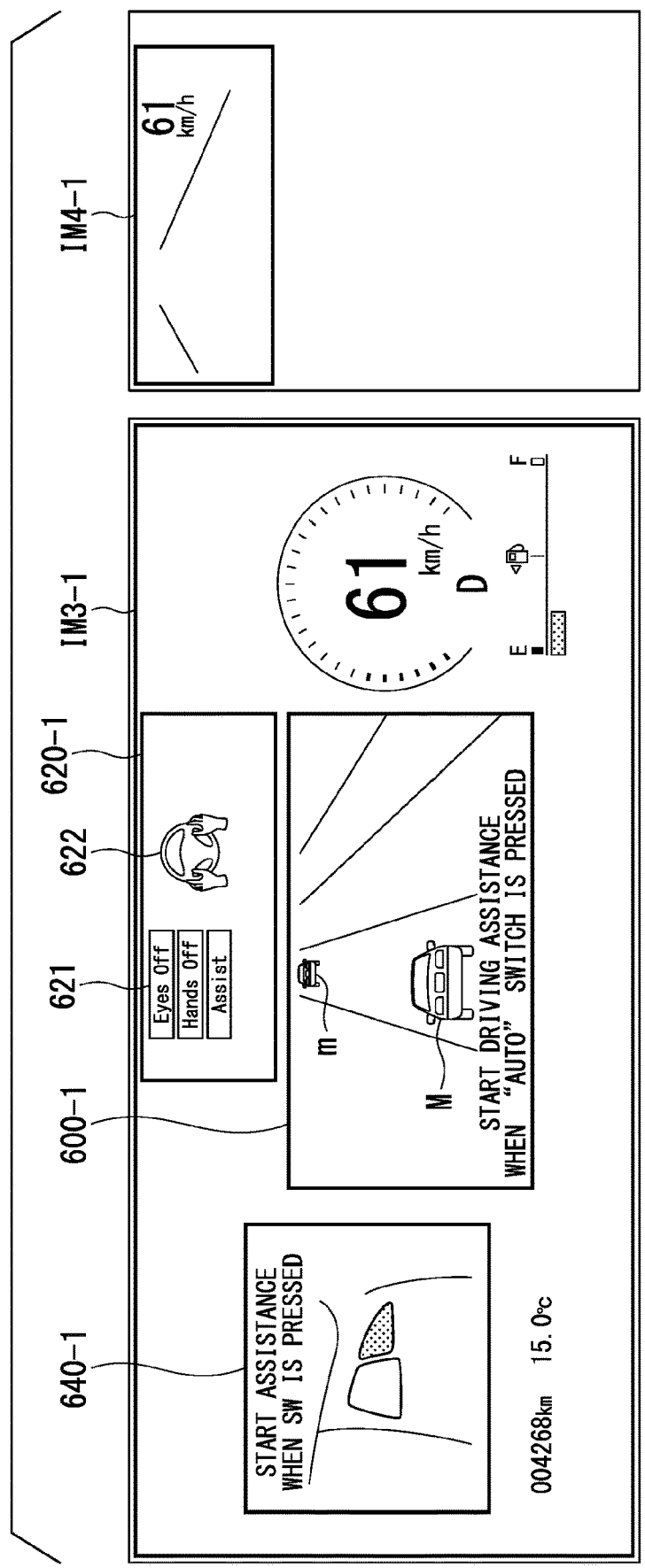
FIG. 12 is a diagram showing an example of a third screen IM3-1 and a fourth screen IM4-1 that are displayed when a main switch 412 has been operated.

FIG. 12 is a diagram showing an example of the third screen IM3-1 and the fourth screen IM4-1 that are displayed when the main switch 412 has been operated. The third screen IM3-1 is a screen that is displayed by the first display 450, and the fourth screen IM4-1 is a screen that is projected by the HUD 460. The same applies to a third screen IM3-X (X is any natural number) and a fourth screen IM4-X shown in the following drawings. The third screen IM3-X and the fourth screen IM4-X are continuously displayed in a state in which the driving assistance can be executed and a state in which the driving assistance is being executed.

A surroundings detection information display area 600-1, a driving assistance state display area 620-1, and a driving assistance start operation guide area 640-1 are included in the third screen IM3-1, as areas in which an indication showing a state in which the driving assistance can be started (a standby state) is displayed. Hereinafter, the respective areas in the third screen IM3-X are referred to as a surroundings detection information display area 600-X, a driving assistance state display area 620-X, and a driving assistance start operation guide area 640-X.

The HMI controller 120 causes, for example, an image showing a shape of a road on which the host vehicle M is traveling, which has been acquired from the second map information 62, an image showing the host vehicle M recognized by the host vehicle position recognizer 322, and an image showing the nearby vehicle m recognized by the outside world recognizer 321 to be displayed in the surroundings detection information display area 600-1. The HMI controller 120 causes an image showing all nearby vehicles m recognized by the outside world recognizer 321 to be displayed on the first display 450. Further, the HMI controller 120 causes only the nearby vehicle m affecting a future trajectory of the host vehicle M among all the nearby vehicles m recognized by the outside world recognizer 321 to be displayed on the first display 450. Accordingly, it is possible to reduce vehicles that are targets to be monitored by the occupant and reduce a monitoring burden.

Further, the HMI controller 120 causes information indicating the level of the driving assistance (including automated driving) that can be executed by the host vehicle M to be displayed in the driving assistance state display area 620-1. In the example of FIG. 12, an image 621 showing three indicators "Assist", "Hands Off", and "Eyes Off" is shown as information indicating the level of the driving assistance. The level of the driving assistance is represented by each indicator alone or a combination of a plurality of indicators.

The indicator "Assist" is an indicator indicating a state (ON state) in which the driving assistance at the first level is being executed, or a state (OFF state) in which transition to the driving assistance at the first level can be made.

The indicator "Hands Off" is an indicator indicating a state (ON state) in which the driving assistance at the second level is being executed, or a state (OFF state) in which transition to the driving assistance at the second level can be made.

The indicator "Eyes Off" is an indicator indicating a state (ON state) in which the driving assistance at the third level is being executed, or a state (OFF state) in which transition to the driving assistance at the third level can be made.

For these indicators, an indicator corresponding to each of the state in which the driving assistance is being executed and the state in which transition to the driving assistance can be made may be prepared. Whether or not the driving assistance at each level is being executed or the transition to the driving assistance at each level can be made can be ascertained by a requested motion notification image 622 to be described below. Each indicator is highlighted, for example, when the driving assistance at a corresponding level has been executed, and is grayed out when transition to the driving assistance at the corresponding level is allowed. The example of FIG. 12 shows that the driving assistance at any level is not executed, that is, manual driving is executed, since all the indicators are grayed out and displayed.

Further, the HMI controller 120 causes the requested motion notification image 622 to be displayed at a display position corresponding to the image 621 showing the three indicators "Assist", "Hands Off", and "Eyes Off" in the driving assistance state display area 620-1. "Corresponding" refers to an aspect in which a correspondence relationship can be recognized by a person, such as there being a guideline indicating horizontal alignment, vertical alignment, and association. As an example, the "display position corresponding to the image 621 of the indicator" is a display position adjacent to the image 621 and refers to a display position separated by a few [cm] or less (for example, 3 [cm] or less) from a display position of the image 621 on at least one of top, bottom, right, and left. The requested motion notification image 622 is, for example, an image showing a predetermined motion that the occupant performs on the driving operator 80. The requested motion notification image 622 includes, for example, an image showing the driving operator 80 and an image showing a predetermined part of the occupant. The requested motion notification image 622 is, for example, an image schematically showing a positional relationship between the steering wheel 82 and the hand of the occupant.

The HMI controller 120 causes information for guidance with respect to a motion of the occupant for starting the driving assistance to be displayed in the driving assistance start operation guide area 640-1. In the example of FIG. 12, in the driving assistance start operation guide area 640-1, the driving assistance being started by the occupant operating the auto switch 414 is guided.

In addition to or instead of causing the driving assistance being started by the occupant operating the auto switch 414 to be displayed in the driving assistance start operation guide area 640-1, the HMI controller 120 causes a sound indicating that the driving assistance is started by the occupant operating the auto switch 414 to be output from the speaker included in the HMI 400.

At least some of pieces of information to be displayed in the surroundings detection information display area 600-1, the driving assistance state display area 620-1, and the driving assistance start operation guide area 640-1 may be displayed in another display area. Further, information on a travel distance, an in-vehicle temperature, a fuel, a speed, and a shift position of the host vehicle M may be displayed in the third screen IM3-1.

The HMI controller 120 causes simple information obtained by extracting a part of the detailed information to be displayed on the fourth screen IM4-1 of the HUD 460 with respect to the detailed information displayed on the third screen IM3-1. Information on a shape of a road in front of the host vehicle M and information on a speed of the host vehicle M in information on the driving assistance displayed on the third screen IM3-1 of the first display 450 are displayed in the fourth screen IM4-1 of the HUD 460.

In the state shown in FIG. 12, when it is detected that the auto switch 414 has been operated by the occupant, the master controller 100 causes the driving assistance controller 200 to execute the driving assistance at the first level. Further, the HMI controller 120 changes the screen displayed on the first display 450 and the HUD 460 to, for example, a screen shown in FIG. 13.

Figure 13:
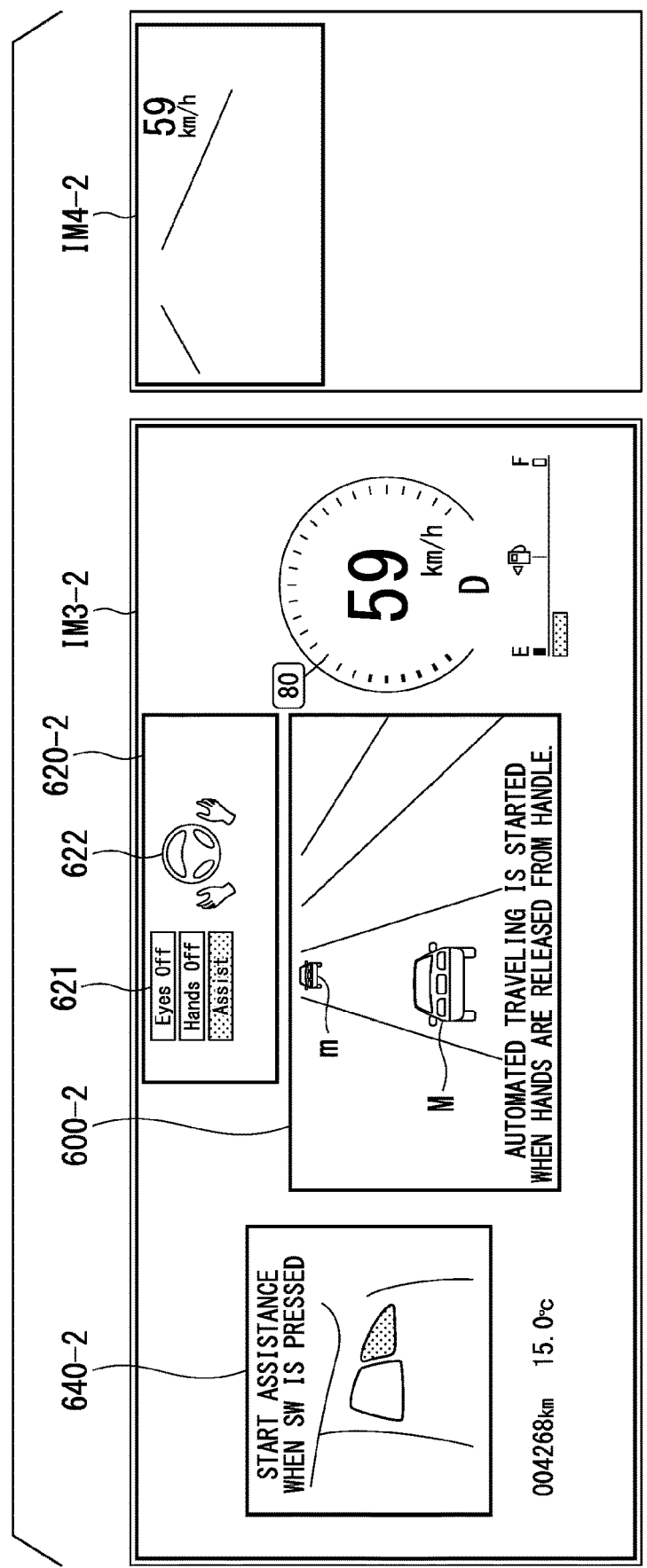
FIG. 13 is a diagram showing an example of a third screen IM3-2 and a fourth screen IM4-2 that are displayed when an auto switch 414 has been operated.

FIG. 13 is a diagram showing an example of screens IM3-2 and IM4-2 that are displayed on the first display 450 and the HUD 460 when the auto switch 414 has been operated. The HMI controller 120 causes an image showing the level of the driving assistance that is being executed to be displayed so that the image can be distinguished from images indicating the other levels of the driving assistance (for example, a highlight display and a gray-out display). For example, the HMI controller 120 causes an indicator "Assist" corresponding to the driving assistance at the first level to be highlighted in the driving assistance state display area 620-2 of the third screen IM3-2. Accordingly, the occupant can ascertain that the driving assistance at the first level is performed.

Here, the HMI controller 120 causes, as the requested motion notification image 622, a moving image for requesting the occupant to perform a motion necessary for transition to the level of the driving assistance (automated driving) corresponding to the "Hands Off" to be displayed as the requested motion notification image 622. The moving image is, for example, an image including a dynamic object in which a predetermined object moves dynamically with time. Further, the moving image may include an animation.

For example, the HMI controller 120 causes the requested motion notification image 622 schematically showing an operation content of the occupant for setting a state in which the hand of the occupant has been released from the steering wheel 82 to be displayed in the driving assistance state display area 620-2 of the third screen IM3-2, as information on a method in which the occupant operates to perform switching to the driving assistance at the second level when the driving assistance at the first level is being executed and the driving assistance at the second level can be executed For example, the HMI controller 120 causes the requested motion notification image 622 schematically showing an operation content of the occupant for setting a state in which the hand of the occupant has been released from the steering wheel 82 to be displayed in the driving assistance state display area 620-2 of the third screen IM3-2, as information on a method in which the occupant operates to perform switching to the driving assistance at the second level when the driving assistance at the first level is being executed and the driving assistance at the second level can be executed Further, the HMI controller 120 may causes an image schematically showing a positional relationship between the accelerator pedal and a foot of the occupant or an image schematically showing a positional relationship between the brake pedal and the foot of the occupant to be displayed as the request operation notification image 623 in the driving assistance state display area 620-2 of the third screen IM3-2.

Further, the HMI controller 120 may cause information indicating that the driving assistance is started to be displayed in the surroundings detection information display area 600-2, by the occupant executing a motion corresponding to the requested motion notification image 622. In the example of FIG. 13, information indicating that the driving assistance ("automated traveling" in FIG. 13) is started by the hand being released from the steering wheel 82 (a "handle" in FIG. 13) is displayed in the surroundings detection information display area 600-2.

Further, the HMI controller 120 may cause the light emitters 430R and 430L provided in the steering wheel 82 to turn on or blink when the HMI controller 120 requests the occupant to perform a motion for releasing the hand from the steering wheel 82.

Further, when the HMI controller 120 requests the occupant to perform a motion for releasing the hand from the steering wheel 82, the HMI controller 120 may cause a sound indicating the fact to be output from the speaker included in the HMI 400. The HMI controller 120 may cause a combination of a display of the requested motion notification image 622, turning-on or blinking of the light emitters 430R and 430L, and a sound output corresponding to the motion for releasing the hand from the steering wheel 82 to be output from various devices.

The HMI controller 120 causes the same information as on the fourth screen IM4-1 to be displayed on the fourth screen IM4-2 of the HUD 460.

Here, the operator status determiner 130 determines whether the occupant is in a hands-on state or a hands-off state on the basis of the presence or absence of the detection signal input from the grip sensor 82A. For example, the operator status determiner 130 has determined that the occupant is in the hands-on state when the detection signal is input from the grip sensor 82A, and determines that the occupant is in the hands-off state when the detection signal is not input. Further, the operator status determiner 130, for example, may determine whether or not the capacitance has changed by a threshold value or more on the basis of a signal intensity of the detection signal input from the grip sensor 82A, and determine that the occupant is in the hands-on state when the capacitance has changed by the threshold value or more.

Further, the operator status determiner 130 may determine whether the occupant is in the hands-on state or the hands-off state on the basis of a steering torque applied to a shaft of the steering wheel 82, a gripping strength of the occupant (a pressure applied to the wheel) when the steering wheel 82 is gripped, or a control amount (a steering amount) of the electric motor in the steering device 520 instead of or in addition to the capacitance.

The switching controller 110 of the master controller 100 receives an indication that the auto switch 414 has been operated, switches the level of the driving assistance to the first level, and then, keeps the first level as the level of the driving assistance until the operator status determiner 130 has determined that the occupant is in the hands-off state. On the other hand, when all conditions for transition to the driving assistance at the second level are satisfied and the operator status determiner 130 has determined that the occupant is in the hands-off state, the switching controller 110 switches the level of the driving assistance from the first level to the second level. Through such control, the driving assistance controller 200 performs the driving assistance control until the occupant enters the hands-off state, a control right is transferred from the driving assistance controller 200 to the automated driving controller 300 when the occupant enters the hands-off state, and the automated driving controller 300 starts automated driving control.

Figure 14:
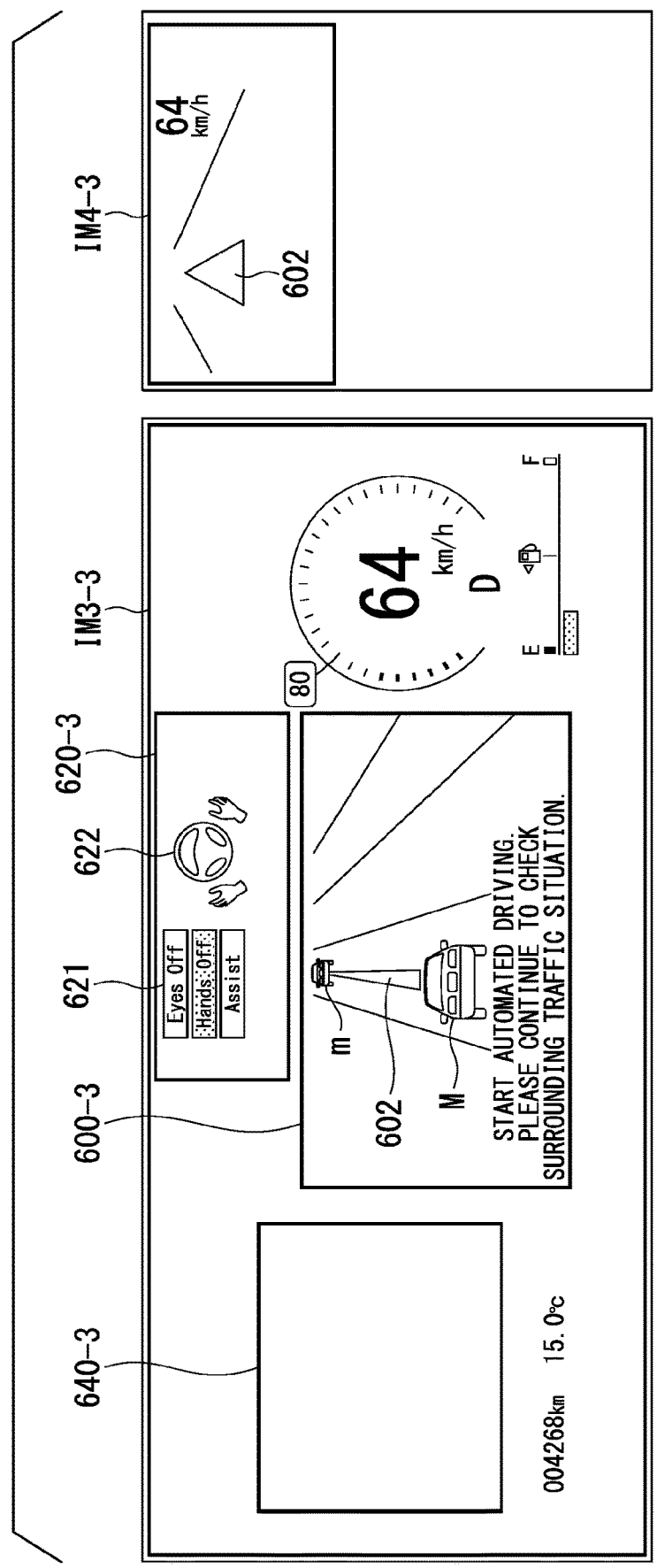
FIG. 14 is a diagram showing an example of a screen that is displayed on a first display 450 and an HUD 460 in driving assistance at a second level.

In a case in which the automated driving controller 300 executes the automated driving control when the level of the driving assistance is the second level, the HMI controller 120 changes the screen displayed on the first display 450 and the HUD 460 to, for example, a screen shown in FIG. 14.

FIG. 14 is a diagram showing an example of a screen that is displayed on the first display 450 and the HUD 460 in the driving assistance at the second level. The HMI controller 120 causes an indicator "Hands Off" corresponding to the driving assistance at the second level to be highlighted in the driving assistance state display area 620-3 of the third screen IM3-3. Accordingly, the occupant can ascertain that the driving assistance at the second level is being performed.

Further, the HMI controller 120 causes, for example, an image showing a shape of a road in front of the host vehicle M, which has been acquired from the second map information 62, the image showing the host vehicle M recognized by the host vehicle position recognizer 322, the image showing the nearby vehicle m recognized by the outside world recognizer 321, and a future trajectory image 602 showing a future trajectory of the host vehicle M generated by the action plan generator 323 to be displayed in a surroundings detection information display area 600-3. Further, the HMI controller 120 causes an indication that the driving assistance ("automated traveling" in FIG. 14) at the second level is started, but the occupant is caused to continuously monitor a surrounding traffic situation to be displayed in the surroundings detection information display area 600-3.

When the level of the driving assistance is the second level, the occupant status monitor 140 of the master controller 100 determines whether the occupant is in the eyes-ON state or in the eyes-OFF state on the basis of the captured image of the in-vehicle camera 90 in order to check whether or not the occupant fulfills the surroundings monitoring obligation. For example, the image processor 140A of the occupant status monitor 140 extracts an image area including a face of the occupant from the captured image of the in-vehicle camera 90, and detects the direction of the line of sight or the face of the occupant on the basis of positions of a pupil, iris, and eye of the occupant in the extracted image area. In this case, the image processor 140A may detect the direction of the line of sight or the face of the occupant of the host vehicle M using, for example, a neural network learned in advance so that a direction of a line of sight or a face of a person is detected.

For example, when the level of the driving assistance is the second level, the monitoring determiner 140B of the occupant status monitor 140 determines whether or not the direction of the face or the line of sight detected by the image processor 140A is in a first angle range 401 with reference to a certain direction, determines that the occupant is in the eyes-ON state when the direction of the face or the line of sight of the occupant is in the first angle range 401, and otherwise, determines that the occupant is in the eyes-OFF state. The "certain direction" with reference to the first angle range 401 is, for example, a direction of the face or line of sight when the occupant is seated on the driver's seat and is directed to the front (to front window shield side). For example, the first angle range 401 is determined to be an angle range when a predetermined angle is formed in a vehicle width direction (a left and right direction when viewed from the occupant) with reference to such a direction. Any direction in the first angle range 401 is an example of a "predetermined direction".

When the monitoring determiner 140B has determined that the occupant is in the eyes-on state, that is, when the occupant fulfills the surroundings monitoring obligation, the switching controller 110 keeps the second level as the level of the driving assistance. In this case, as shown in FIG. 14, nothing is displayed in a driving assistance start operation guide area 640-3 of the third screen IM3-1 of the first display 450, and information on a future trajectory 602 of the host vehicle M is newly displayed in the fourth screen IM4-3 of the HUD 460, in addition to the same information as the fourth screen IM4-2 in FIG. 13.

On the other hand, when the monitoring determiner 140B has determined that the occupant is in the eyes-OFF state, that is, when the occupant does not fulfill the surroundings monitoring obligation, the HMI controller 120 causes an image to be displayed on the first display 450 or the third display 470 of the HMI 400 or a sound to be output from the speaker, thereby warning the occupant so that the occupant monitors the surroundings. When the eyes-off state continues during a predetermined time or more, the switching controller 110 may cause the driving assistance controller 200 to perform the driving assistance control by switching the level of the driving assistance from the second level to the first level.

Further, when the eyes-off state continues during a predetermined time or more after the monitoring determiner 140B determines that the occupant is in the eyes-off state, the switching controller 110 may cause the automated driving controller 300 to perform alternative control instead of performing the automated driving control according to the second level. The alternative control is, for example, automated driving control for causing the host vehicle M to stop in an area in which the host vehicle M is allowed to stop, such as a road shoulder, while causing the host vehicle M to gradually decelerate. Accordingly, for example, when the occupant has lost consciousness and cannot perform surroundings monitoring, the host vehicle M can be stopped without an operation of the occupant. A state in which the alternative control is performed is an example of a "fourth automated driving mode".

Further, when the level of the driving assistance is the third level and the occupant is not obligated to monitor the surroundings, but switching from the driving assistance at the third level to the driving assistance in which the occupant is obliged to monitor the surroundings has been performed, it is necessary for the occupant to rapidly monitor the surroundings. Therefore, the monitoring determiner 140B continues monitoring to check how awake the occupant is. For example, when the level of the driving assistance is the third level, the level of the driving assistance is likely to transition to driving assistance at a lower level, such as the driving assistance at the second level, according to change in surrounding environment. Therefore, the occupant is required to be ready to transition to the surroundings monitoring in case there is a request for surroundings monitoring from the system side. Therefore, the monitoring determiner 140B continues monitoring the occupant even when the occupant is not obligated to monitor the surroundings, and determines whether or not the occupant can rapidly monitor the surroundings.

For example, the monitoring determiner 140B determines whether the direction of the face or line of sight detected by the image processor 140A is in a second angle range 402 wider than the first angle range 401, and determines that the occupant can rapidly monitor the surroundings when the direction of the face or line of sight of the occupant is in the second angle range 402.

FIG. 15 is a diagram schematically showing a structure of a vehicle cabin when the host vehicle M is viewed from above. In FIG. 15, STD indicates a sheet of the driver's seat, and an arrow V indicates an orientation (direction) serving as a reference for the first angle range 401.

For example, the first angle range 401 is determined so that the first display 450 is included in the angle range when the host vehicle M is viewed from above. Further, the second angle range 402 is determined so that both the first display 450 and the third display 470 are at least included in the angle range when the host vehicle M is viewed from above. As shown in FIG. 15, the first angle range 401 and the second angle range 402 do not need to be bilaterally symmetric with respect to a direction V, and the angle ranges may be biased to any one side.

When the monitoring determiner 140B has determined that the occupant can rapidly monitor the surroundings, the switching controller 110 keeps the third level as the level of the driving assistance. On the other hand, when the monitoring determiner 140B has determined that the occupant cannot rapidly monitor the surroundings, the HMI controller 120 causes an image to be displayed on the first display 450 or the third display 470 of the HMI 400 or a sound to be output from the speaker, thereby warning the occupant to be ready so that at least the first display 450 or the third display 470 enters a field of view. When a state in which surroundings monitoring cannot be performed continues during a predetermined time or more, the switching controller 110 may switch the level of the driving assistance from the third level to the second level.

Further, the occupant status monitor 140 may determine how awake the occupant is when the level of the driving assistance is the second level. For example, the monitoring determiner 140B measures a time during which the image processor 140A cannot detect a pupil or iris of the occupant from the captured image of the in-vehicle camera 90, that is, a time during which the occupant closes his or her eyes, and determines that a level of wakefulness of the occupant is lower when the time is longer. Further, the monitoring determiner 140B may determine whether or not the occupant is awake on the basis of a detection result of a pressure sensor (not shown) provided in the sheet STD of the driver's seat. For example, when a change in pressure detected by the pressure sensor is equal to or smaller than a threshold value, the monitoring determiner 140B determines that the occupant is not awake. The in-vehicle camera 90 and the occupant status monitor 140 are examples of a "level-of-wakefulness detector".

The switching controller 110 determines whether the driving assistance at the second level is continued or switching to driving assistance at another level or the manual driving is performed according to the level of the wakefulness of the occupant obtained in the determination process of the occupant status monitor 140. For example, in a case in which the level of the wakefulness when the occupant is awake is 1 and the level of the wakefulness when the occupant is not awake is 0, the switching controller 110 determines that the occupant is awake when a numerical value of the level of the wakefulness is equal to or greater than a certain threshold value (for example, about 0.5) and keeps the level of the driving assistance as the second level.

<Scene (3)>

In scene (3), a state in which the automated driving controller 300 causes the host vehicle M to perform lane change through automated driving control at the time of the driving assistance at the second level is shown. In this case, the HMI controller 120 causes the first display 450 and the HUD 460 to display a screen corresponding to automated driving control for lane change.

For example, the HMI controller 120 causes an image showing the occurrence of the lane change event of the host vehicle M that is executed by the automated driving controller 300 to be displayed in a first aspect at a first timing before a behavior of the host vehicle M changes (for example, at 5 seconds before the behavior changes).

Figure 16:
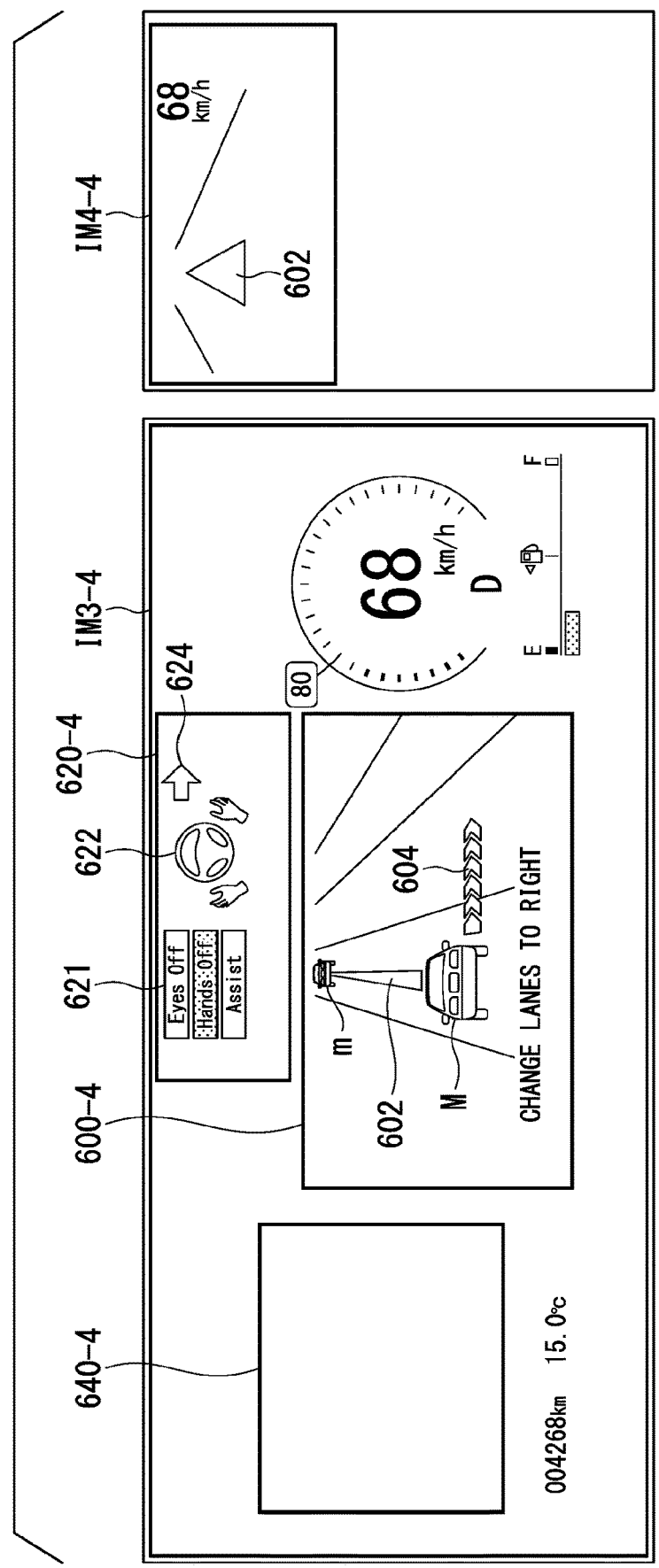
FIG. 16 is a diagram showing an example of a third screen IM3-4 and a fourth screen IM4-4 that are displayed at a first timing before a behavior of the host vehicle M changes.

FIG. 16 is a diagram showing an example of a third screen IM3-4 and a fourth screen IM4-4 that are displayed at the first timing before a behavior of the host vehicle M changes. The HMI controller 120 causes, for example, an image 604 showing a direction in which the host vehicle M changes lanes to be displayed in a surroundings detection information display area 600-4 of the third screen IM3-4, in addition to content displayed in the surroundings detection information display area 600-3. In the example of FIG. 16, an image 604 showing that the host vehicle M performs lane change to a right lane adjacent to the traveling lane is displayed.

The image 604 is, for example, an image that does not include text. In the example of FIG. 16, the image 604 is a figure showing a course change direction of the host vehicle M in a road width direction. The HMI controller 120, for example, imparts an outer frame to the figure indicating the course change direction of the host vehicle M, and causes an imparted outer frame image to be displayed on the first display 450. Further, the HMI controller 120 divides the image 604 into a plurality of areas, imparts an outer frame to each of the divided areas, and causes the resultant image to be displayed. Further, the HMI controller 120 may cause the outer frame of each of the plurality of divided areas to be displayed as an animation displayed sequentially in the course changing direction of the host vehicle M.

Further, the HMI controller 120 causes a blinker indicator 624 indicating course change of the host vehicle M to be displayed in a driving assistance state display area 620-4. The blinker indicator 624 is, for example, a figure such as an arrow indicating a course change direction. The HMI controller 120 causes the blinker indicator 624 to be displayed on the first display 450 at a timing synchronized with the first timing when the image 604 is displayed.

The HMI controller 120 causes the same information as the fourth screen IM4-3 to be displayed on the fourth screen IM4-4 of the HUD 460.

Further, the HMI controller 120 causes an image obtained by highlighting the image 604 to be displayed in the surroundings detection information display area 600-4 at a timing after the first timing, which is a second timing before the behavior of the host vehicle M changes (for example, at two seconds before the behavior changes).

Figure 17:
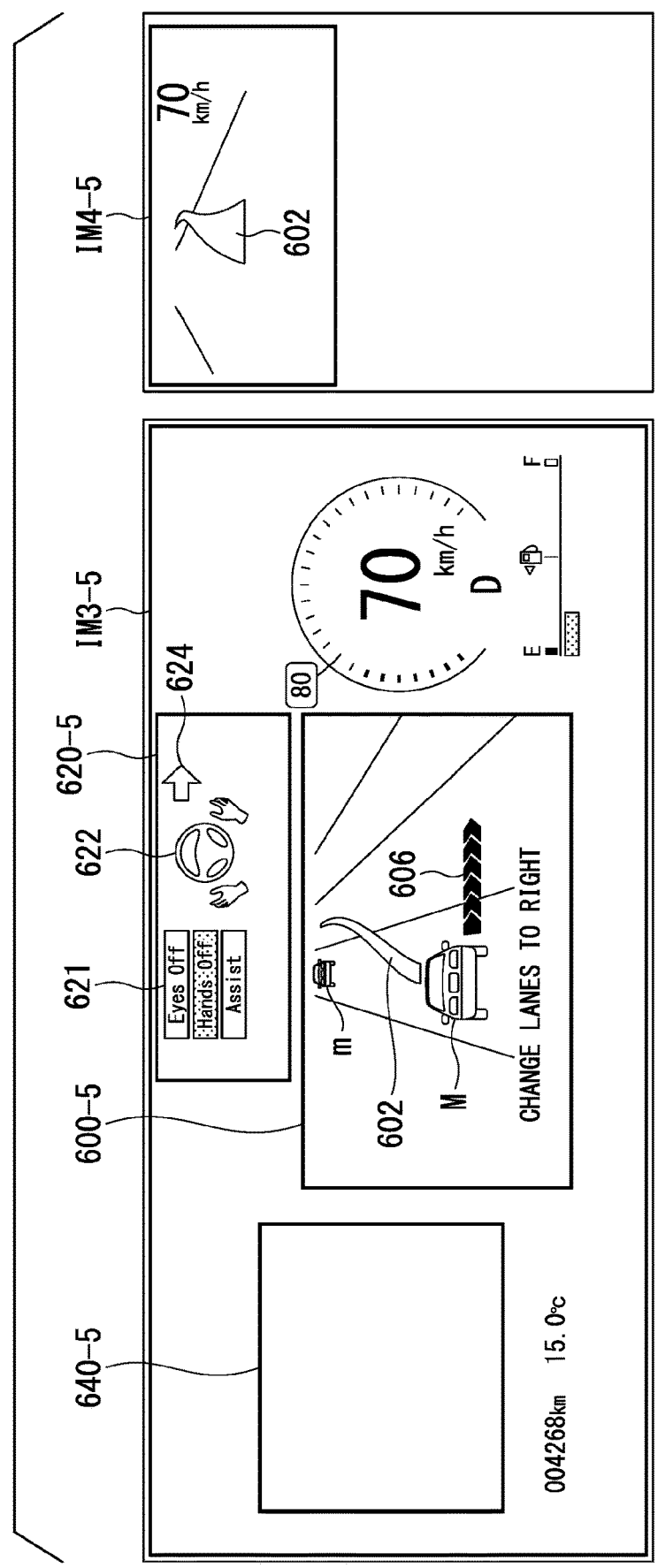
FIG. 17 is a diagram showing an example of a third screen IM3-5 and a fourth screen IM4-5 that are displayed at a second timing before the behavior of the host vehicle M changes.

FIG. 17 is a diagram showing an example of the third screen IM3-5 and the fourth screen IM4-5 that are displayed at the second timing before the behavior of the host vehicle M changes. The HMI controller 120 causes an image 606 obtained by highlighting the image 604 to be displayed in a surroundings detection information display area 600-5 of the third screen IM3-5. The HMI controller 120, for example, causes a display aspect in which the inside of the outer frame of the image 604 is colored to be displayed in the surroundings detection information display area 600-5. Further, the HMI controller 120 may cause the respective outer frames of the plurality of areas divided in the image 604 to be displayed as an animation so that the respective outer frames of the plurality of areas divided in the image 604 are highlighted sequentially in the course change direction of the host vehicle M. Further, the HMI controller 120 may cause the image 606 to be displayed at the first timing and the image 606 to blink at the second timing. Further, the HMI controller 120 may cause the image 606 to be displayed at the first timing and the image 606 to be displayed at the second timing in a color that is more conspicuous than the color displayed at the first timing. Accordingly, the occupant can be caused to intuitively ascertain the course change direction.

Further, the HMI controller 120 changes the future trajectory image 602 displayed in the surroundings detection information display area 600-5 in a direction corresponding to the course change direction at a timing synchronized with the second timing. Accordingly, the occupant can intuitively ascertain that change in the behavior in the lane change of the host vehicle M is started.

The HMI controller 120 causes the same information as the fourth screen IM4-4 to be displayed on the fourth screen IM4-5 of the HUD 460. Further, the HMI controller 120 changes the future trajectory image 602 to be displayed on the fourth screen IM4-5 of the HUD 460 in a direction corresponding to the course change at a timing synchronized with the second timing, and causes the resultant image to be displayed.

As described above, when the lane change is started through the automated driving control at the time of the driving assistance at the second level, that is, when a course direction of the host vehicle M is changed, the occupant status monitor 140 may change one or both of an orientation (direction) serving as a reference of the first angle range 401 and the first angle range 401 according to a future progressing direction of the host vehicle M.

FIG. 18 is a diagram schematically showing a state in which a reference direction of the first angle range 401 is changed at the time of start of lane change. For example, when lane change to the adjacent lane on the right side is scheduled as shown in FIG. 18, a trajectory indicating the course direction of the host vehicle M is displayed on the first display 450, and therefore, it is assumed that the occupant stops front monitoring and monitors a course direction destination. Therefore, the occupant status monitor 140 tilts the direction V serving as the reference of the first angle range 401 toward the course direction (right hand side) of the host vehicle M, thereby moving the first angle range 401 in a direction assumed to be monitored by the occupant. Accordingly, a determination is made that the surroundings monitoring is continued even when the occupant removes his or her line of sight from the front. The occupant status monitor 140 may cope with the occupant removing the line of sight from the front at the time of lane change by expanding the first angle range 401 toward the course direction of the host vehicle M.

<Processing Flow Corresponding to Scenes (1) to (3)>

Figure 19:
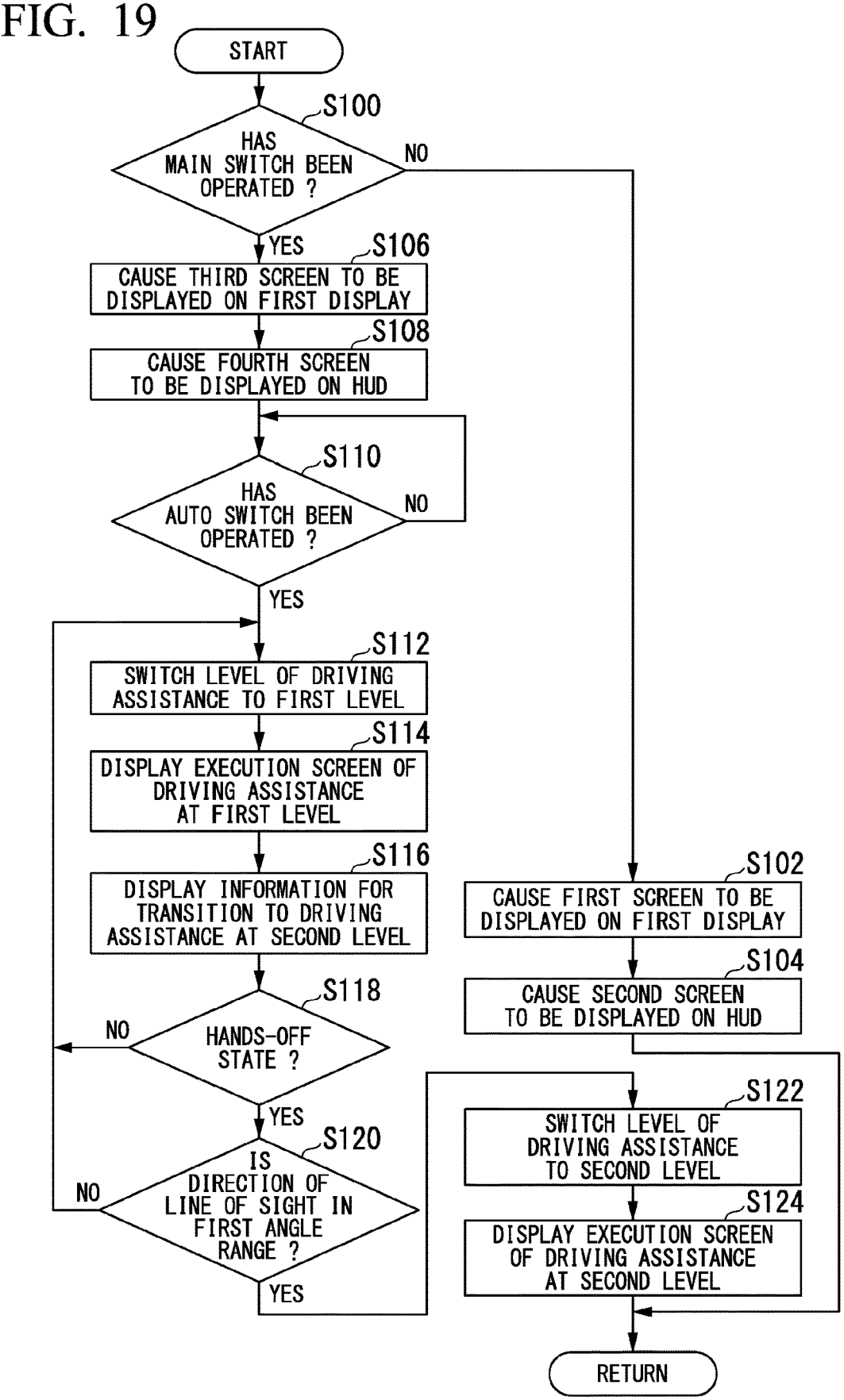
FIG. 19 is a flowchart showing an example of a flow of a process that is executed by a master controller 100 in scenes (1) to (3).

FIG. 19 is a flowchart showing an example of a flow of a process that is executed by the master controller 100 in scenes (1) to (3). The process of this flowchart is executed at the time of manual driving.

First, the HMI controller 120 determines whether or not a main switch 412 has been operated (step S100). When the HMI controller 120 has determined that the main switch 412 has not been operated, the HMI controller 120 causes the first screen IM1-1 to be displayed on the first display 450 (step S102) and causes the second screen IM2-1 to be displayed on HUD 460 (step S104).

On the other hand, when the HMI controller 120 has determined that the main switch 412 has been operated, the HMI controller 120 causes the third screen IM3-1 to be displayed on the first display 450 (step S106), and causes the fourth screen IM4-1 to be displayed on the HUD 460 (step S108).

Then, the switching controller 110 determines whether or not the auto switch 414 has been operated (step S110). When the switching controller 110 has determined that the auto switch 414 has been operated, the switching controller 110 causes the driving assistance controller 200 to start the driving assistance control by performing switching from the manual driving to the first level (step S112).

Then, the HMI controller 120 displays an image showing that the driving assistance at the first level has been executed on the third screen IM3-1 and the fourth screen IM4-1 (step S114). Then, the HMI controller 120 displays information for transition to the driving assistance at the second level on the third screen IM3-2 (step S116).

Then, the operator status determiner 130 determines whether or not the occupant is in the hands-off state (step S118). When the operator status determiner 130 has determined that the occupant is in the hands-on state, the switching controller 110 returns to the process of S112 and keeps the first level as the level of the driving assistance.

On the other hand, when the operator status determiner 130 has determined that the occupant is in the hands-off state, the monitoring determiner 140B determines whether or not a direction of a face or a line of sight of the occupant is in the first angle range 401 (step S120).

When the monitoring determiner 140B has determined that the direction of the face or the line of sight of the occupant is not in the first angle range 401, that is, when the occupant is in the eyes-off state, the switching controller 110 returns to the process of S112 and keeps the first level as the level of the driving assistance.

Further, the monitoring determiner 140B may determine that the occupant is in an eye-OFF state when the image processor 140A does not detect the direction of the face or the line of sight of the occupant during a predetermined time or more.

On the other hand, when the monitoring determiner 140B has determined that the direction of the face or the line of sight of the occupant is in the first angle range 401, that is, when the occupant is in the eyes-on state, the switching controller 110 switches the level of the driving assistance from the first level to the second level (step S122).

Then, the HMI controller 120 causes an image showing that the driving assistance at the second level is being executed to be displayed on the third screen IM3-3 of the first display 450 (step S124). Accordingly, the process of this flowchart ends.

Figure 20:
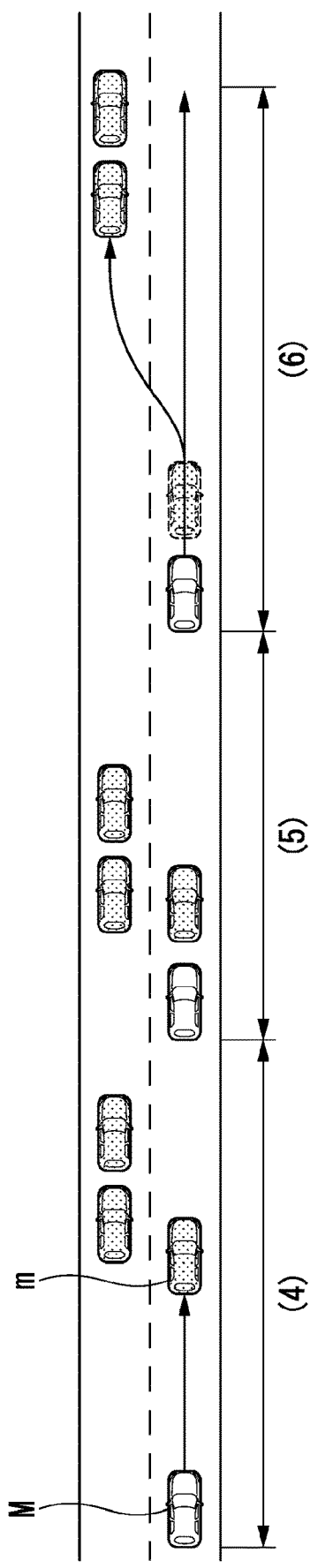
FIG. 20 is a diagram showing various scenes until switching from driving assistance at a second level to driving assistance at a third level is performed and then switching from the driving assistance at the third level to the driving assistance at the second level is performed.

Next, scenes (4) to (6) after transition to the driving assistance at the second level will be described. FIG. 20 is a diagram showing various scenes until switching from the driving assistance at the second level to the driving assistance at the third level is performed and then switching from the driving assistance at the third level to the driving assistance at the second level is performed. In the example of FIG. 20, scene (4) is a scene in which the host vehicle M follows the nearby vehicle m in a traffic jam, and switching from the driving assistance at the second level to the driving assistance at the third level is performed.

Scene (5) is a scene in which low-speed following traveling (TJP; Traffic Jam Pilot), which is an example of the driving assistance at the third level, is being executed. The low-speed following traveling is a control aspect in which the host vehicle follows a preceding vehicle at a predetermined speed or less. The predetermined speed is, for example, 60 [km/h], as described above. The low-speed following traveling is executed when a speed of the preceding vehicle m is equal to or lower than a predetermined speed and an inter-vehicle distance between the host vehicle and the preceding vehicle m is smaller than a predetermined distance (for example, about 50 [m]). In the low-speed following traveling, automated driving in which the occupant is not obligated to monitor the surroundings or automated driving in which a level of surroundings monitoring that the occupant is obligated to perform has been reduced can be realized by continuing relatively easy automated driving control in which the host vehicle M follows the preceding vehicle on a busy road. "The level of surroundings monitoring has been reduced" means that continuing a surroundings monitoring obligation is made easy by expanding the first angle range 401 to the second angle range 402 as described above to increase a space allowed for the direction of the face or line of sight of the occupant. Further, for example, in the low-speed following traveling, the level of the surroundings monitoring obligation may be reduced by making the surroundings monitoring unnecessary until a predetermined time (for example, 5 seconds) elapses from the start of control. The low-speed following traveling may be executed on the condition that the speed of the preceding vehicle m is equal to or lower than the predetermined speed or on the condition that the host vehicle follows a preceding vehicle.

Scene (6) is a scene in which the level of the driving assistance is switched from the driving assistance at the third level to the driving assistance at the second level. Hereinafter, display control corresponding to each of scenes (4) to (6) will be described.

<Scene (4)>

In scene (4), the automated driving controller 300 has not yet reached the low-speed following traveling and is performing acceleration control of the host vehicle M. In this case, the HMI controller 120 causes a screen corresponding to the driving assistance to be displayed on one or both of the first display 450 and the HUD 460.

Figure 21:
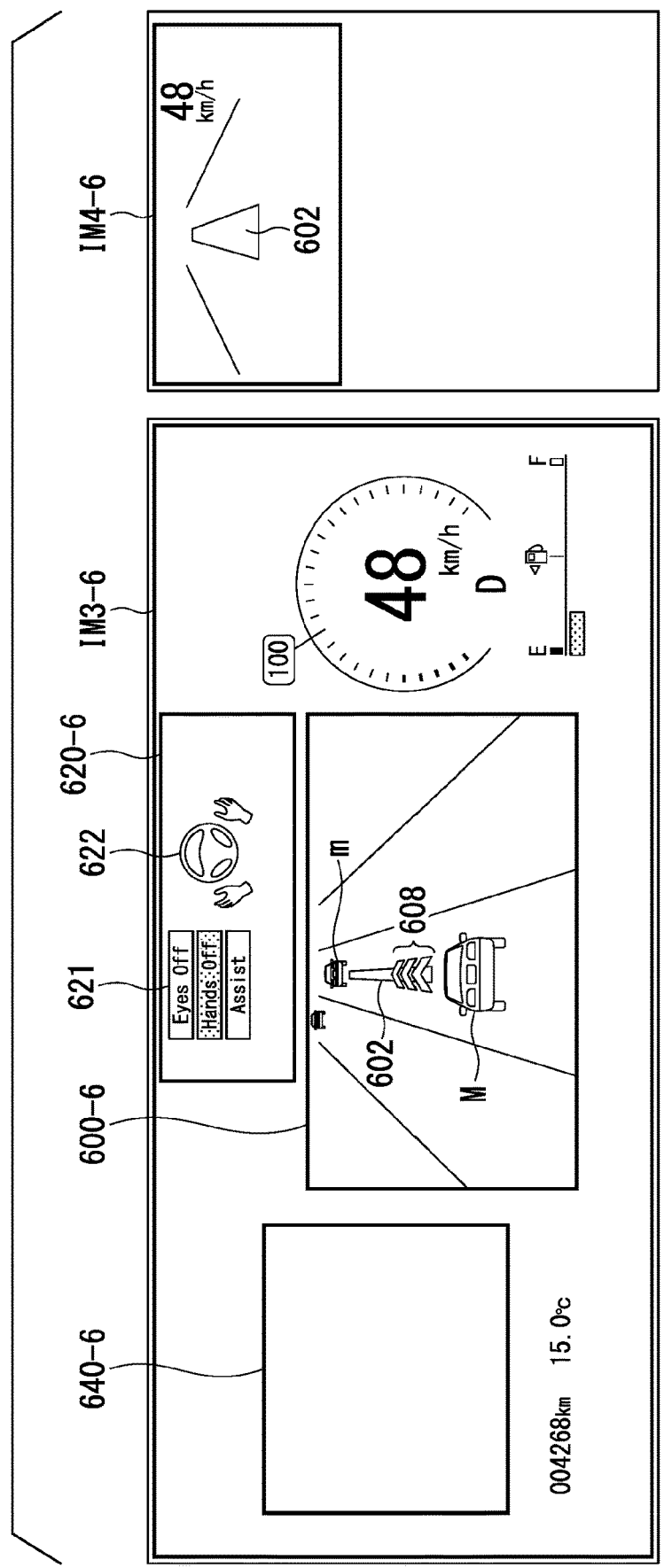
FIG. 21 is a diagram showing an example of a third screen IM3-6 and a fourth screen IM4-6 that are displayed at the time of acceleration control of the host vehicle M.

FIG. 21 is a diagram showing an example of the third screen IM3-6 and the fourth screen IM4-6 that are displayed at the time of acceleration control of the host vehicle M. In a scene shown in FIG. 21, an execution condition for the low-speed following traveling has not yet been satisfied. The HMI controller 120 causes an image 608 showing that the acceleration control is being executed to be displayed in a surroundings detection information display area 600-6 of the third screen IM3-6. The image 608 is a figure showing acceleration of the host vehicle M. The image 608 is displayed in front of the image showing the host vehicle M. In this case, the HMI controller 120 causes the image 608 to be displayed in the first display aspect in which an outer frame of the image 608 has been imparted at the first timing before the host vehicle M accelerates, and causes the image 608 to be displayed in a second display aspect in which the inside of the outer frame of the image is colored at the second timing before the host vehicle M accelerates. Further, the HMI controller 120 may cause an animation in which the image 608 moves in the progressing direction of the host vehicle to be displayed at the time of acceleration. Conversely, the HMI controller 120 may cause an animation in which the image 608 moves toward the host vehicle to be displayed at the time of deceleration. Accordingly, the occupant can intuitively ascertain that the acceleration control of the host vehicle M is performed.

<Scene (5)>

In scene (5), the switching controller 110 switches the level of the driving assistance from the second level to the third level, and the automated driving controller 300 is executing the low-speed following traveling. In this case, the HMI controller 120 causes a screen corresponding to the driving assistance at the third level (the low-speed following traveling) to be displayed on the first display 450 and the HUD 460.

Figure 22:
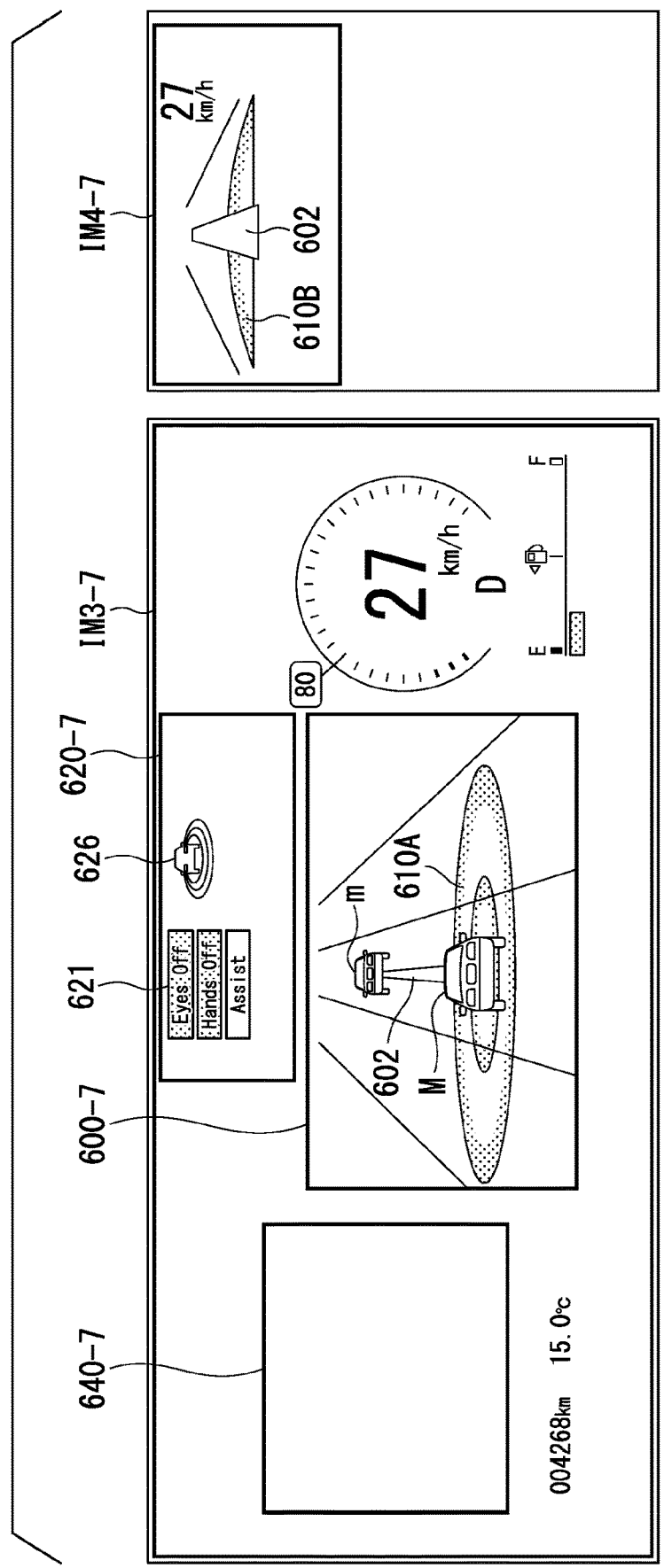
FIG. 22 is a diagram showing an example of a third screen IM3-7 and a fourth screen IM4-7 that are displayed at the time of low-speed following traveling.

FIG. 22 is a diagram showing an example of the third screen IM3-7 and the fourth screen IM4-7 that are displayed at the time of the low-speed following traveling. The HMI controller 120 causes a surroundings detection image 610A indicating that the driving assistance at the third level is being executed to be displayed in a surroundings detection information display area 600-7. The surroundings detection image 610 is an image showing that the surroundings of the host vehicle M are being monitored by the camera 10, the radar device 12, the finder 14, the object recognition device 16, and the outside world recognizer 321. The surroundings detection image 610 is, for example, an animation (moving image) in which ripples spread from a center of the host vehicle M to the outside.

Further, the HMI controller 120 causes, for example, an indicator "Eyes Off" indicating that the occupant is not obligated to monitor the surroundings and an indicator "Hands off" indicating that gripping of the driving operator 80 is not necessary to be highlighted in a driving assistance state display area 620-7 of the third screen IM3-7. Further, the HMI controller 120 causes an image 626 indicating that monitoring the surroundings of the host vehicle M is being performed by the camera 10, the radar device 12, the finder 14, the object recognition device 16, and the outside world recognizer 321 to be displayed in the driving assistance state display area 620-7.

The HMI controller 120 causes an image 610 indicating that the driving assistance at the third level is being executed, in addition to the same information as the fourth screen IM4-6, to be displayed in the fourth screen IM4-7 of the HUD 460.

When the driving assistance at the third level is performed, the occupant is not obligated to monitor the surroundings. Therefore, the occupant can newly use a device installed outside the first angle range 401, such as the third display 470, during automated driving. Therefore, the HMI controller 120 performs control for notifying the occupant of a device that is newly available due to an increase in the level of the driving assistance.

For example, when the switching controller 110 switches the level of the driving assistance from the second level to the third level, the HMI controller 120 controls the light emitter 472 provided in the third display 470 so that the light emitter 472 emits light in predetermined color, thereby notifying the occupant that the third display 470 becomes newly available. Accordingly, the occupant can enjoy content such as a videophone and a television program by using the third display 470.

Further, when it is necessary to operate the third operator 440 in order to perform, for example, selection of the content displayed on the third display 470, the HMI controller 120 causes the light emitter 446 provided in the third operator 440 to emit light with a predetermined color. For example, the HMI controller 120 causes the light emitter 472 and the light emitter 446 to emit light in the same color. Accordingly, the occupant can intuitively ascertain an available device and an operator of the device.

For example, when the third operator 440 has been operated in a state in which the third display 470 is available, the HMI controller 120 displays a screen corresponding to content of the operation on the third display 470. Further, when the operation switch 422 of the second operator 420 has been operated in a state in which the third display 470 is available, the HMI controller 120 displays an image of a calling party on the third display 470. Accordingly, the occupant can enjoy a call while viewing the calling party displayed on the third display 470.

<Scene (6)>

In scene (6), since there is no preceding vehicle that is a low-speed following target, the switching controller 110 switches the level of the driving assistance from the third level to the second level. In this case, the HMI controller 120 causes information for suggesting an occupant's monitoring target or operation target required of the occupant, to be displayed as an image on one or both of the first display 450 or the HUD 460 on the basis of a change in the level of the driving assistance, as shown in FIG. 23.

Figure 23:
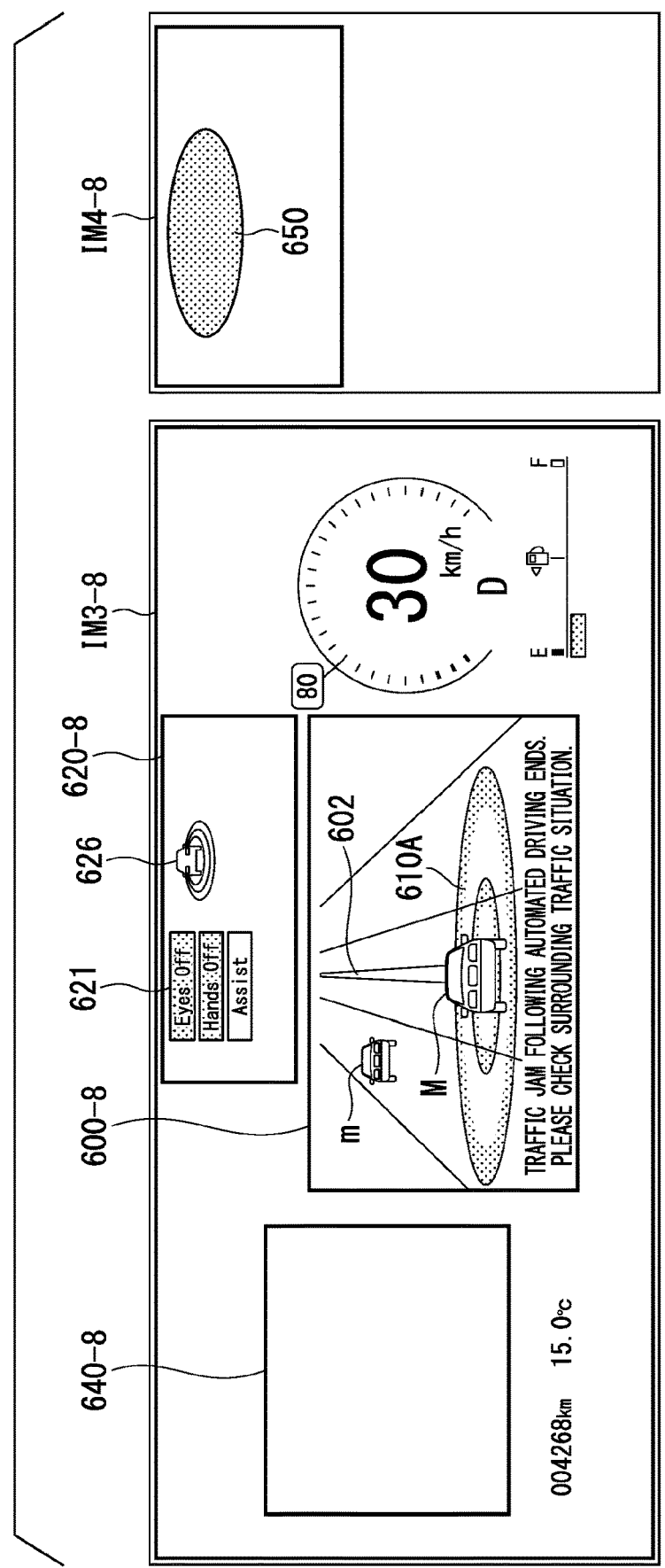
FIG. 23 is a diagram showing an example of a third screen IM3-8 and a fourth screen IM4-8 that are displayed in order to cause the occupant to perform surroundings monitoring.

FIG. 23 is a diagram showing an example of the third screen IM3-8 and the fourth screen IM4-8 that are displayed in order to cause the occupant to perform surroundings monitoring. The HMI controller 120 causes information indicating that the low-speed following traveling ("traffic jam following automated driving" in FIG. 23) ends and information indicating that the occupant is caused to check a surrounding traffic situation to be displayed in a surroundings detection information display area 600-8.

Further, the HMI controller 120 causes a forward gaze request image 650 for requesting the occupant to gaze a forward side from the host vehicle M to be displayed on the fourth screen IM4-8. In the HMI controller 120, for example, the forward gaze request image 650 is an elliptical area indicating a predetermined area in front of the host vehicle M. Further, the forward gaze request image 650 may have a predetermined shape such as a circle or a rectangle, or may be information such as a mark or a symbol character for prompting the occupant to pay attention. Further, the HMI controller 120 causes the forward gaze request image 650 to light up or blink in a predetermined color. Further, the HMI controller 120 may prompt the occupant to gaze the forward side by causing the LED incorporated in the instrument panel to emit light and the emitted light of the LED to be reflected by the front windshield.

When the switching controller 110 switches the level of the driving assistance from the third level to the second level, the HMI controller 120 causes a screen corresponding to the driving assistance at the second level to be displayed on the first display 450 and the HUD 460.

Figure 24:
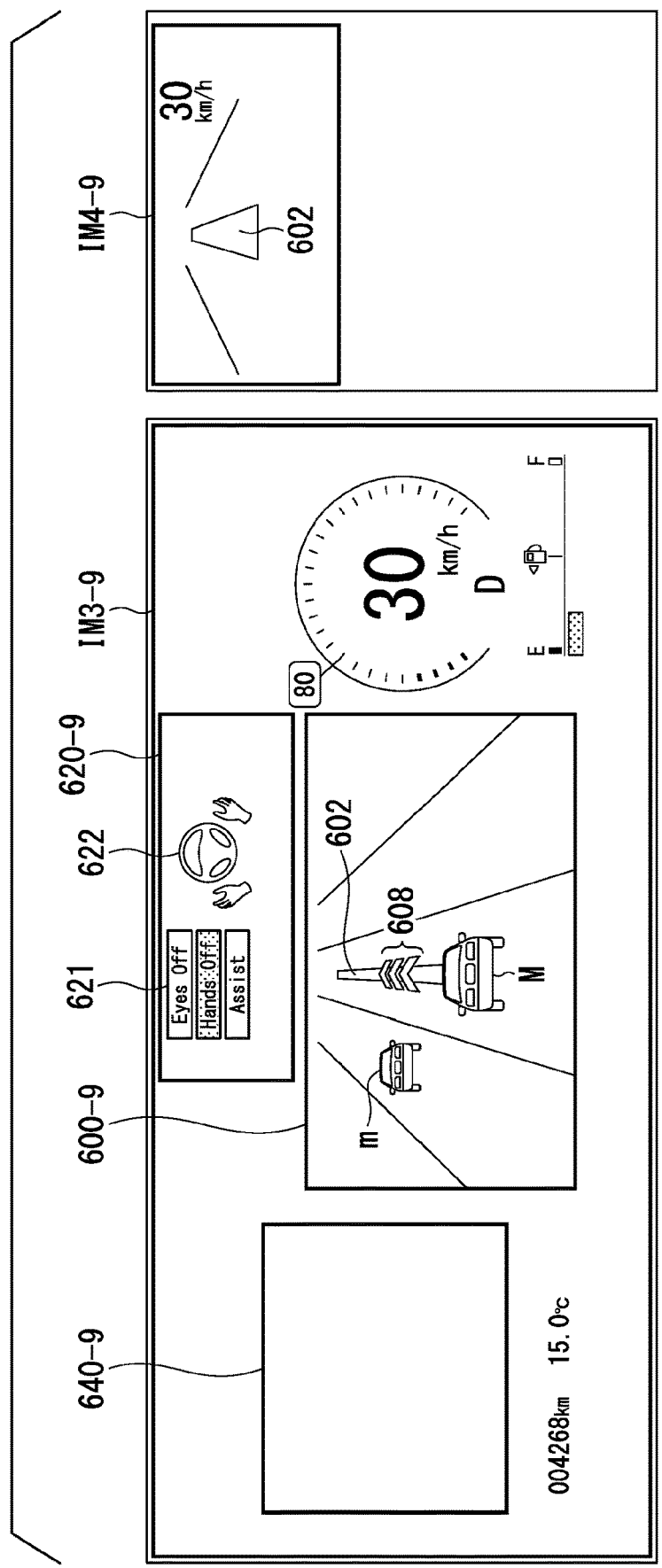
FIG. 24 is a diagram showing an example of a third screen IM3-9 and a fourth screen IM4-9 when switching from the driving assistance at the third level to the driving assistance at the second level has been performed.

FIG. 24 is a diagram showing an example of the third screen IM3-9 and the fourth screen IM4-9 when switching from the driving assistance at the third level to the driving assistance at the second level has been performed. In the example of FIG. 24, an example in which the vehicle accelerates to a target speed (for example, 80 [km/h]) determined by the action plan generator 323 through the driving assistance at the second level is shown. For example, the HMI controller 120 causes the image 608 indicating that acceleration control is being executed to be displayed in a surroundings detection information display area 600H of the third screen IM3-9.

Further, the HMI controller 120 causes an indicator "Hands OFF" corresponding to the driving assistance at the second level to be highlighted in the driving assistance state display area 620-9 of the third screen IM3-9. Further, the HMI controller 120 causes the requested motion notification image 622 indicating motion content of the occupant corresponding to the driving assistance at the second level to be displayed in the driving assistance state display area 620-9. Accordingly, the occupant can intuitively understand that the driving assistance has been switched from the third level to the second level.

<Processing Flow Corresponding to Scenes (4) to (6)>

Figure 25:
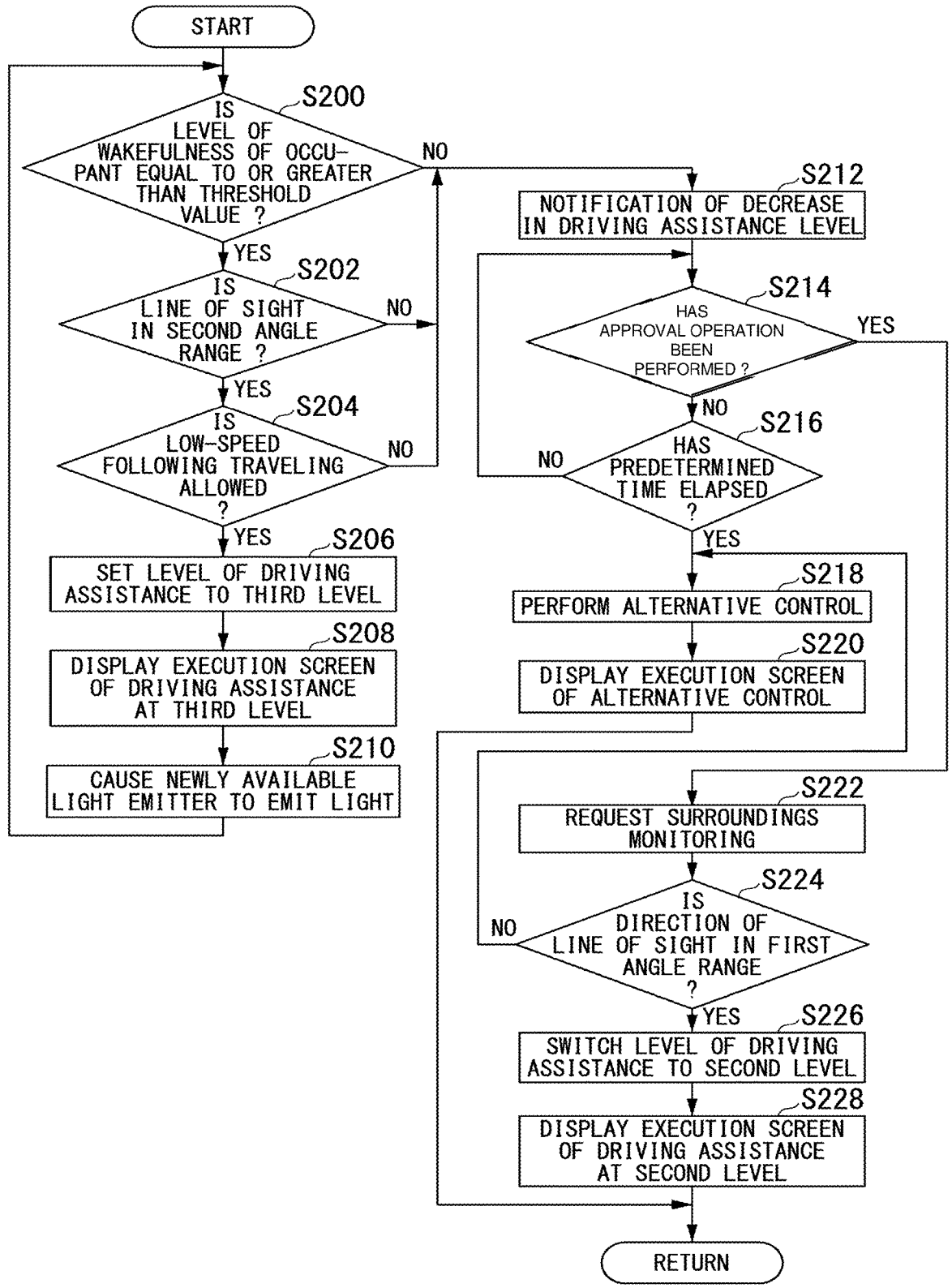
FIG. 25 is a flowchart showing an example of a flow of a process that is executed by the master controller 100 in scenes (4) to (6).

FIG. 25 is a flowchart showing an example of a flow of a process that is executed by the master controller 100 and the automated driving controller 300 in scenes (4) to (6). The process of this flowchart is executed in a case in which the level of the driving assistance is switched to the second level.

First, the occupant status monitor 140 determines whether or not the level of the wakefulness of the occupant who is not obligated to monitor the surroundings is equal to or greater than a threshold value (step S200). When the occupant status monitor 140 has determined that the level of the wakefulness of the occupant is equal to or greater than the threshold value, the occupant status monitor 140 further determines whether the direction of the face or the line of sight of the occupant is in the second angle range 402 (step S202).

When the monitoring determiner 140B has determined that the direction of the face or the line of sight of the occupant is in the second angle range 402, that is, when the occupant is in the eyes-on state, the switching controller 110 determines whether or not the low-speed following traveling is allowed (step S204).

For example, the switching controller 110 determines that the low-speed following traveling is allowed and sets the level of the driving assistance to the third level when a condition that there is a preceding vehicle, a condition that an inter-vehicle distance between the host vehicle M and the preceding vehicle is equal to or smaller than a predetermined distance, and a condition that a speed of the preceding vehicle is equal to or smaller than a threshold value (step S206) are all satisfied.

Then, the HMI controller 120 displays an image showing that the driving assistance at the third level is being executed on the third screen IM3 and the fourth screen IM4 (step S208). Then, the HMI controller 120 causes a light emitter corresponding to a device that becomes newly available due to the level of the driving assistance being switched to the third level to emit light (step S210).

On the other hand, when the level of the wakefulness of the occupant is not equal to or higher than a threshold value, when the direction of the face or line of sight of the occupant is not within the second angle range 402, or when the low-speed following traveling is not allowed, the HMI controller 120 notifies the occupant that transition to automated driving control in which the level of the driving assistance has been decreased is performed, using the HMI 400 (step S212).

Then, the HMI controller 120 determines whether or not an approval operation in response to the level of the driving assistance being decreased has been performed with respect to the HMI 400 by the occupant after the HMI controller 120 has notified the occupant that transition to automated driving control in which the level of the driving assistance has been decreased is performed (step S214).

FIG. 26 is a diagram showing an example of a screen that is displayed on any one of displays of the HMI 400 in order to notify the occupant of the decrease in the level of the driving assistance. As in the shown example, a text "the level of the driving assistance is decreased" is displayed on a screen of the display of the HMI 400. Further, a button (touch detection area) B for requesting approval for the level of the driving assistance being decreased is displayed on this screen. When this button B has been operated, the HMI controller 120 determines that the approval operation has been performed. When another button, switch, or the like has been operated after the notification of the decrease in the level of the driving assistance, the HMI controller 120 may treat this operation as the approval operation.

On the other hand, when the approval operation has not been performed with respect to the HMI 400, the HMI controller 120 determines whether or not a predetermined time has elapsed (step S216). When the HMI controller 120 has determined that the approval operation has not been performed before the predetermined time elapses, the switching controller 110 causes the automated driving controller 300 to perform the alternative control (step S218). In this case, the HMI controller 120 causes a screen showing that the alternative control is being executed to be displayed on each display of the HMI 400 (step S220).

On the other hand, when the HMI controller 120 has determined that the approval operation has been performed before the predetermined time elapses, the HMI controller 120 requests the occupant to monitor the surroundings using the HMI 400 (step S22).

The occupant status monitor 140 determines whether or not the direction of the face or line of sight of the occupant has fallen in the first angle range 401 before the predetermined time elapses, as a result of the request for surrounding monitoring (step S224).

When the direction of the face or the line of sight of the occupant does not fall in the first angle range 401 before the predetermined time elapses or when the occupant status monitor 140 does not detect the direction of the face or line of sight of the occupant, the switching controller 110 proceeds to the process of step S218. When the direction of the face or the line of sight of the occupant does not fall in the first angle range 401 or when the occupant status monitor 140 does not detect the direction of the face or line of sight of the occupant, the automated driving controller 300 may not proceed to the process of S218 and may continue driving assistance at the third level. In this case, the action plan generator 323 of the automated driving controller 300 determines a target speed when the driving assistance at the third level is continued, to be a speed equal to or lower than a reference speed (that is, 80 [km/h] or 100 [km/h]) or a speed equal to or lower than a current speed of the host vehicle M (that is, a speed equal to or lower than 60 [km/h]). Accordingly, when the occupant is not in the eyes-on state, the host vehicle M can be caused to accelerate relatively gently without causing the host vehicle M to accelerate to an original speed determined as an upper limit speed of the driving assistance at the third level or the vehicle can be caused to travel so that a current vehicle speed is kept. A state in which the driving assistance at the third level (automated driving) is continued at the target speed equal to or lower than the reference speed or equal to or lower than the current speed of the host vehicle M is an example of a "third automated driving mode".

On the other hand, when the direction of the face or the line of sight of the occupant has fallen in the first angle range 401 before the predetermined time elapses, the switching controller 110 switches the level of the driving assistance from the third level to the second level (step S226). Then, the HMI controller 120 displays the image showing that the driving assistance at the second level is being executed on the third screen IM3 and the fourth screen IM4 (step S228). Accordingly, the process of this flowchart ends.

Figure 27:
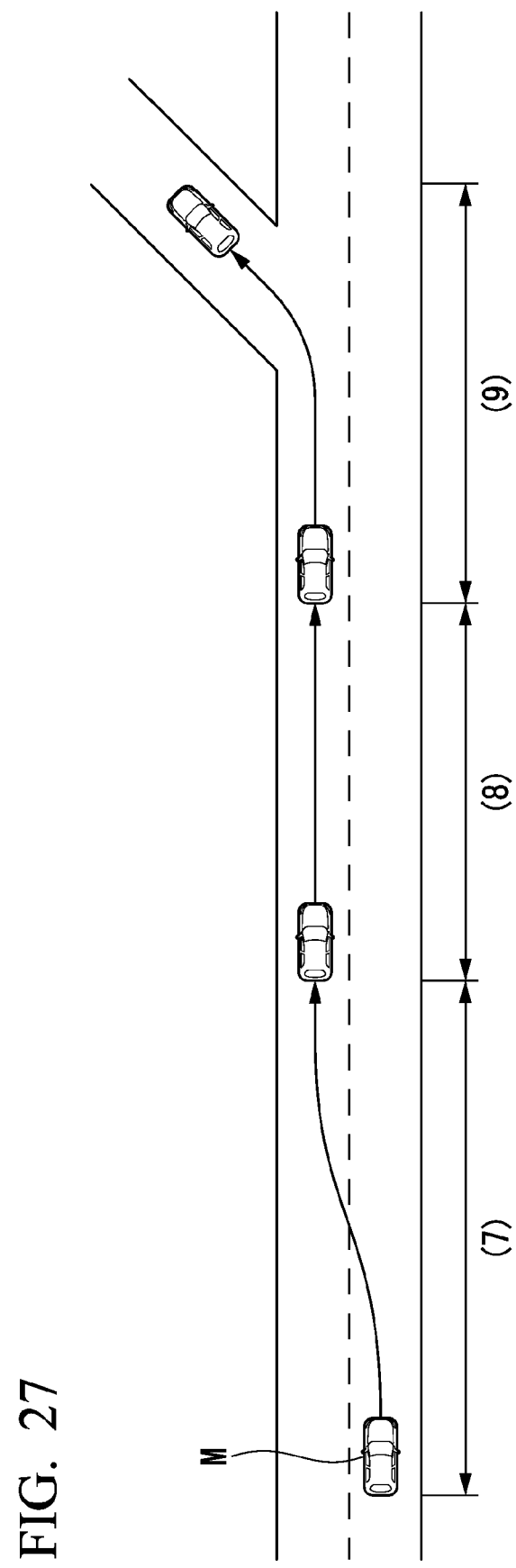
FIG. 27 is a diagram showing various scenes until switching from the driving assistance at the second level to traveling according to manual driving is performed.

Next, scenes (7) to (9) will be described. FIG. 27 is a diagram showing various scenes until switching from the driving assistance at the second level to traveling according to manual driving is performed. In the example of FIG. 27, scene (7) is a scene in which the host vehicle M performs lane change for getting out of the highway on the basis of the action plan. Scene (8) is a scene in which the host vehicle M is switched to the manual driving. Scene (9) is a scene in which the host vehicle M moves from the highway to a general road through manual driving. Hereinafter, display control corresponding to each of scenes (7) to (9) will be described.

<Scene (7)>

In scene (7), the automated driving controller 300 performs the driving assistance for lane change of the host vehicle M to the left side. In this case, the HMI controller 120 causes the screen corresponding to the driving assistance to be displayed on one or both of the first display 450 and the HUD 460. Specific description of a display example at the time of start of the lane change and the time of execution of the lane change will be omitted since content of the lane change of the host vehicle M to the right lane shown in FIGS. 16 and 17 is replaced with lane change to a left lane and the same display is performed.

<Scene (8)>

In scene (8), the automated driving controller 300 performs control for switching of the host vehicle M to the manual driving. In this case, the HMI controller 120 displays an image for causing the occupant to execute manual driving on one or both of the first display 450 and the HUD 460.

Figure 28:
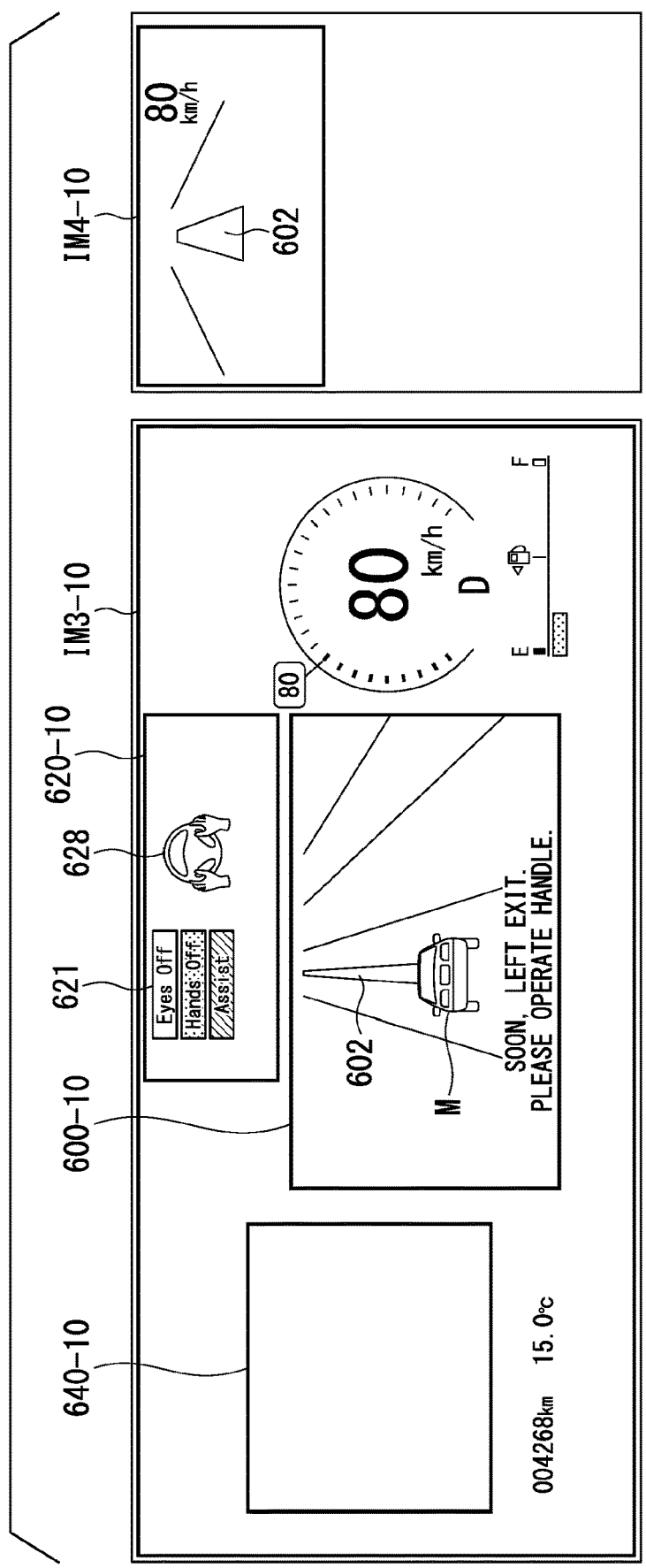
FIG. 28 is a diagram showing an example of a third screen IM3-10 and a fourth screen IM4-10 that are displayed at the time of a request for switching to manual driving.

FIG. 28 is a diagram showing an example of a third screen IM3-10 and a fourth screen IM4-10 that are displayed at the time of a request for switching to a time of manual driving. The HMI controller 120 causes a requested motion notification image 628 indicating that the occupant is requested to perform hands-on (grip the steering wheel 82) to be displayed in the surroundings detection information display area 600-10 of the third screen IM3-10 since the host vehicle M is approaching an exit of the highway. Further, the HMI controller 120 may cause an animation in which an image showing the hand of the occupant approaches from the image showing the steering wheel 82 to be displayed as the requested motion notification image 628.

Further, the HMI controller 120 causes an image of "Hands OFF" corresponding to the driving assistance at the second level and an image of "Assist" corresponding to the driving assistance at the first level to be highlighted in a driving assistance state display area 620-10 of the third screen IM3-10.

Here, the operator status determiner 130 determines whether or not the occupant is in the hands-on state. When the operator status determiner 130 does not determine that the occupant is in the hands-on state even after a predetermined time has elapsed, the HMI controller 120 causes an image for causing the occupant to execute the manual driving, for example, by strengthening a warning step by step as shown in FIG. 29 to be displayed on one or both of the first display 450 and the HUD 460.

Figure 29:
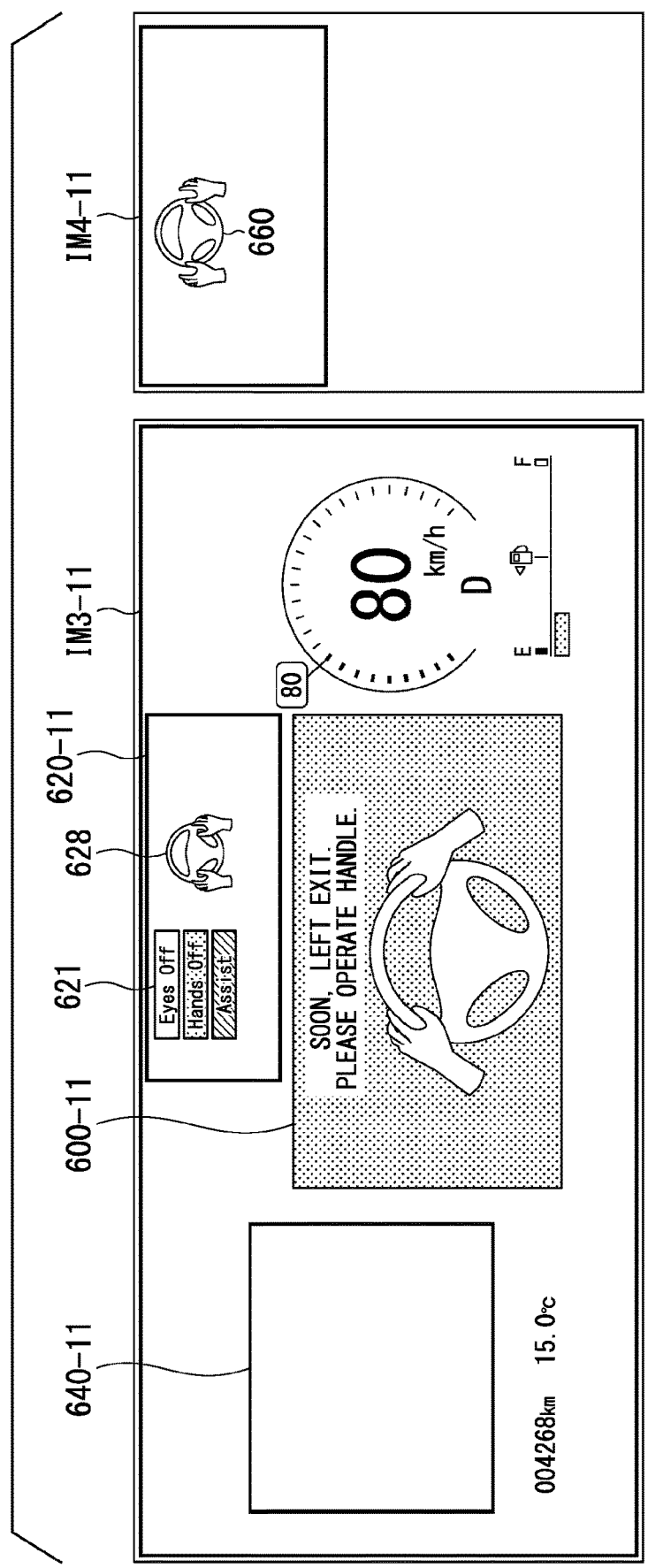
FIG. 29 is a diagram showing an example of a third screen IM3-11 and a fourth screen IM4-11 in which a warning for causing the occupant to execute manual driving is strengthened.

FIG. 29 is a diagram showing an example of a third screen IM3-11 and a fourth screen IM4-11 in which a warning for causing the occupant to execute manual driving is strengthened. For example, the HMI controller 120 causes information for suggesting a monitoring target or an operation target that will be monitored by the occupant to be displayed in the driving assistance state display area 600-11 of the third screen IM3-11 so that the information is highlighted as compared with the display of the surrounding situation of the host vehicle M. Specifically, the HMI controller 120 causes information indicating that the occupant is caused to operate the steering wheel 82, instead of the image showing the shape of the road in front of the host vehicle M, the image showing the host vehicle M, and an image showing a future trajectory of the host vehicle M, to be superimposed and displayed in the driving assistance state display area 600-11 of the third screen IM-11.

Further, the HMI controller 120 causes a requested motion notification image 660 schematically showing the positional relationship between the steering wheel 82 and the hand of the occupant to be displayed on the fourth screen IM4-11. The HMI controller 120 may cause an animation in which the image showing the hand of the occupant approaches and grips the image showing the steering wheel 82 to be displayed as the requested motion notification image 660. Further, the HMI controller 120 may perform a warning through voice or the like in order to cause the occupant to grip the steering wheel 82.

Further, the HMI controller 120 causes the light emitters 430R and 430L provided in the steering wheel 82 to emit light, blink, or stop light emission in order to cause the occupant to grip the steering wheel 82. Accordingly, it is possible to make it easy for the occupant to recognize content required of the occupant with the change in the level of the driving assistance.

For example, when the HMI controller 120 requests the occupant to perform hands-on in a state in which the light emitters 430R and 430L emit light or blink according to the level of the driving assistance of the host vehicle M, the HMI controller 120 makes a light emission state of the light emitters 430R and 430L different from a current light emission state. For example, the HMI controller 120 changes at least one of light emission, blinking, light emission color, and light emission luminance of the light emitters 430R and 430L with respect to the current light emission state.

Further, the HMI controller 120 causes the light emitters 430R and 430L to emit light, blink, or stop the light emission when the level of the driving assistance changes to a lower level than a current level of the driving assistance. Accordingly, it is possible to inform the occupant that the driving assistance is driving assistance in which it is highly necessary for the steering wheel 82 to be gripped.

Further, when the operator status determiner 130 does not determine that the occupant is in the hands-on state until the predetermined time elapses since the occupant is requested to perform hand-on, the HMI controller 120 may cause a sound to be output from the speaker while a warning is being strengthened step by step. The HMI controller 120 may warn the occupant by operating an actuator that vibrates a seat on which the occupant is seated or a seat belt to vibrate the seat or the seat belt with stepwise strength.

Figure 30:
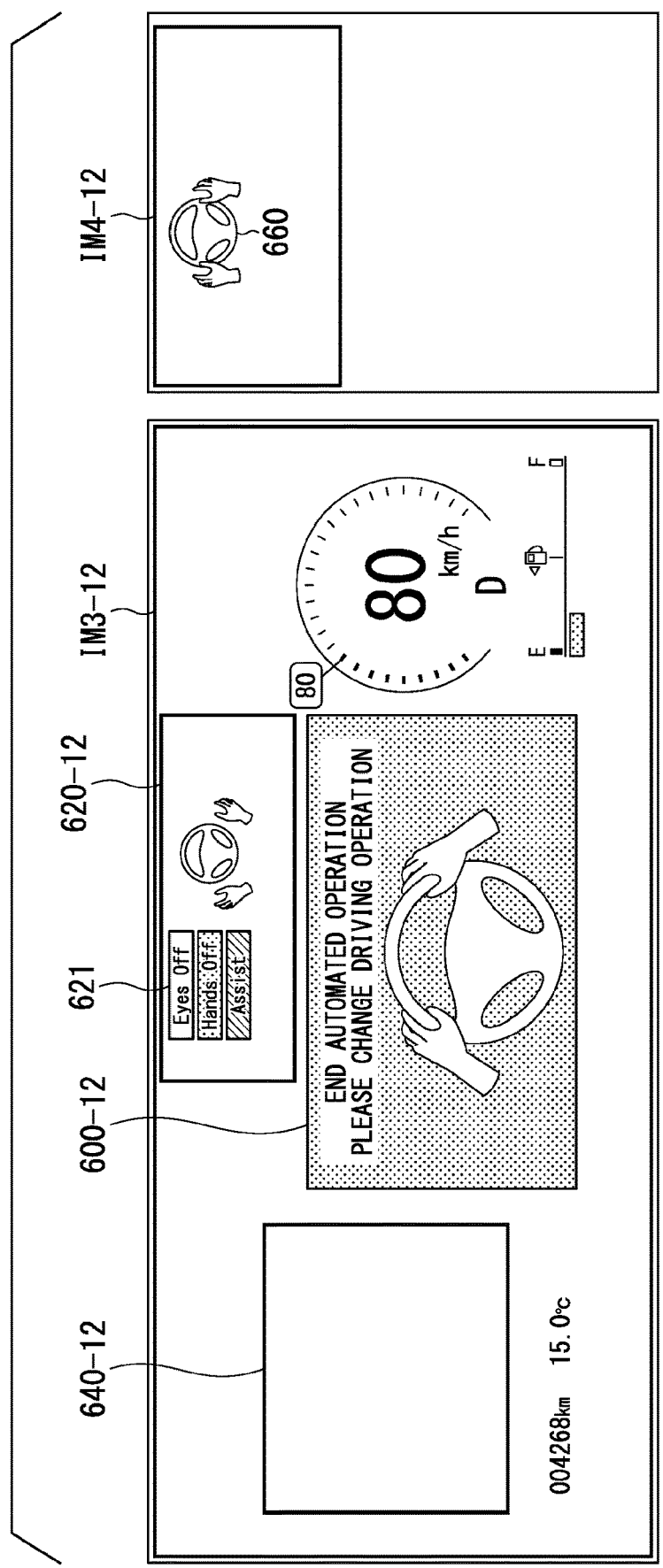
FIG. 30 is a diagram showing an example of a third screen IM3-12 and a fourth screen IM4-12 on which information indicating that the automated driving ends is displayed.

Further, when the operator status determiner 130 does not determine that the occupant is in the hands-on state before the predetermined time elapses since the display shown in FIG. 29 is performed, the HMI controller 120 displays a screen indicating that the driving assistance (automated driving control) ends, as shown in FIG. 30.

FIG. 30 is a diagram showing an example of the third screen IM3-12 and the fourth screen IM4-12 on which information indicating that the automated driving ends is displayed. The HMI controller 120 causes information for prompting alternate performing of a driving operation to end the automated driving to be displayed in the driving assistance state display area 600-12 of the third screen IM-12 so that the information is superimposed on the image showing the shape of the road in front of the host vehicle M, the image showing the host vehicle M, and the image showing the future trajectory of the host vehicle M. Further, the HMI controller 120 causes an image of "Hands Off" to be highlighted in a driving assistance state display area 620-12 of the third screen IM3-12 in a color different from that of the highlight shown in FIG. 30.

Further, the requested motion notification image 660 schematically showing the positional relationship between the steering wheel 82 and the hand of the occupant is displayed on the fourth screen IM4-12. Further, the HMI controller 120 may perform a warning using a more strong sound or the like than the display of the third screen IM3-11 and the fourth screen IM4-12 shown in FIG. 30 to be displayed, in order to cause the occupant to grip the steering wheel 82.

Further, the HMI controller 120 operates, for example, an actuator that vibrates a seat or a seat belt at a timing when the third screen IM3-12 is displayed on the first display 450 and the fourth screen IM4-12 is displayed on the HUD 460, thereby causing at least one of the seat and the seat belt to vibrate. In this case, the HMI controller 120 may operate the actuator so that the vibration is stronger than the vibration when the third screen IM3-11 and the fourth screen IM4-11 are displayed. Accordingly, the occupant can intuitively ascertain that the automated driving ends.

Further, when the operator status determiner 130 does not determine that the occupant is in the hands-on state before the predetermined time elapses since the display shown in FIG. 30 is performed, the master controller 100 causes the automated driving controller 300 to execute alternative control. In this case, the HMI controller 120 causes a screen indicating that the automated driving for executing alternative control is executed to be displayed, as shown in FIG. 31.

Figure 31:
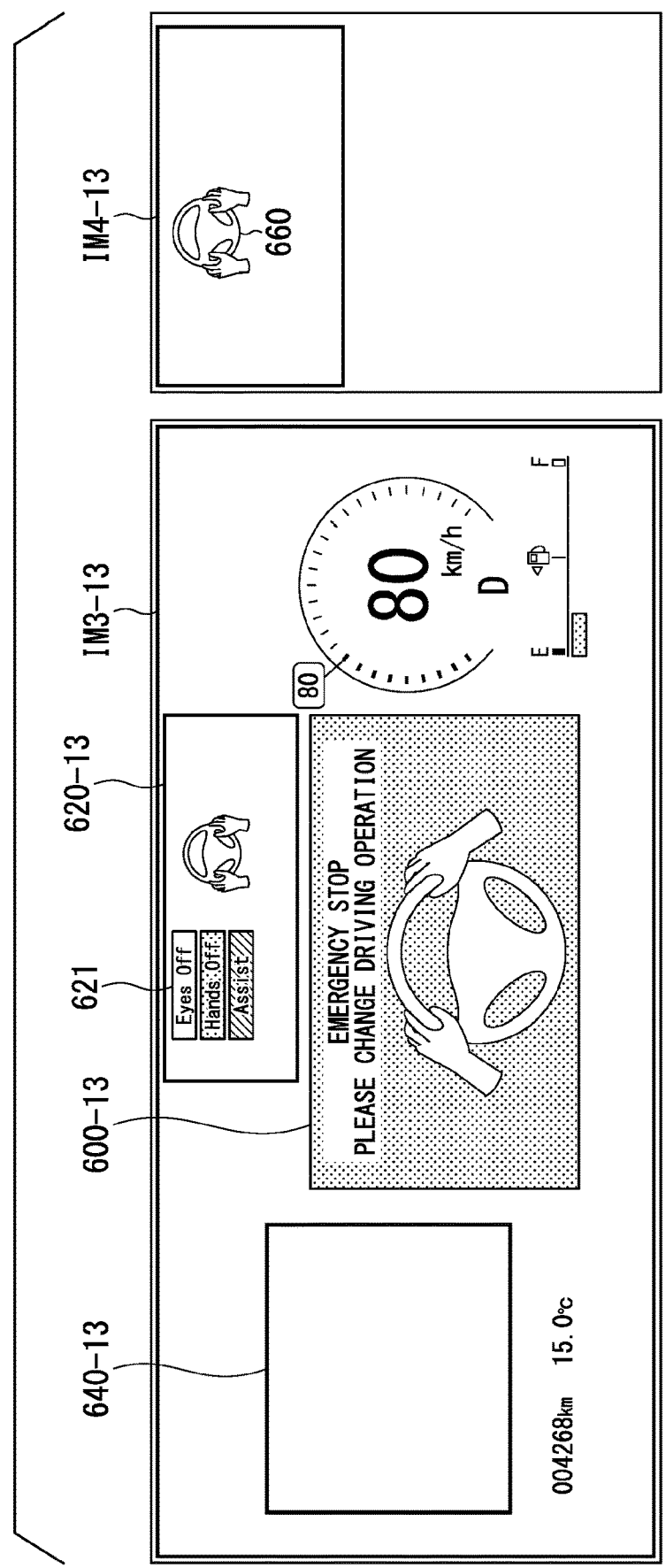
FIG. 31 is a diagram showing an example of a third screen IM3-13 and a fourth screen IM4-13 at the time of alternative control.

FIG. 31 is a diagram showing an example of the third screen IM3-13 and the fourth screen IM4-13 at the time of alternative control. Information indicating that the host vehicle M is stopped as the alternative control ("Alternately perform emergency stop and driving operation" in FIG. 30) is displayed in the driving assistance state display area 600-13 of the third screen IM-12.

<Scene (9)>

A scene (9) is a scene in which an occupant receives an instruction to grip the steering wheel 82, grips the steering wheel 82 until the driving assistance ends, starts manual driving, and enter a general road from a highway. The switching controller 110 switches a traveling state of the host vehicle M to a state in which traveling is performed by manual driving of the occupant. The HMI controller 120 performs control so that the first screen IM1-1 is displayed on the first display 450 and the second screen IM2-1 is displayed on the HUD 460.

<Processing Flow Corresponding to Scenes (7) to (9)>

Figure 32:
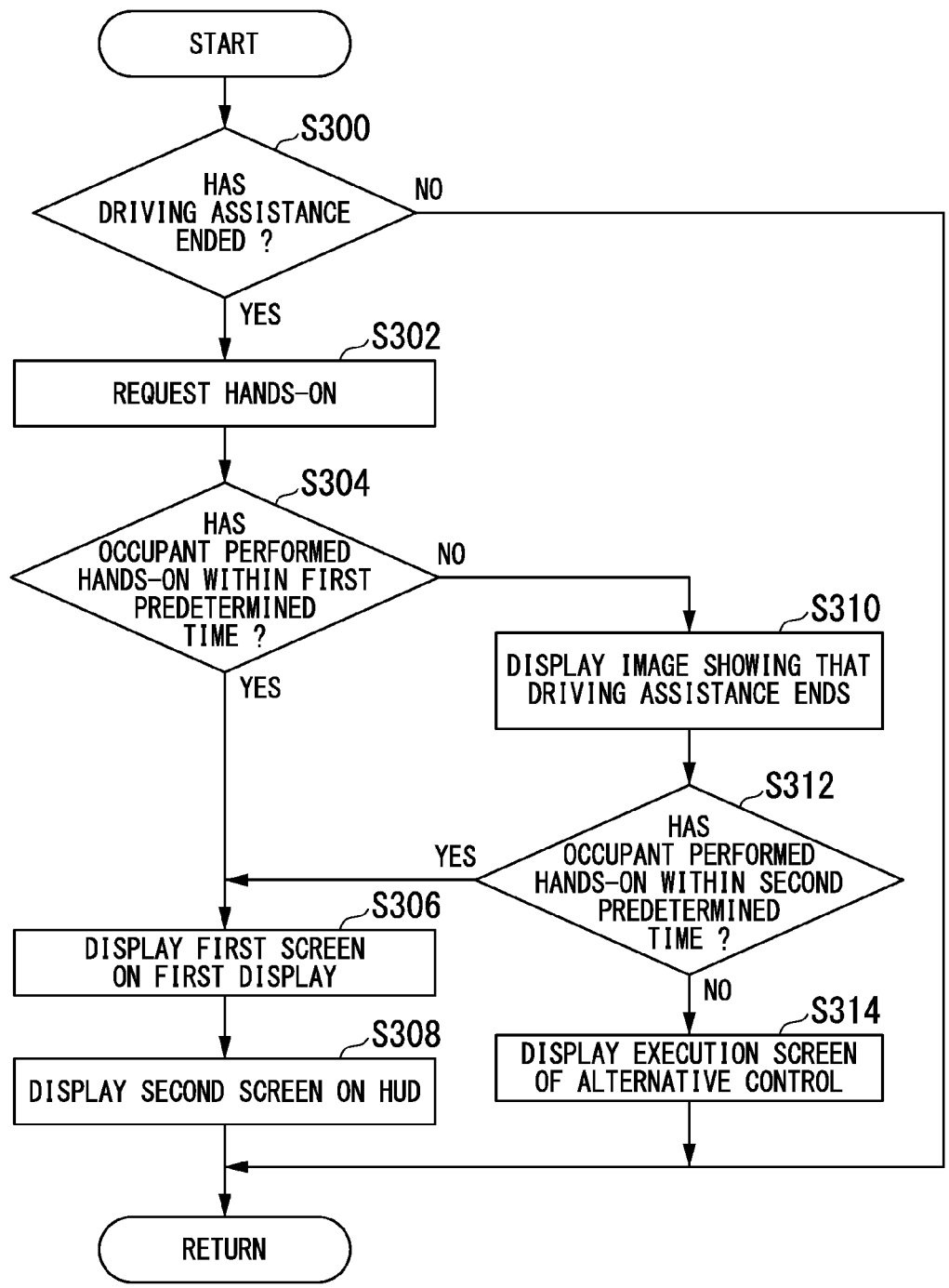
FIG. 32 is a flowchart showing an example of a flow of a process that is executed by an HMI controller 120 in scenes (7) to (9).

FIG. 32 is a flowchart showing an example of a flow of a process that is executed by the HMI controller 120 in scenes (7) to (9).

First, the HMI controller 120 determines whether or not the driving assistance has ended (step S300). For example, when the auto switch 414 is operated and the switching controller 110 performs switching from the driving assistance to the manual driving, the HMI controller 120 determines that driving assistance has ended.

When the HMI controller 120 has determined that the driving assistance has ended, the HMI controller 120 displays a screen for requesting the occupant to perform hands-on (to grip the steering wheel 82) (step S302). Then, the operator status determiner 130 determines whether or not the occupant has entered the hands-on state within a first predetermined time (step S304).

When the operator status determiner 130 has determined that the occupant has entered the hands-on state within the first predetermined time, the HMI controller 120 causes the first screen IM1 to be displayed on the first display 450 (step S306) and the second screen IM2 to be displayed on the HUD 460 (step S308).

On the other hand, when the operator status determiner 130 has not determined that the occupant has entered the hands-on state within the first predetermined time in the process of step S304, the HMI controller 120 causes an image showing that the driving assistance ends to be displayed on the first display 450 (step S310).

Then, the operator status determiner 130 determines whether or not the occupant has entered the hands-on state within a second predetermined time (step S312).

When the operator status determiner 130 has determined that the occupant has entered the hands-on state within the second predetermined time, the HMI controller 120 proceeds to the process of step S306 described above.

On the other hand, when the operator status determiner 130 has not determined that the occupant has entered the hands-on state within the second predetermined time, the HMI controller 120 causes an image showing that the alternative control is executed to be displayed on the first display 450 (step S314). Accordingly, the process of this flowchart ends.

<Switching Timing of Various Devices or Controls Relevant to Driving Assistance>

Figure 33:
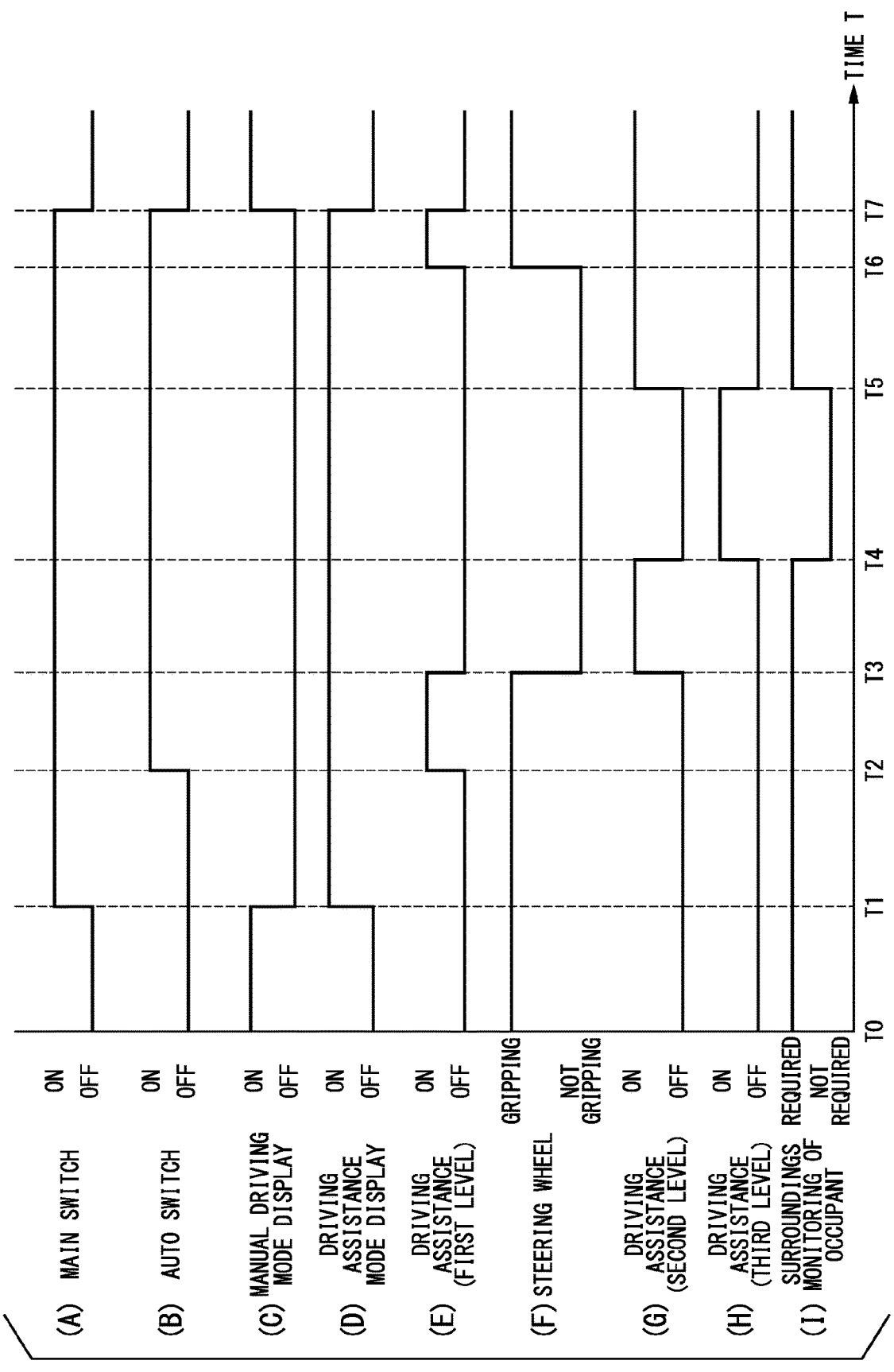
FIG. 33 is a diagram for explaining switching timing of various devices or controls relevant to driving assistance.

Hereinafter, switching timing of various devices or controls relevant to the driving assistance of the host vehicle M will be described with reference to the drawings. FIG. 33 is a diagram for explaining switching timing of various devices or controls relevant to the driving assistance.

In FIG. 33, timings of switching between (A) ON/OFF of the main switch 412, (B) ON/OFF of the auto switch 414, (C) ON/OFF of a manual driving display, (D) ON/OFF of a driving assistance mode display, (E) ON/OFF of the driving assistance at the first level, (F) the steering wheel 82 gripped/not gripped, (G) ON/OFF of the driving assistance at the second level, (H) ON/OFF of the driving assistance at the third level, and (I) monitoring of driving of the occupant required/not required with respect to the passage of time as switching relevant to the driving assistance are shown.

At time T0, the host vehicle M is traveling through the manual driving of the occupant. In this case, the main switch 412 and the auto switch 414 are not operated, and screens (the first screen IM1 and second screen IM2) for the manual driving are displayed on the first display 450 and the HUD 460. Further, at time T0, since the driving assistance at any level is not performed, the occupant inevitably grips the steering wheel 82 and monitors the surroundings.

At time T1, an operation for turning on the main switch 412 is executed by the occupant. In this case, the screens (the third screen IM3 and the fourth screen IM4) in the driving assistance mode are displayed on the first display 450 and the HUD 460. From time T1 to T2, driving control through the driving assistance is not performed, and manual driving is continued.

At time T2, an operation for turning on the auto switch 414 is executed by the occupant. In this case, the switching controller 110 of the master controller 100 switches the level of the driving assistance to the first level. Accordingly, the driving assistance controller 200 performs the driving assistance at the first level.

In the driving assistance mode display, the HMI controller 120 displays an image showing that the driving assistance at the second level is executed by the occupant releasing the hand from the steering wheel 82.

At time T3, the occupant releases the hand from the steering wheel 82 in a state in which the host vehicle M can provide the driving assistance at the second level. In this case, the switching controller 110 switches the level of the driving assistance from the first level to the second level. Then, the driving assistance controller 200 stops the driving assistance control, and the automated driving controller 300 resumes the driving assistance at the second level (that is, automated driving control).

At time T4, for example, a start condition for the low-speed following traveling is established, and the switching controller 110 switches the level of the driving assistance to the third level. Accordingly, the automated driving controller 300 starts the low-speed following traveling as the driving assistance at the third level. Thus, it is not necessary for the occupant to monitor the surroundings.

At time T5, the driving assistance at the third level ends, and the driving assistance is switched the driving assistance at the second level. Therefore, the occupant is obliged to monitor the surroundings. Further, at time T5, a display for switching from the driving assistance at the second level to the manual driving is performed. In this case, the HMI controller 120 displays information for causing the occupant to grip the steering wheel 82 in the driving assistance mode display.

At time T6, the occupant grips the steering wheel 82 and enters a hands-on state. In this case, the switching controller 110 switches the level of the driving assistance from the second level to the first level. Accordingly, the automated driving controller 300 stops the driving assistance at the second level, and the driving assistance controller 200 starts the driving assistance at the first level. In this case, the switching controller 110 may perform switching to the manual driving after the driving assistance at the first level has elapsed during a predetermined time.

At time T7, the host vehicle M has been switched to the manual driving. In this case, the main switch 412 and the auto switch 414 are switched to the OFF state at a timing when the host vehicle M is switched to the manual driving, for example.

According to the embodiment described above, the vehicle control system includes the image processor 140A that detects the direction of the face or line of sight of the occupant of the host vehicle M from the captured image of the in-vehicle camera 90, the automated driving controller 300 that executes automated driving control, a switching controller 110 that switches the driving assistance executed by the automated driving controller 300 from the driving assistance at the second level in which a predetermined task is required to any one of a plurality of driving assistances including the driving assistance at the third level in which a level of a task required of the occupant is lower than the driving assistance at the second level, in which when the condition including the direction of the face or line of sight of the occupant detected by the image processor 140A being within the first angle range 401 is satisfied, the switching controller 110 switches the level of the driving assistance from the third level to the second level, such that the driving assistance at the second level with a higher level of control difficulty is executed when the occupant is in a state in which the occupant can perform surroundings monitoring. As a result, since the occupant is monitoring the surroundings even when switching to the manual driving due to the high control difficulty occurs while the driving assistance at the second level is being performed, it is possible to cause the driving operation to be handed over to the occupant more smoothly.

Further, according to the above-described embodiment, since a current speed of the host vehicle M is caused to be kept or decelerate or the host vehicle M is not caused to accelerate to an original upper limit speed of the driving assistance at the second level in a case in which the direction of the face or line of sight of the occupant is not in the first angle range 401 or the direction of the face or line of sight of the occupant is not detected, and a condition for switching the level of the driving assistance from the third level to the second level is not satisfied, it is possible to lower a level of difficulty of the automated driving control as compared with the driving assistance at the second level. As a result, it is possible to continue to perform the automated driving while decreasing a level of the task required of the occupant.

Further, according to the above-described embodiment, when the condition for switching the level of the driving assistance from the third level to the second level is not satisfied, the alternative control for causing the host vehicle M to decelerate and stop is performed. Therefore, it is possible to appropriately control the host vehicle M even in a case in which the occupant is unaware of change in the level of the driving assistance when the level of the driving assistance is changed from the driving assistance at the third level to the driving assistance at the second level.

Further, according to the above-described embodiment, when the level of the driving assistance is lowered, a notification of the decrease in the level of the driving assistance is performed. Therefore, when a task of the occupant increases due to switching of the level of the driving assistance, it is possible to inform the occupant of the fact in advance.

Further, according to the above-described embodiment, when the task of the occupant increases due to switching of the level of the driving assistance, the level of the driving assistance is switched in a case in which approval has been received from the occupant. Therefore, it is possible to cause the occupant to execute the task more reliably.

Further, according to the above-described embodiment, since a condition that the level of the wakefulness of the occupant is equal to or higher than the threshold value is used as the condition for switching the level of the driving assistance from the third level to the second level, it is possible to curb switching to driving assistance in which the task further increases in a situation in which the occupant is not awake.

Figure 34:
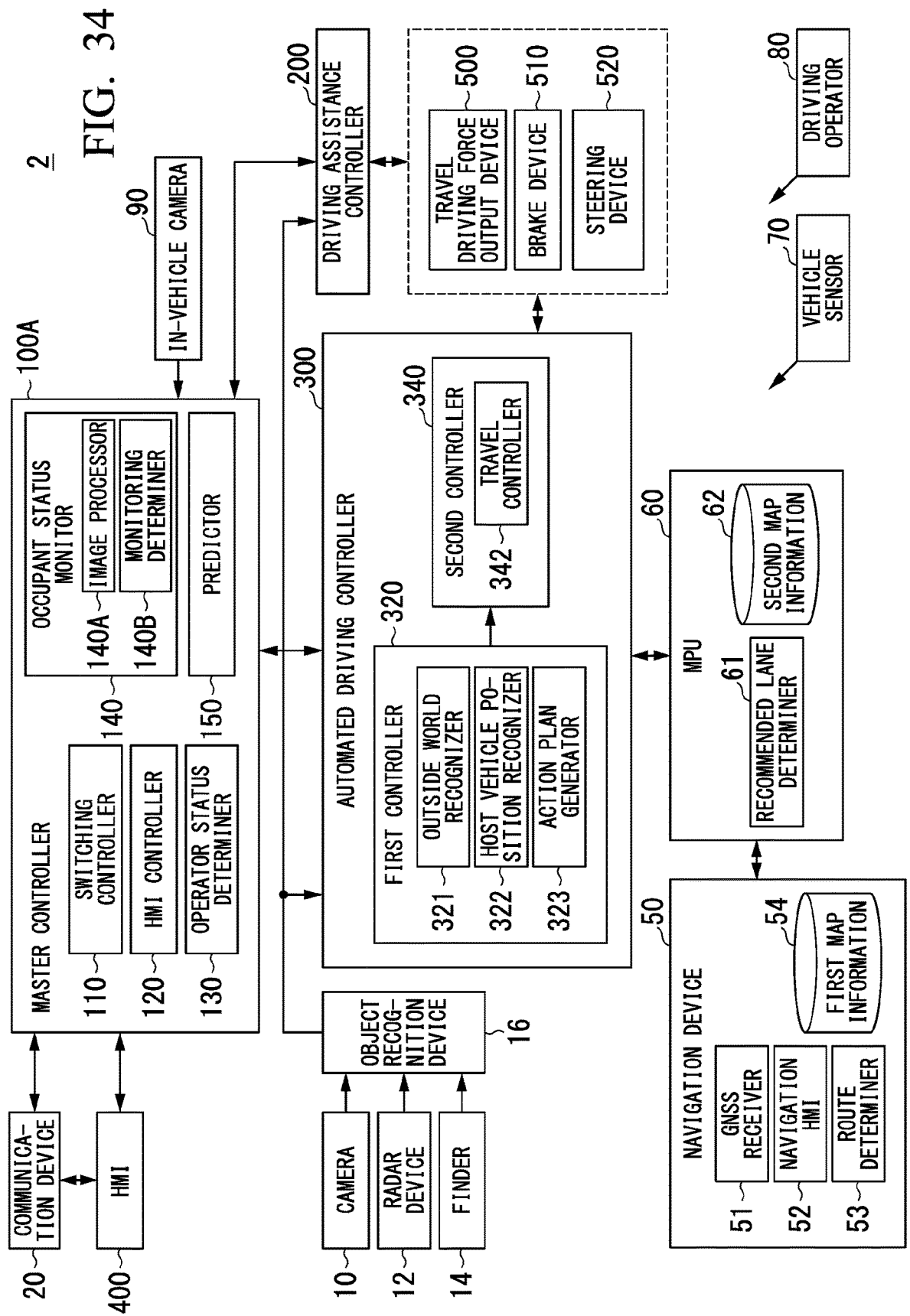
FIG. 34 is a configuration diagram of a vehicle system 2 in a modification example of the embodiment.

Hereinafter, a modification example of the above-described embodiment will be described. FIG. 34 is a configuration diagram of a vehicle system 2 in a modification example of the embodiment. A master controller 100A of the vehicle system 2 according to the modification example further includes, for example, a predictor 150, in addition to the switching controller 110, the HMI controller 120, the operator status determiner 130, and the occupant status monitor 140 described above. Further, a configuration in which the predictor 150 is included in the driving assistance controller 200 or the automated driving controller 300 may be adopted.

The predictor 150 predicts a future status of the host vehicle M or another vehicle on the basis of a recognition result of the object recognition device 16, a recognition result of the outside world recognizer 321 of the automated driving controller 300, and the action plan (the event and the target trajectory) generated by the action plan generator 323.

For example, the predictor 150 predicts that the speed of the host vehicle M will be 60 [km/h] or more at a certain future time in a case in which a speed of a preceding vehicle recognized by the object recognition device 16 or the outside world recognizer 321 has been 60 [km/h] or more when the automated driving controller 300 is performing low-speed following traveling that is one driving assistance at the third level. Further, since there is no preceding vehicle that is restricting the speed of the host vehicle M in a case in which the outside world recognizer 321 has recognized that the preceding vehicle is about to change the lanes from a host lane to another lane when the automated driving controller 300 is performing the low-speed following traveling, the predictor 150 predicts that the speed of the host vehicle M will be 60 [km/h] or more at a certain future time.

Thus, when it is predicted that an execution condition for the low-speed following traveling will not be satisfied at a certain future time, the HMI controller 120 causes an image showing that the driving assistance at the third level is scheduled to end to be displayed on the third screen IM3 and the fourth screen IM4 at a timing earlier than a timing at which the execution condition for the low-speed following traveling is actually not satisfied. Accordingly, it is possible to inform the occupant that the surrounding monitoring is required (the task increases) at an earlier timing.

The forms for implementing the present invention have been described using the embodiments, but the present invention is not limited to such embodiments at all, and various modifications and substitutions can be made without departing from the gist of the present invention.

DESCRIPTION OF REFERENCE NUMERALS

1 Vehicle system
10 Camera
12 Radar device
14 Finder
16 Object recognition device
20 Communication device
50 Navigation device
51 GNSS receiver 52 Navigation HMI
53 Route determiner
54 First map information
60 MPU
61 Recommended lane determiner
62 Second map information
70 Vehicle sensor
80 Driving operator
82 Steering wheel
82A Grip sensor
90 In-vehicle camera
100 Master controller
110 Switching controller
120 HMI controller
130 Operator status determiner
140 Occupant status monitor
140A Image processor
140B Monitoring determiner
200 Driving assistance controller
300 Automated driving controller
320 First controller
321 Outside world recognizer
322 Host vehicle position recognizer
323 Action plan generator
340 Second controller
342 Travel controller
400 HMI
450 First display
460 HUD
470 Third display
500 Travel driving force output device
510 Brake device
520 Steering device

What is claimed is:

1. A vehicle control system comprising:
a camera configured to capture an image of an occupant in a host vehicle;
a human machine interface configured to receive an input operation of the occupant and output information to the occupant; and
a processor configured to execute instructions to:
detect a level of wakefulness of the occupant based on the image captured by the camera;
execute automated driving by controlling speed and steering of the host vehicle; and
switch an automated driving mode to any one of a plurality of automated driving modes including a first automated driving mode and a second automated driving mode, the first automated driving mode being an automated driving mode in which a task is required of the occupant, the second automated driving mode being an automated driving mode in which a level of the task required of the occupant is lower than in the first automated driving mode,
wherein the processor configured to further execute instructions to:
cause the human machine interface to output predetermined information when the level of wakefulness of the occupant is lower than a threshold value under the second automated driving mode, the predetermined information being information for notifying the occupant that the automated driving mode will be switched, and
switch from the second automated driving mode to the first automated driving mode when switching conditions are satisfied, the switching conditions including that an approval operation is received by the human machine interface after the predetermined information is output by the human machine interface, the approval operation being an operation in which the occupant approves of the automated driving mode being switched.

2. The vehicle control system according to claim 1, wherein the processor is configured to further execute instructions to: switch to a third automated driving mode in which the host vehicle is caused to travel at a speed equal to or lower than an upper limit speed of the second automated driving mode or a current speed of the host vehicle when the switching conditions are not satisfied.

3. The vehicle control system according to claim 1, wherein the processor is configured to further execute instructions to: switch to a fourth automated driving mode in which the host vehicle is caused to decelerate and stop when the switching conditions are not satisfied.

4. The vehicle control system according to claim 1, wherein a maximum speed at which the host vehicle is allowed to travel in the second automated driving mode is lower than a maximum speed at which the host vehicle is allowed to travel in the first automated driving mode.

5. The vehicle control system according to claim 1, wherein the switching conditions further includes a condition that there are no other vehicles in front of the host vehicle in a host lane in which the host vehicle travels.

6. The vehicle control system according to claim 1, wherein the processor is configured to further execute instructions to:
predict a future status of the host vehicle or another vehicle; and
wherein the switching conditions further includes a condition that the processor predicts that the speed of the host vehicle will be equal to or higher than a predetermined speed or a condition that the processor predicts that another vehicle present in front of the host vehicle will move from in front of the host vehicle, and
wherein the processor is configured to further execute instructions to: cause the human machine interface to output the predetermined information when the switching conditions are satisfied.

7. A vehicle control method comprising causing an in-vehicle computer mounted on a host vehicle that includes a camera configured to capture an image of an occupant in the host vehicle and a human machine interface configured to receive an input operation of the occupant and output information to the occupant to:
detect a level of wakefulness of the occupant based on the image captured by the camera;
execute automated driving by controlling speed and steering of the host vehicle; and
switch an automated driving mode to any one of a plurality of automated driving modes including a first automated driving mode and a second automated driving mode, the first automated driving mode being an automated driving mode in which a task is required of the occupant, the second automated driving mode being an automated driving mode in which a level of the task required of the occupant is lower than in the first automated driving mode,
wherein the method further comprising causing the in-vehicle computer to:
cause the human machine interface to output predetermined information when the level of wakefulness of the occupant is lower than a threshold value under the second automated driving mode, the predetermined information being information for notifying the occupant that the automated driving mode will be switched, and switch from the second automated driving mode to the first automated driving mode when switching conditions are satisfied, the switching conditions including that an approval operation is received by the human machine interface after the predetermined information is output by the human machine interface, the approval operation being an operation in which the occupant approves of the automated driving mode being switched.

8. A computer-readable non-transitory storage medium storing a vehicle control program causing an in-vehicle computer mounted on a host vehicle that includes a camera configured to capture an image of an occupant in the host vehicle and a human machine interface configured to receive an input operation of the occupant and output information to the occupant to:

detect a level of wakefulness of the occupant based on the image captured by the camera;

execute automated driving by controlling speed and steering of the host vehicle; and switch an automated driving mode to any one of a plurality of automated driving modes including a first automated driving mode and a second automated driving mode, the first automated driving mode being an automated driving mode in which a task is required of the occupant, the second automated driving mode being an automated driving mode in which a level of the task required of the occupant is lower than in the first automated driving mode, wherein the program further comprising causing the in-vehicle computer to:

cause the human machine interface to output predetermined information when the level of wakefulness of the occupant is lower than a threshold value under the second automated driving mode, the predetermined information being information for notifying the occupant that the automated driving mode will be switched, and switch from the second automated driving mode to the first automated driving mode when switching conditions are satisfied, the switching conditions including that an approval operation is received by the human machine interface after the predetermined information is output by the human machine interface, the approval operation being an operation in which the occupant approves of the automated driving mode being switched.

* * * * *